US011231291B2

(12) United States Patent
Coleman et al.

(10) Patent No.: US 11,231,291 B2
(45) Date of Patent: Jan. 25, 2022

(54) PRESENTING NON-RECOMMENDED ROUTES

(71) Applicant: Apple Inc., Cupertino, CA (US)

(72) Inventors: Patrick J. Coleman, San Ramon, CA (US); Brian J. Andrich, San Francisco, CA (US); Daniel R. Delling, Sunnyvale, CA (US); Dennis Schieferdecker, Cupertino, CA (US); Ethan T. Bold, San Francisco, CA (US); Hengbin Luo, San Jose, CA (US); Michael Wegner, Berlin (DE); Rami Khawandi, London (GB); Lili Cao, Sunnyvale, CA (US); Hyo Jeong Shin, San Jose, CA (US); Richard B. Warren, Redwood City, CA (US); Ronald K. Huang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 15/990,432

(22) Filed: May 25, 2018

(65) Prior Publication Data

US 2018/0347996 A1 Dec. 6, 2018

Related U.S. Application Data

(60) Provisional application No. 62/514,570, filed on Jun. 2, 2017.

(51) Int. Cl.
*G01C 21/36* (2006.01)
*G06F 16/29* (2019.01)
(Continued)

(52) U.S. Cl.
CPC ......... *G01C 21/3626* (2013.01); *G01C 21/32* (2013.01); *G01C 21/3415* (2013.01);
(Continued)

(58) Field of Classification Search
CPC .......................... G01C 21/3626; G01C 21/32; G01C 21/3415; G01C 21/3446; G01C 21/3484;
(Continued)

(56) References Cited

U.S. PATENT DOCUMENTS

| | | | |
|---|---|---|---|
| 5,459,667 A | * | 10/1995 | Odagaki ................ G01C 21/30 701/428 |
| 6,591,188 B1 | | 7/2003 | Ohler |

(Continued)

FOREIGN PATENT DOCUMENTS

| | | |
|---|---|---|
| WO | 2006/135310 A1 | 12/2006 |
| WO | 2016/135310 A1 | 9/2016 |
| WO | 2017/027693 A1 | 2/2017 |

OTHER PUBLICATIONS

Turn-by-turn Navigation, Wikipedia, May 14, 2017, retrieved on Aug. 13, 2018.

*Primary Examiner* — Krishnan Ramesh
(74) *Attorney, Agent, or Firm* — Invoke

(57) ABSTRACT

In some implementations, a computing device can proactively determine a destination and request traffic information for routes from a starting location to the destination. In some implementations, a computing device can identify some routes between a starting location and a destination as non-recommended routes and recommend other routes. In some implementations, a computing device can rank routes between a starting location and a destination based on automatically-determined user interest. In some implementations, a computing device can determine a user is familiar with a route and adjust the information presented to the user about the route accordingly.

25 Claims, 36 Drawing Sheets

(51) Int. Cl.
*G06F 16/9537* (2019.01)
*G06F 16/2457* (2019.01)
*G01C 21/34* (2006.01)
*G09B 29/10* (2006.01)
*G01C 21/32* (2006.01)

(52) U.S. Cl.
CPC ..... *G01C 21/3446* (2013.01); *G01C 21/3484* (2013.01); *G01C 21/3492* (2013.01); *G01C 21/367* (2013.01); *G01C 21/3617* (2013.01); *G01C 21/3641* (2013.01); *G01C 21/3676* (2013.01); *G06F 16/24578* (2019.01); *G06F 16/29* (2019.01); *G06F 16/9537* (2019.01); *G09B 29/102* (2013.01)

(58) Field of Classification Search
CPC . G06F 16/9537; G06F 16/24578; G06F 16/29
USPC .......................................................... 701/414
See application file for complete search history.

(56) References Cited

U.S. PATENT DOCUMENTS

| | | | |
|---|---|---|---|
| 6,707,421 B1 | 3/2004 | Drury et al. | |
| 6,961,658 B2 | 11/2005 | Ohler | |
| 7,092,818 B2 | 8/2006 | Ohler | |
| 7,197,394 B2 | 3/2007 | Ohler | |
| 8,260,550 B2 | 9/2012 | Highstrom et al. | |
| 8,325,180 B2 | 12/2012 | Kim | |
| 8,510,315 B2 | 8/2013 | Zheng et al. | |
| 8,676,489 B2 | 3/2014 | Cheung et al. | |
| 8,718,932 B1 | 5/2014 | Pack et al. | |
| 8,781,716 B1 | 7/2014 | Wenneman et al. | |
| 9,267,798 B2 | 2/2016 | Kitchel | |
| 9,303,997 B2 | 4/2016 | McGavran et al. | |
| 9,347,780 B2 | 5/2016 | Caine et al. | |
| 9,476,724 B2 | 10/2016 | Caine et al. | |
| 9,506,768 B2 | 11/2016 | Lerenc | |
| 9,612,128 B2 | 4/2017 | Delling et al. | |
| 9,618,346 B2 | 4/2017 | Wenneman et al. | |
| 9,631,930 B2 | 4/2017 | McGavran et al. | |
| 9,726,502 B2 | 8/2017 | Ni et al. | |
| 9,869,561 B2 | 1/2018 | Kroeller et al. | |
| 9,869,563 B2 | 1/2018 | Broadbent et al. | |
| 9,964,412 B2 | 5/2018 | Broadbent et al. | |
| 10,118,603 B2 | 11/2018 | Payne | |
| 10,240,439 B2 | 3/2019 | Noffke et al. | |
| 10,371,526 B2 | 8/2019 | McGavran et al. | |
| 10,372,129 B1 | 8/2019 | Urmson et al. | |
| 10,393,881 B2 | 8/2019 | Williams et al. | |
| 10,579,939 B2 | 3/2020 | McGavran et al. | |
| 2006/0265124 A1 | 11/2006 | Ohler | |
| 2007/0052585 A1* | 3/2007 | Rothschild | G01C 21/00 342/357.34 |
| 2007/0067086 A1* | 3/2007 | Rothschild | G08G 1/096791 701/93 |
| 2009/0204892 A1 | 8/2009 | Cheung et al. | |
| 2010/0324816 A1 | 12/2010 | Highstrom et al. | |
| 2012/0265433 A1 | 10/2012 | Viola et al. | |
| 2012/0310523 A1 | 12/2012 | Delling et al. | |
| 2014/0005924 A1 | 1/2014 | Letz | |
| 2014/0045481 A1* | 2/2014 | Fraley | H04N 21/4586 455/418 |
| 2014/0129143 A1* | 5/2014 | Dave | G08G 1/0968 701/537 |
| 2014/0244170 A1* | 8/2014 | Lerenc | G01C 21/3484 701/537 |
| 2014/0278051 A1* | 9/2014 | McGavran | G06N 20/00 701/400 |
| 2014/0330505 A1 | 11/2014 | Wenneman et al. | |
| 2015/0051835 A1* | 2/2015 | Jung | G06F 3/0238 701/533 |
| 2015/0160023 A1* | 6/2015 | Goel | G08G 1/0112 701/400 |
| 2015/0177009 A1* | 6/2015 | Saito | G08G 1/0129 701/424 |
| 2015/0292893 A1 | 10/2015 | Bartsch et al. | |
| 2016/0076902 A1 | 3/2016 | Diaz et al. | |
| 2016/0195405 A1* | 7/2016 | Kreifeldt | G01C 21/3617 701/533 |
| 2016/0258769 A1 | 9/2016 | Caine et al. | |
| 2016/0356622 A1 | 12/2016 | McGavran et al. | |
| 2017/0059331 A1* | 3/2017 | Ni | G01C 21/20 |
| 2017/0094467 A1* | 3/2017 | Kiuchi | G01C 21/365 |
| 2017/0138753 A1 | 5/2017 | Rowley et al. | |
| 2018/0020333 A1* | 1/2018 | Gillen | H04W 4/40 |
| 2018/0045522 A1* | 2/2018 | Aziz | G08G 5/0047 |
| 2018/0053415 A1* | 2/2018 | Krunic | G08G 1/0145 |
| 2018/0087913 A1* | 3/2018 | Biswas | G01C 21/3688 |
| 2018/0106622 A1* | 4/2018 | Biswas | G06Q 10/047 |
| 2018/0292540 A1 | 10/2018 | Williams et al. | |
| 2018/0299274 A1 | 10/2018 | Moghe et al. | |

* cited by examiner

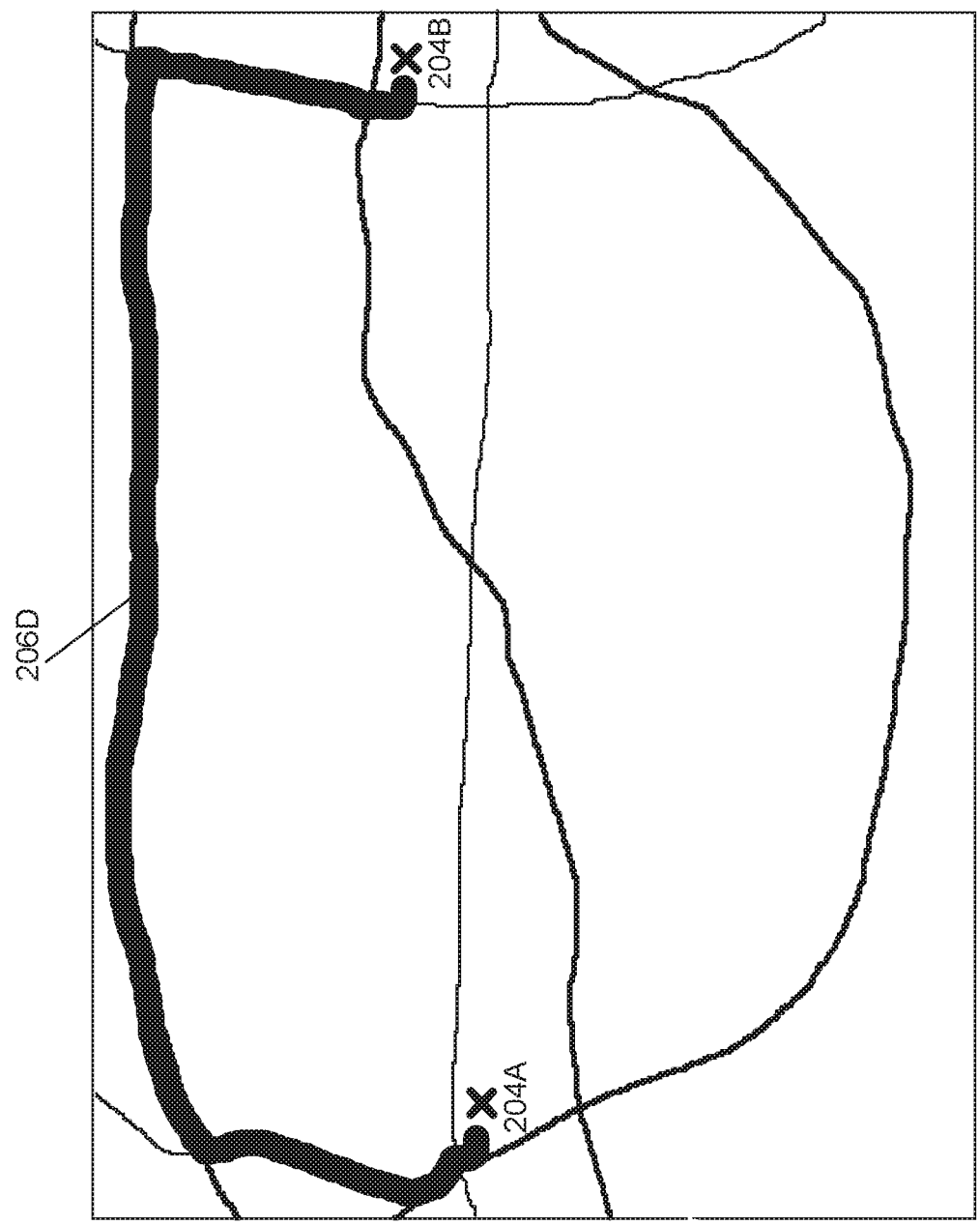

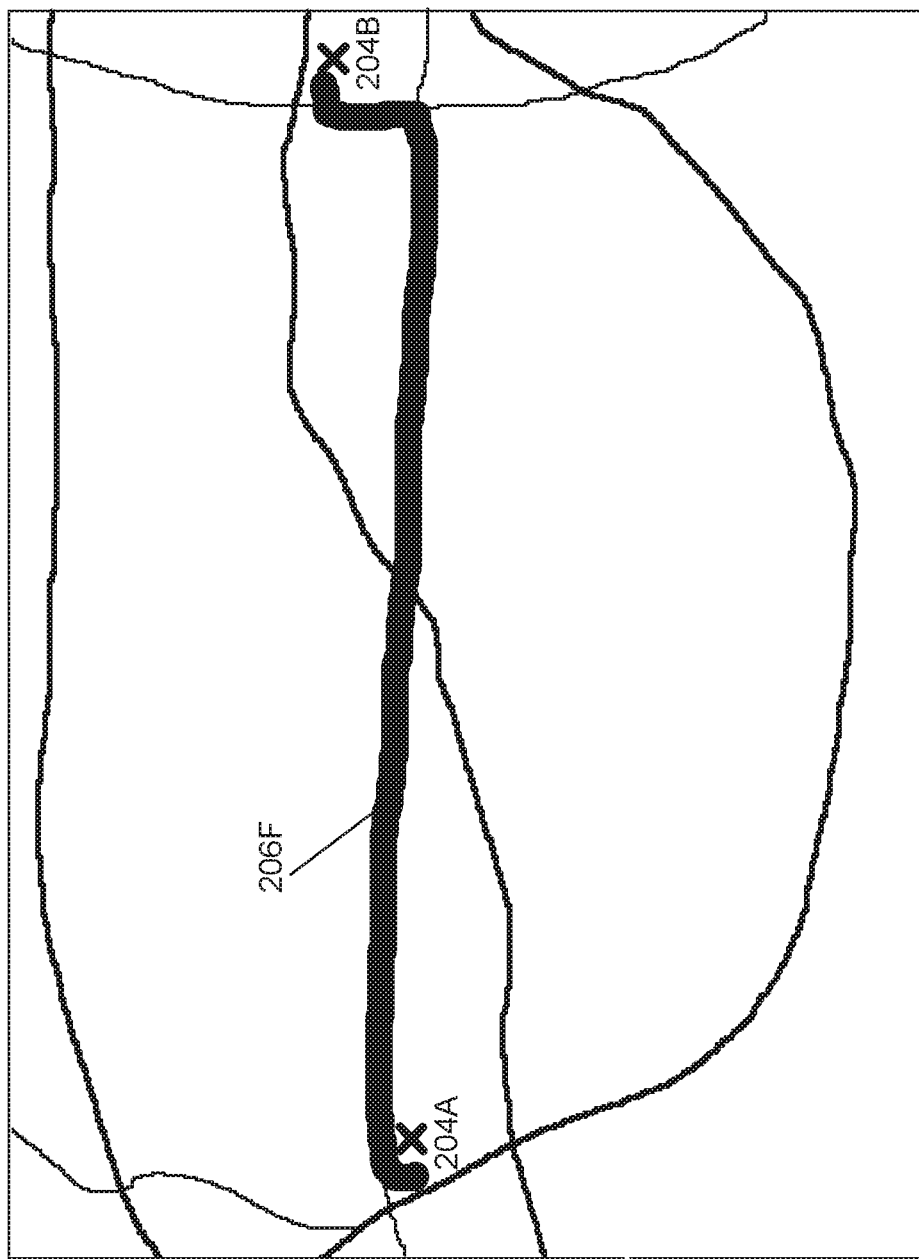

Title String 402

| Heavy traffic on the way | *if home* | home |
| | *if work* | to work |
| | *if other named* | to [name] |
| | *else* | to [street name] |

Detail String 404

| Take [suggested road name], | *if incident\** | [incident type] | on [non-suggested road name] |
| | *else* | heavy traffic | |

*only include accident and lane closure incident types

450

Maps — now
Heavy traffic on the way home
Accident on 280, expect delays
Press for more 452 Title String

| Heavy traffic on the way | if home | home |
| | if work | to work |
| | if other named | to [name] |
| | else | to [street name] |

454 Detail String

| | if incident* | [incident type] on [suggested road name], expect delays |
| | else | Expect delays on [suggested road name] |

*only include accident and lane closure incident types

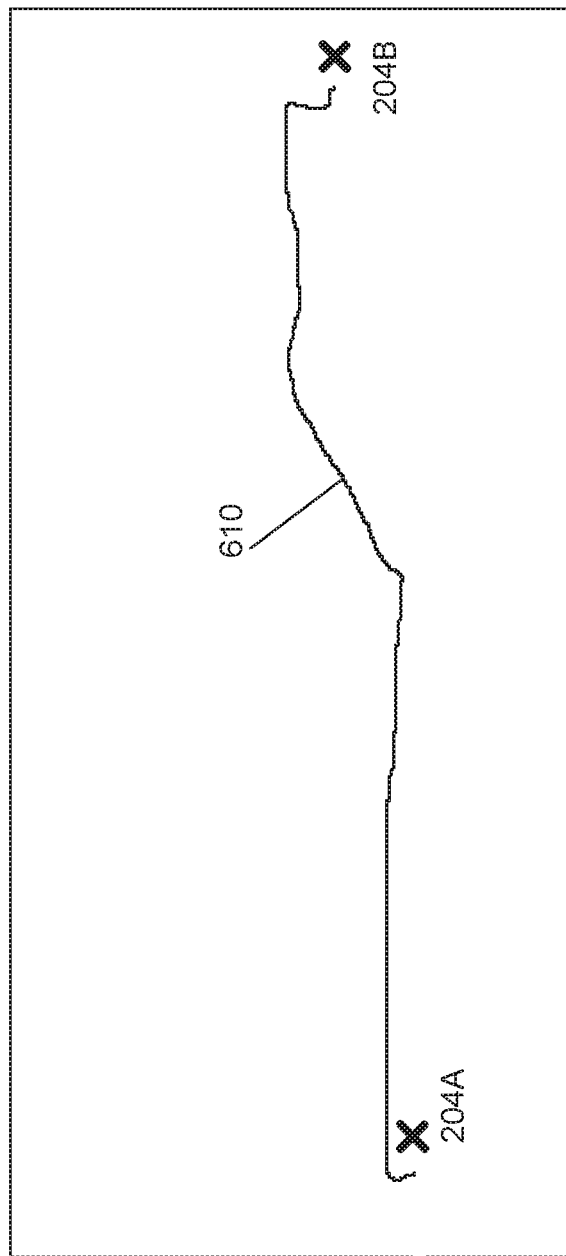

PRESENTING NON-RECOMMENDED ROUTES

TECHNICAL FIELD

The disclosure generally relates to acquiring and displaying map and routing data on a device.

BACKGROUND

Mobile devices, such as smartphones, tablet computers, smart watches, and other computing devices, often include applications that provide interfaces that allow users to utilize services from network service providers. An example of such applications and/or services a map and/or navigation application and/or service (e.g., Apple Maps). For example, while a user is using a map application on a mobile device, the map application can use a network connection (e.g., Internet connection) to obtain map data (e.g., map images, navigational data, estimated time of trip, ETA, traffic conditions, etc.) from a map service over the network connection. The map application can then provide various map related services to the user using the map data received from the map service. For example, the map application can inform a user when there is traffic or an accident on a route between the user's location and a destination. However, users who are familiar with a route may not always check the map application before leaving on a trip, and the map application may not always route the user around traffic incidents in a way that fits the user's specific needs.

SUMMARY

In some implementations, a computing device can proactively determine a destination and request traffic information for routes from a starting location to the destination. In some implementations, a computing device can identify some routes between a starting location and a destination as non-recommended routes and recommend other routes. In some implementations, a computing device can rank routes between a starting location and a destination based on automatically-determined user interest. In some implementations, a computing device can determine a user is familiar with a route and adjust the information presented to the user about the route accordingly.

Particular implementations provide at least the following advantages. Based on location data automatically gathered by a device, the device can determine travel destinations and proactively request traffic information for these locations from a server. The device can proactively notify the user of abnormal traffic conditions even if the user does not open a map application. The device can receive and store recommended route information from the server to improve efficiency of future traffic information requests. The server can identify non-recommended routes based on traffic conditions so the device can advise when a non-recommended route exists and reroute. The device can rank possible routes by expected user interest in the routes based on the location data gathered by the device. The device can determine that a user is familiar with how to get to a destination and present navigation information tailored to a user familiar with the route (e.g., less extensive information). The device can present the tailored navigation information even if the user does not open a map application. A user may be able to switch between less extensive information and complete information in the map application.

Details of one or more implementations are set forth in the accompanying drawings and the description below. Other features, aspects, and potential advantages will be apparent from the description and drawings, and from the claims.

DESCRIPTION OF DRAWINGS

FIGS. 2B-2G show example maps with routes between routing locations marked thereon.

FIG. 6C shows an example route.

Like reference symbols in the various drawings indicate like elements.

DETAILED DESCRIPTION

Overview

Figure 1:
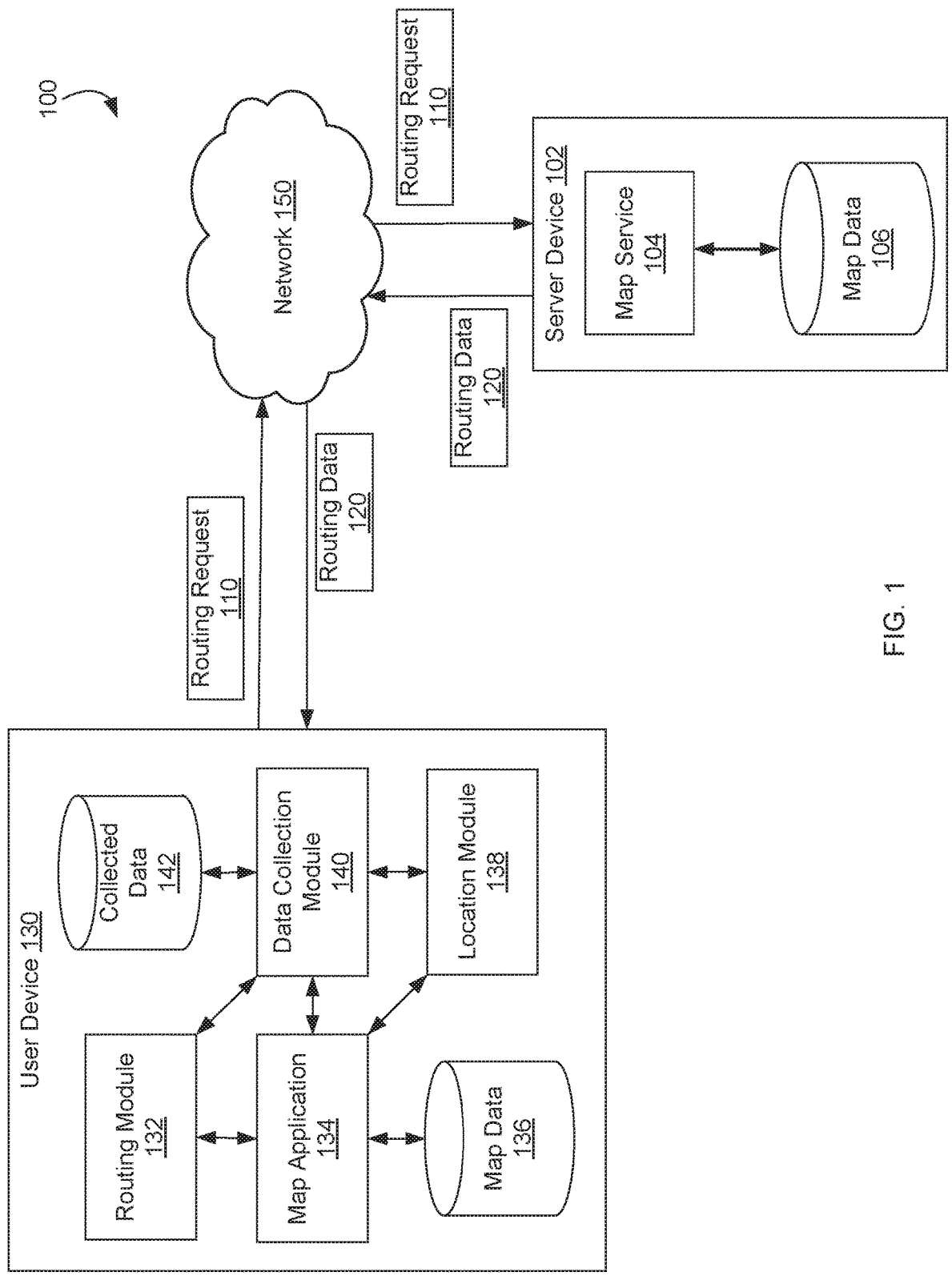
FIG. 1 is a block diagram of an example system for acquiring and displaying map and routing data.

FIG. 1 is a block diagram of an example system 100 for acquiring and displaying map and routing data. For example, system 100 can include a map application that allows a user to view maps, search the maps, select locations on the maps, view directions between locations on the maps, receive navigation instructions, and/or perform other tasks. The map application can be installed on a computing device and can obtain map information from a server device through a network connection.

In some implementations, system 100 can be configured to proactively determine locations between which a user frequently commutes and/or determine routes on which a user frequently travels. For example, in the disclosed implementations, system 100 can perform proactive determination automatically and without user input prior to a time at which system 100 anticipates the user may be interested in commute data for the locations and/or routes. System 100 can determine when a user should leave to reach a location given current traffic conditions. System 100 can advise a user of problems on a route. System 100 can determine when a commonly-used route should not be recommended based on traffic conditions and identify alternatives. For example, a direct highway route between locations may be experiencing unusually heavy traffic and delays due to an accident. The accident and traffic may add enough time to the route that a different route (e.g., a route using mostly surface roads) may be significantly faster. System 100 can provide less extensive navigation information to a user when the user is familiar with a route. For example system 100 can provide suggestions for deviating from the route to avoid traffic problems instead of complete turn-by-turn navigation.

In some implementations, these alerts and/or alternative routes can be determined and/or presented even when the user has not requested routing or navigation information. Thus, the alerts and/or alternative routes can be presented in anticipation of the user traveling along the one or more non-recommended routes.

In some implementations, system 100 can include server device 102. For example, server device 102 can represent a computing device or multiple computing devices associated with a map services provider. A map services provider can provide data such as map information, navigation information, and/or information about points of interest. Server device 102 can correspond to well-known server hardware architectures and include processors for performing operations for providing map services, such as the routing and notification services described herein.

In some implementations, server device 102 can include map service 104. For example, map service 104 can be executed by a software server that provides backend processing for a map service provider. Map service 104 can, for example, obtain map data (e.g., map images, points of interest, etc.) from map data database 106 and send the map data to various client devices (e.g., user device 130) so that the client devices can present maps to the users of the client devices. Map service 104 can determine navigation and/or routing information using map data in map data database 106 and other data (e.g., real-time traffic data) and send the navigation and/or routing information to the client devices (e.g., user device 130) so that the client devices can present navigation information to the users of the client devices. Map service 104 can also send offline map data from map data database 106 to allow user device 130 to provide some map functions when user device 130 is offline in some implementations. For example, map service 104 can send map data to a client device while the client device is connected to server device 102 through network 150 (e.g., the Internet). The client device can present the map and/or navigation data to the user using a map or navigation application on the client device. The data can be presented through a graphical user interface (UI) of the application and/or through notifications that can pop up on a home screen of the client device and/or during operation of other applications.

In some implementations, map service 104 can provide traffic and/or routing data to user device 130. For example, map service 104 can provide traffic and/or routing data in response to a proactive automatic traffic (e.g., an automatic request without user input) and/or routing data request or a user-initiated request.

In some implementations, system 100 can include user device 130. For example, user device 130 can be a mobile device, such as a smartphone, tablet computer, laptop computer, smartwatch, or other computing device. In some implementations, user device 130 can include and/or be configured to work with an in-vehicle computer system (e.g., Apple Carplay and/or in-vehicle navigation and/or entertainment units).

In some implementations, user device 130 can include map application 134. For example, map application 134 can be a client application of map service 104. Map application 134 can request map data from map service 104. Map service 104 can send the map data to map application 134 through network 120.

In some implementations, user device 130 can include routing module 132.

Routing module 132 can be a component of map application 134 or a separate application. Routing module 132 can generate routing requests 110 automatically or in response to user input. Some routing requests 110 can specify a start point and end point for a requested route. Some routing requests 110 can specify a route and request traffic information for the specified route. User device 130 can send routing requests 110 to server device 102 through network 150. Server device 102 can respond by sending routing data 120 to user device 130 through network 150. Routing data 120 can include one or more routes and/or traffic data for one or more routes.

In some implementations, user device 130 can store data in map data database 136. For example, when user device 130 receives routing data 120 from map service 104 and/or other data from map service 104 (e.g., historical speed and/or traffic data for routes, as discussed below), map application 134 can store routing data 120 and/or other data in map data database 136. Map application 134 can then use the data stored in map data database 136 to provide map related services such as notifications and/or navigation assistance.

In some implementations, user device 130 can include location module 138. Location module 138 can determine the location of user device 130. For example, location module 138 can use data gathered by a global position system (GPS) receiver of user device 130 and/or a Wi-Fi receiver of user device 130 to determine the location of user device 130. Location module 138 can determine the location of user device 130 periodically and/or in response to a request from another module. For example, map application 134 can request the location of user device 130 and show the location of user device 130 on a map GUI.

In some implementations, user device 130 can include data collection module 140. Data collection module 140 can monitor data generated and/or received by user device 130. Data collection module 140 can store at least a portion of the monitored data and/or generate metadata describing at least a portion of the monitored data.

For example, data collection module 140 can monitor location data generated by location module 138. By monitoring this data, data collection module 140 can determine relevant locations for a user of user device 130. Relevant locations can include places a user frequents and/or places to which a user plans to go. For example, if location module 138 reports the user device 130 as being in a particular location almost every evening between the hours of 10 PM and 6 AM, data collection module 140 can determine that the particular location is the user's home based on this pattern. If location module 138 reports the user device 130 as being in a particular location every weekday between the hours of 9 AM and 5 PM, data collection module 140 can determine that the particular location is the user's place of employment or school based on this pattern. If location module 138 reports the user device 130 as frequently visiting certain locations for extended periods of time, data collection module 140 can determine that these are locations the user may be interested in visiting again (e.g., favorite restaurants, bars, stores, or other establishments; homes of acquaintances;

etc.). In some implementations, data collection module 140 can perform the monitoring according to the teachings of U.S. Pat. No. 9,615,202, the entirety of which is incorporated by reference herein.

In another example, data collection module 140 can monitor user-entered data. A user can interact with user device 130 applications, including map application 134 and other applications that are not shown. For example, a user may use map application 134 to search for restaurants and hotels in a particular area. The user may use a calendar application to schedule meetings in a particular location. The user may use a web browser application or other application to make reservations for travel and dining. The user may receive reservation confirmations in an email application. These actions can cause user device 130 to generate data indicating one or more locations (e.g., the locations of the meetings, travel destination locations, restaurant locations for the reservations, etc.). By monitoring this data, data collection module 140 can determine that these one or more locations may be relevant locations for the user of user device 130.

In some implementations, user device 130 can explicitly define locations as relevant locations. For example, a user may be able to use a GUI to define a particular location as their home, office, school, or other notable location. User device 130 can store data describing defined relevant locations in collected data database 142. For example, the stored data can include location coordinates (e.g., latitude and longitude), location names (e.g., user-assigned names and/or names in general use such as the name of an establishment), and/or location addresses.

In some implementations, user device 130 can store collected data in collected data database 142. For example, data collection module 140 can store at least a portion of the monitored data indicating locations the user has visited or locations the user might visit and/or data describing the monitored data in collected data database 142 (e.g., addresses and/or coordinates that describe the monitored data without including details such as the nature of the location (home, school, restaurant, etc.)). The stored data may describe a collection of potential relevant locations. Accordingly, collected data database 142 can store data indicating one or more potential relevant locations. For example, the stored data can include location coordinates (e.g., latitude and longitude), location names, and/or location addresses.

In some implementations, data collection module 140 can monitor not only relevant locations, but also times at which user device 130 frequently travels to the relevant locations. For example, data collection module 140 can identify a home location (either through data collection or through user entry) and times at which user device 130 arrives at the home location each day. In many cases, a user may arrive at home, work, or school at or near the same time each day. Data collection module 140 can store a record of the time at which the user arrives home each day and/or an average of several days' arrivals in collected data database 142.

In some implementations, data collection module 140 can monitor not only relevant locations, but also routes user device 130 frequently travels between the relevant locations. For example, location module 138 can periodically determine the location of user device 130. When user device 130 leaves a relevant location (e.g., home), data collection module 140 can collect location module 138 as it is determined. When user device arrives at another relevant location (e.g., work), data collection module 140 can store a record of the locations determined by location module 138 during the time when user device 130 is moving between home and work. In some implementations, data collection module 140 can determine frequently-used routes between the relevant locations using the methods disclosed in U.S. patent application Ser. No. 13/773,866 (published as U.S. Patent Publication No. 2013/0166208), the entirety of which is incorporated by reference herein.

System 100 is illustrated as comprising server device 102 and user device 130, each of which further comprise several discrete elements (e.g., map service 104 and map data database 106 of server device 102; routing module 132, map application 134, map data database 136, location module 138, data collection module 140, and collected data database 142 of user device 130). In some implementations, elements within the respective devices (server device 102 and user device 130) can be combined or separated. For example, some elements of user device 130 can be sub-elements of a single map element or operating system element. In some implementations, map data database 136 and collected data database 142 can be parts of a single memory system of user device 130. In some implementations, functions of the various elements may be further partitioned and handled by individual elements not shown (e.g., the functions of location module 138 can be performed by a separate GPS module and WiFi module, etc.).

Routing Examples

FIGS. 2A-2G illustrate several views of a map 200 with routing locations 204A and 204B and several alternate routes 206A-F between routing locations 204A and 204B. These examples illustrate how routing module 132 and map service 104 can use data determined by data collection module 140 and live traffic data (e.g., data determined by map service 104 or a traffic service describing traffic conditions in real time or near real time) to identify recommended and/or non-recommended routes, prioritize routes for display to the user, and provide information about the routes. Throughout the specification, routes 206A-F will be used as examples, however, map application 132 and/or map service 104 may generate different or alternate routes depending on the user's behavior and/or needs.

Figure 2A:
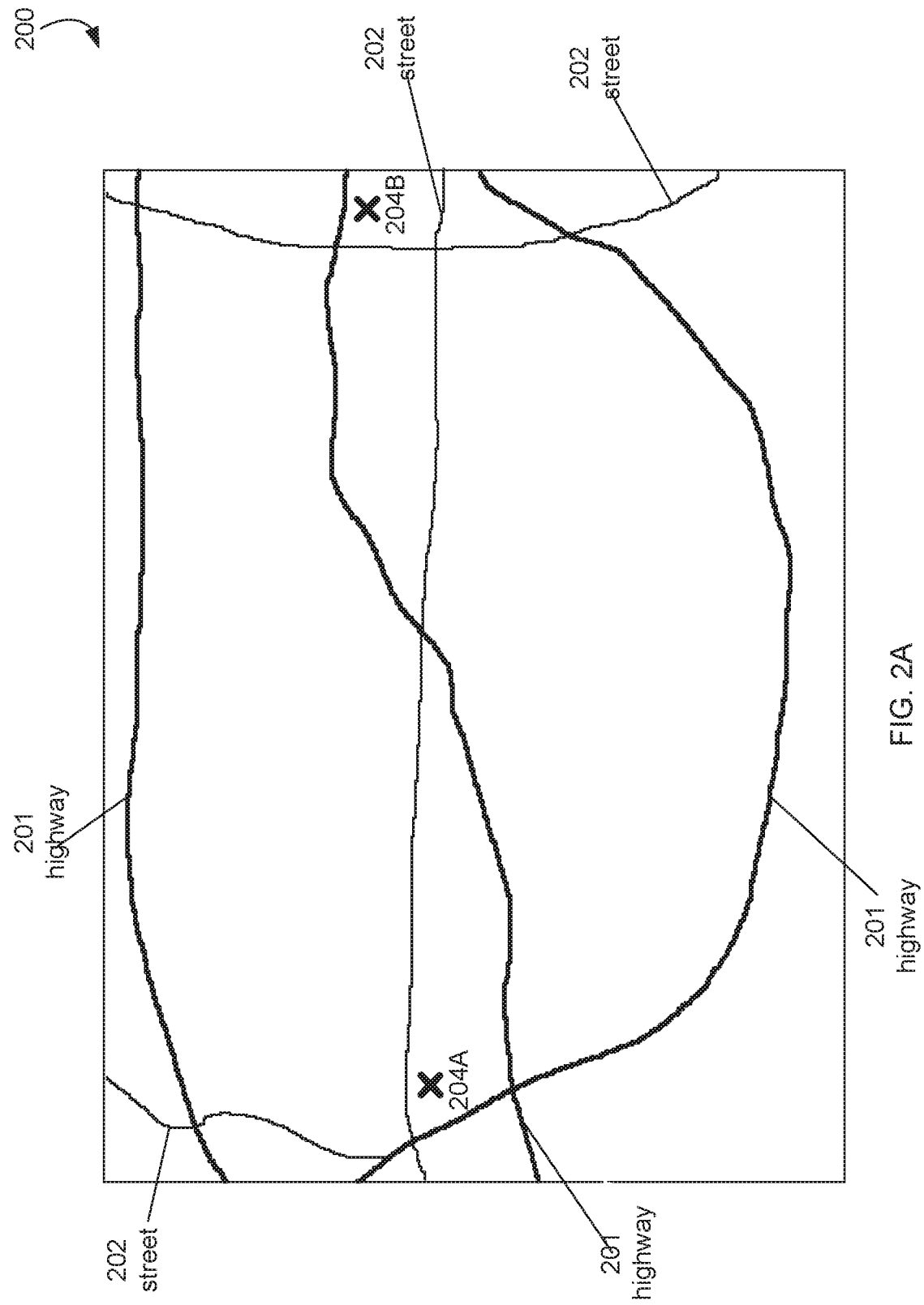
FIG. 2A shows an example map with routing locations marked thereon.

FIG. 2A shows an example map 200 with routing locations 204A and 204B marked thereon. Map 200 presents an example area having multiple roads between routing locations 204A and 204B. In some implementations, map application 134 can display map 200 on a display of user device 130. For ease of visualization, map 200 is represented with only major highways 201 and major surface streets 202 illustrated. However, in some implementations, additional features such as smaller roads, bodies of water, places of business, landmarks, etc., can be presented on map 200.

Routing locations 204A and 204B can be determined by data collection module 140. Routing locations 204A and 204B determined by data collection module 140 can be places where user device 130 is often located for extended periods of time. For example, one routing location 204A may be the user's home, and the other routing location 204B may be the user's office. In some implementations, data collection module 140 can identify other routing locations, such as the user's school, favorite restaurants or bars, homes of friends or family members, etc. Routing locations can be user-specified in some implementations. For example, a user can define a home location 204A and/or office location 204B.

In some implementations, routing locations 204A and 204B can be determined based on the time of day. For example, data collection module 140 can determine home and office locations as described above. Data collection module 140 can also determine when the user is likely to travel to home or office location based on a pattern of movement or travel that indicates that the user is likely to go home, or go to the office, or go to some other location at, or around, a particular time of day.

In some implementations, routing locations 204A and/or 204B can be determined based on the current location of user device 130. For example, if the user is at work (e.g., current location) at 6 PM, then data collection module 140 can determine that the user typically travels from work to home at 6 PM and determine that location 204A (e.g., start location) corresponds to the work location and that location 204B (e.g., destination location) corresponds the home location. However, if user device 130 is at the home location at 6 PM, then data collection module 140 may determine that the user is not going to travel from work to home, but instead may travel from home (e.g., location 204A) to the gym (e.g., location 204B) for the user's evening workout. Thus, locations 204A and/or 204B can be determined based on time of day and/or the current location of user device 130.

In some implementations, routing locations can be defined in response to a user request for routing information. For example, a user can interact with map application 134 to define a start point and an end point for routing. The start point can be a current location of user device 130 as determined by location module 138 or a user-selected location (e.g., an address, coordinates, or predefined location such as a predefined home location). The end point can be a user-selected location (e.g., an address, coordinates, or predefined location such as a predefined home location).

Figure 2B:
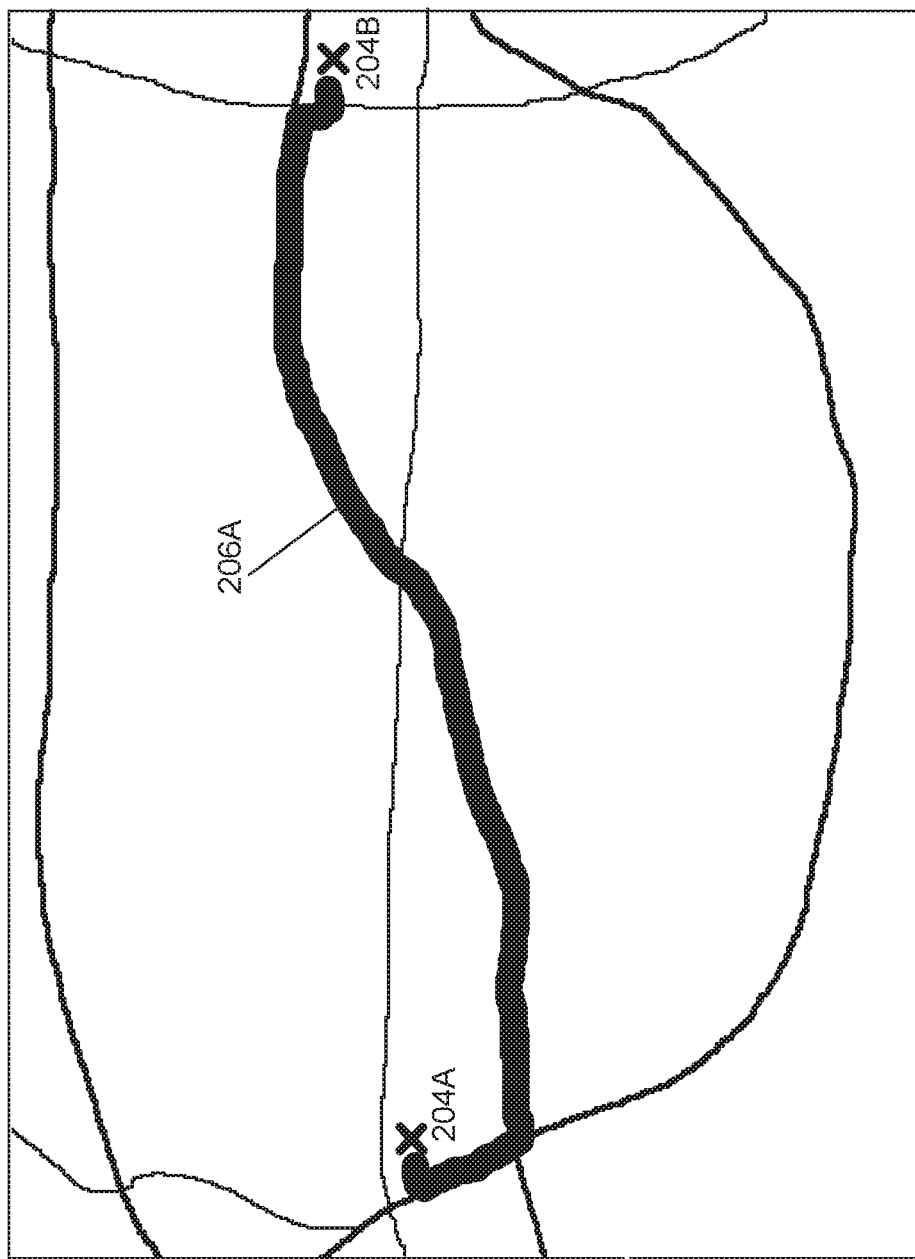
Figure 2C:
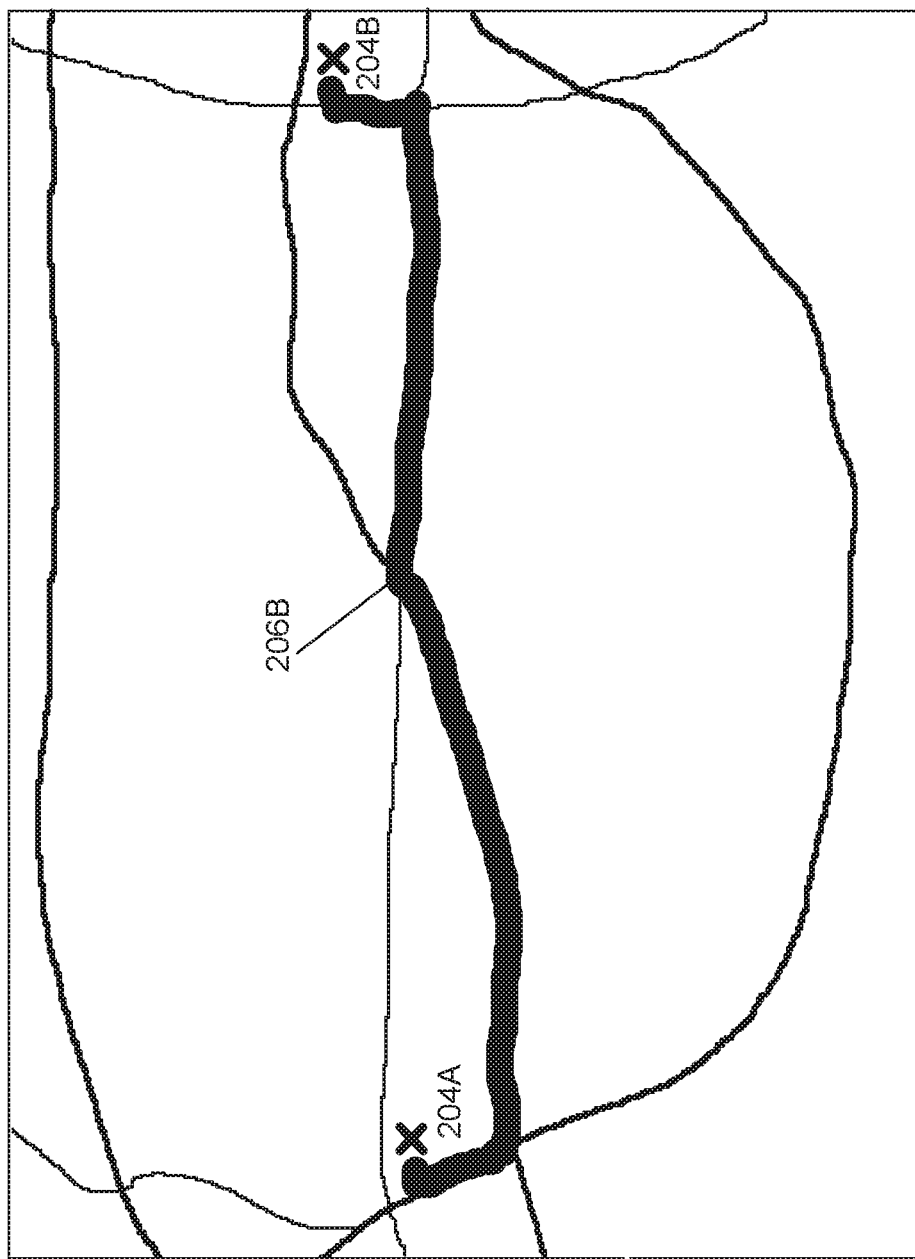
Figure 2D:
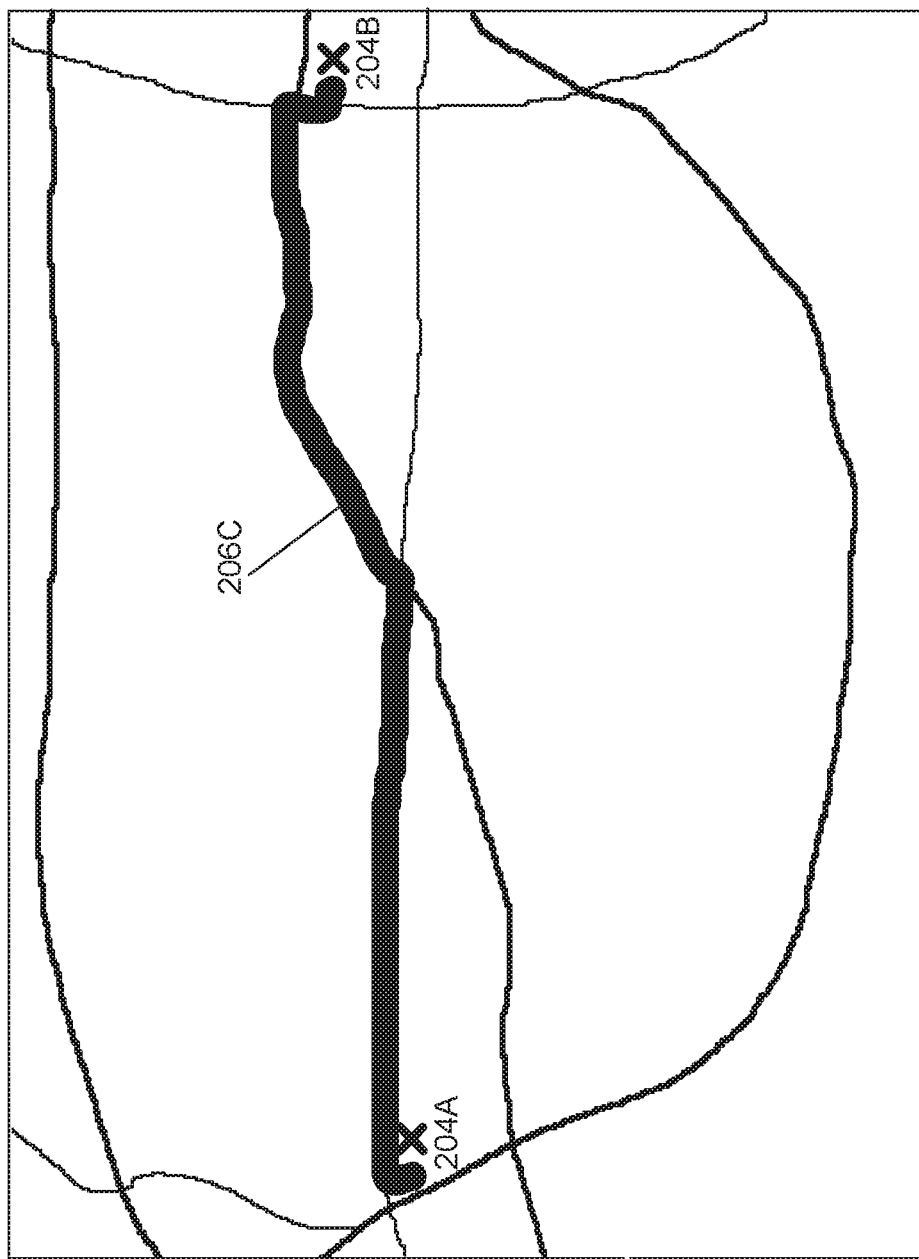
Figure 2F:
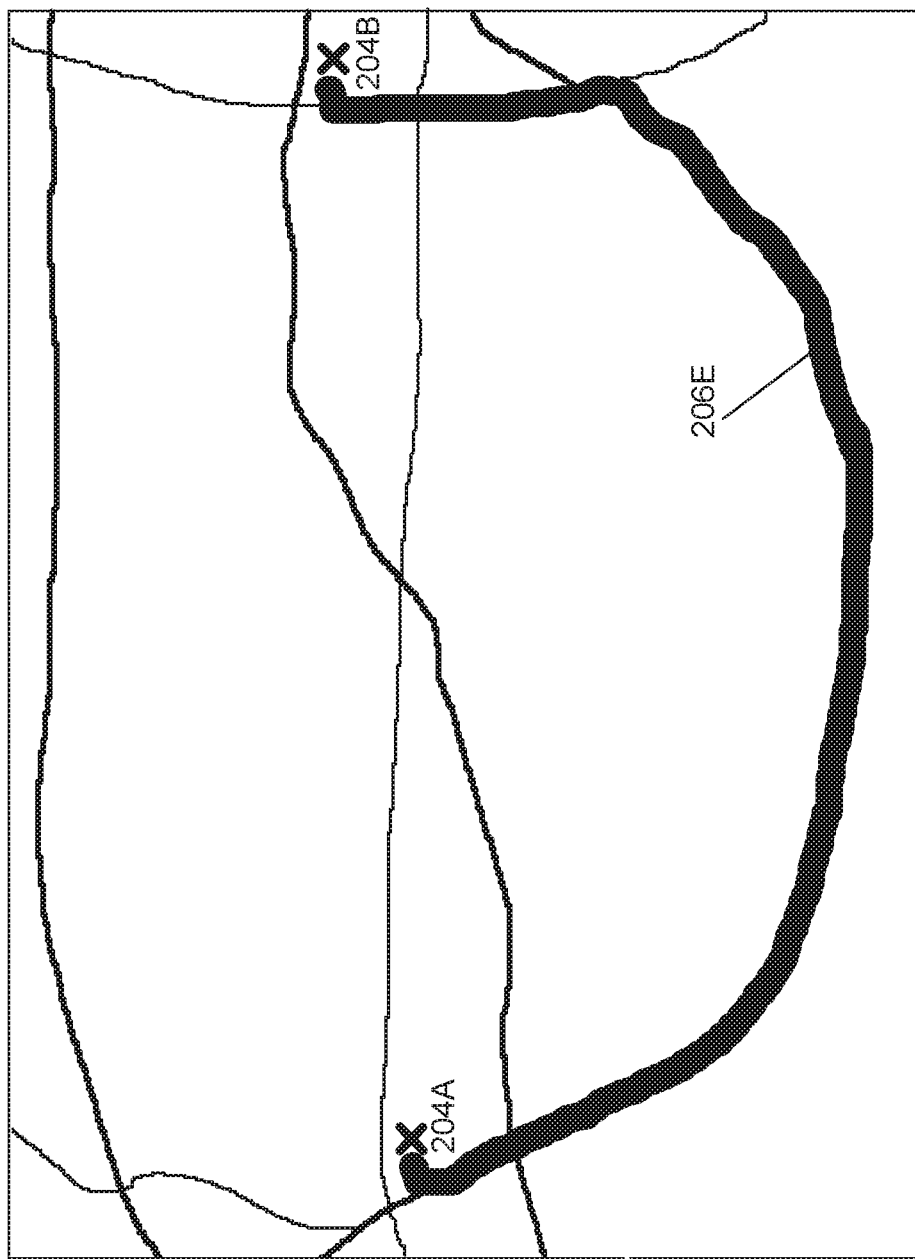

FIGS. 2B-2G show example maps with routes between routing locations 204A and 204B marked thereon. For example, FIG. 2B shows route 206A, which is the most direct route between routing locations 204A and 204B that is mostly highway. FIGS. 2C and 2D show routes 206B and 206C, respectively, which are routes that deviate partially from route 206A onto surface roads. FIGS. 2E and 2F show routes 206D and 206E, respectively, which are alternative routes between routing locations 204A and 204B that are mostly highway. FIG. 2G shows route 206F, which is a direct route between routing locations 204A and 204B, but a route that is entirely on surface roads.

Non-Recommended Routes

In some implementations, routing module 132 and map service 104 can evaluate one or more routes between locations to determine whether any of the routes should not be recommended and provide alerts and/or alternatives. For example, in the context of FIGS. 2A-2G, there may be several logical and/or commonly-used routes 206A-206F between routing locations 204A and 204B. However, due to traffic conditions and/or incidents, one or more routes 206A-206F may sometimes take significantly longer to traverse than usual. When a route is predicted to be subject to significant delays, map service 104 can determine the route is a non-recommended route. When map service 104 identifies one or more non-recommended routes, routing module 132 can cause user device 130 to display alerts and/or alternative routes. These alerts and/or alternative routes can be determined and/or presented even when the user has not requested routing or navigation information (e.g., through map application 134). Thus, the alerts and/or alternative routes can be presented in anticipation of the user traveling along the one or more non-recommended routes.

Figure 3:
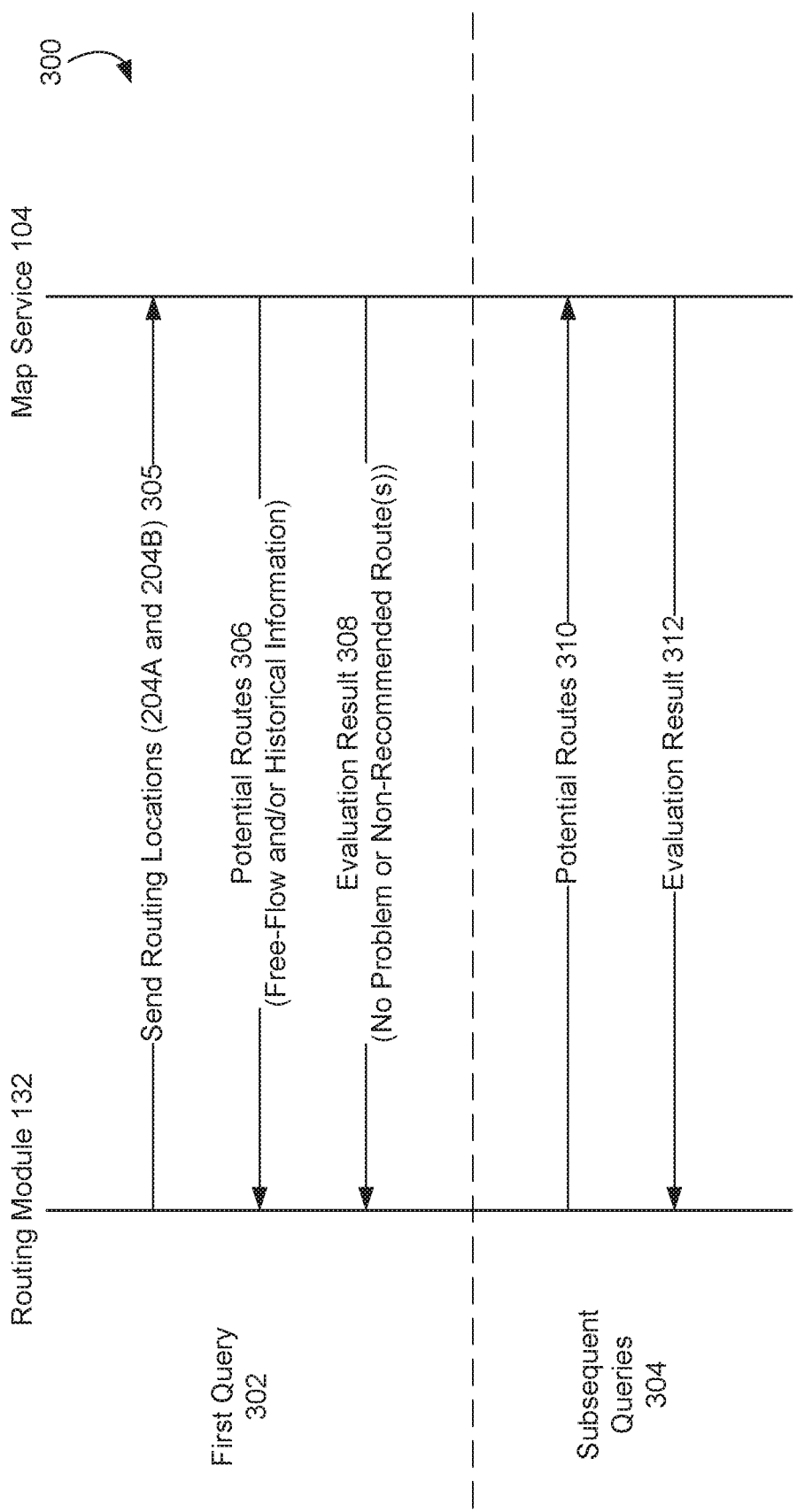
FIG. 3 shows an example ladder diagram for route evaluation performed by a user device and a server device.

FIG. 3 shows an example ladder diagram 300 for route evaluation performed by user device 130 and server device 102. User device 130 and server device 102 can perform route evaluation to identify non-recommended routes between routing locations 204A and 204B. User device 130 and server device 102 can perform the route evaluation proactively (e.g., in anticipation that the user will travel between locations 204A and 204B based on observed user behavior) and/or in response to user request. First, user device 130 and server device 102 can identify one or more recommended routes. Recommended routes may be routes that are expected to be fastest under free-flow traffic conditions (e.g., conditions where traffic speeds are at least the speed limit), or typical traffic conditions (e.g., historical average traffic conditions for a given time and day). After one or more recommended routes are established, user device 130 and server device 102 can determine whether one or more of the recommended routes are non-recommended routes due to traffic issues such as dense traffic, road closures, accidents, weather conditions, etc. If any non-recommended routes are found, user device 130 and server device 102 can provide notification to the user and/or recommend alternate routes.

To initiate the route evaluation, routing module 132 of user device 130 can query map service 104 of server device 102 for routes between routing locations 204A and 204B in operation 305. In some implementations, routing module 132 can automatically query map service 104 without a user command. For example, data collected by data collection module 140 can indicate that a user typically leaves for their office at approximately 8:30 AM and arrives at approximately 9:00 AM. Accordingly, routing module 132 can query map service 104 before 8:30 AM. In some implementations, routing module 132 can define a target departure time and start querying map service 104 within a commute window prior to the target departure time. Routing module 132 can attempt to query map service 104 starting 60 minutes prior to the target departure time at 15 minute intervals, for example. In the example where the user leaves at 8:30 AM, routing module 132 can start attempting queries at 7:30 AM. In some implementations, routing module 132 can query map service 104 in response to a user command requesting routing information between routing locations 204A and 204B.

In some implementations, to conserve user device 130 battery power usage, routing module 132 may only query map service 104 when user device 130 is in an active mode, as opposed to operating in a low power mode. For example, routing module 132 can have a target query time (e.g., a time determined by user device 130 prior to when the user is expected to leave, for example one hour before an average departure time for user device 130). Routing module 132 can define a window of several minutes before and after the target query time during which routing module 132 can opportunistically send the query. For example, this window may start 5 minutes before and end 5 minutes after the target query time. Thus, if user device 130 is plugged into power 5 minutes before the target query time, routing module 132 can query map service 104 at the start of the window. If user device 130 wakes up from a low power mode within the window (e.g., due to user interaction or other scheduled tasks), routing module 132 can query map service 104 while user device 130 is awake (e.g., when user device 130 is active due to an active display screen, an unlocked input device, an active use of one or more radios for WiFi, GPS, or cellular communications, etc.).

The first time routing module 132 generates a query 302 for a given set of routing locations 204A and 204B, routing module 132 can send data describing routing locations 204A and 204B to map service 104 at operation 305. For example, routing module 132 can send latitude and longitude coordinates for each routing location 204A and 204B, or routing module 132 can send street addresses for each routing location 204A and 204B.

Map service 104 can identify one or more potential recommended routes 306. For example, map data database 106 can store free flow and historical traffic data for some or all roads between routing locations 204A and 204B. Map service 104 can identify the fastest routes between routing locations 204A and 204B under free-flow conditions. For example, in some implementations, map service 104 can identify the three fastest routes. In some implementations, map service 104 can designate the fastest routes under free flow conditions as the potential recommended routes 306.

Map service 104 can check historical traffic data for the identified routes to determine whether any of the routes are expected to be slower than they typically are at the time of the query. For example, route 206A (in FIG. 2B) is the most direct highway route between routing locations 204A and 204B. However, in one example scenario, route 206A may be heavily traveled during rush hour, and the average speed of traffic may fall from a free-flow speed of 65 miles per hour to 25 miles per hour along route 206A. Map data database 106 can store historical data indicating traffic speed is slow during rush hour (e.g., between the hours of 3:30 and 6:30 PM). In some implementations, map service 104 can identify the fastest routes between routing locations 204A and 204B under historical conditions relevant to the query time and day (e.g., 4:30 PM on Thursday). For example, in some implementations, map service 104 can identify the three fastest routes using historical data for the query time and day. In some implementations, map service 104 can designate the fastest routes under relevant historical conditions as the potential recommended routes 306. For example, map service 103 can identify routes 206A, 206B, and 206D as potential recommended routes.

Map service 104 can evaluate potential recommended routes 306 to determine whether any of them should not be recommended due to current traffic issues or because traffic is heavy at the current time of day and/or day of the week. For example, map service 104 can receive live traffic updates from one or more traffic data reporting services. Map service 104 can determine, from the live traffic updates, whether any potential recommended routes 306 are slower than expected. For example, map service 104 can compare a time it would take to traverse a route under current traffic conditions with a free-flow time to traverse the route or a historical time to traverse the route. If the current time to traverse the route is greater than the free-flow or historical time (for the current time of day and/or day of week) to which it is compared by some threshold amount, map service 104 can determine the route is a non-recommended route that should not be recommended. For example, the threshold amount can be a percentage (e.g., if a route will take 10% longer than expected, do not recommend) or a time (e.g., if a route will take more than 10 extra minutes than expected, do not recommend). In some implementations, map service 104 can designate up to three non-recommended routes. For example, map service 104 can determine that route 206A should not be recommended because an accident has caused the time to traverse route 206A to double. Map service 104 can determine that route 206D should not be recommended because heavy traffic has caused a 20-minute increase in the time to traverse route 206D. Map service 104 can designate route 206A and route 206D as non-recommended routes.

After evaluating all potential recommended routes 306, map service 104 can provide evaluation result 308 to routing module 132. For example, if one or more non-recommended routes are found, evaluation result 308 can indicate which routes are not recommended. If map service 104 did not find any non-recommended routes, evaluation result 308 can indicate that there are no significant traffic issues on any potential recommended route 306.

When there are one or more non-recommended routes, map service 104 can provide one or more alternative routes in evaluation result 308. To determine alternative routes, map service 104 can discard non-recommended routes and evaluate one or more routes between routing locations 204A and 204B that are not the non-recommended routes against current live traffic conditions. In some implementations, map service 104 can determine up to two alternative routes and evaluate each of them against current live traffic conditions. Continuing the example of par. [0056] above, map service 104 can discard non-recommended routes 206A and 206D and identify routes 206E and 206F as alternatives. Map service 104 may also evaluate route 206C but find it to be affected by the same accident affecting route 206A, and therefore not select it as an alternative route.

In some situations, map service 104 may look for alternative routes but find no routes that are faster than the non-recommended routes. For example, potential recommended routes 206A, 206B, and 206D can all be non-recommended routes due to traffic conditions. Map service 104 can evaluate routes 206C, 206E, and 206F, but determine that none of these routes will take less time than at least one of non-recommended routes 206A, 206B, and 206D. Accordingly, evaluation result 308 can indicate that the best available route is a non-recommended route.

The aforementioned processing can be performed the first time routing module 132 requests routing information between specific routing locations (e.g., routing locations 204A and 204B), but the processing can be streamlined for future queries 304 involving the same routing locations. For example, routing module 132 can store potential routes 306 from map service 104 in map data database 136. On subsequent queries 304 for routing information between the same locations 204A and 204B, routing module 132 can send stored potential routes 306 to map service 104. Map service 104 can evaluate sent potential routes 310 without having to determine them from routing locations 204A and 204B as in the first query 302. Accordingly, map service 104 can return evaluation result 312 (e.g., one or more non-recommended routes or an indication that there are no problems) after performing less processing than for first query 302.

Because the first steps are skipped (e.g., operations 305-308), map service 104 can experience significantly reduced processing load (e.g., 25% improvement) for future queries 304 in comparison with first queries 302. As user devices 130 may query the same locations frequently (e.g., because the user may commute between the same places every day), this streamlining can provide substantial performance improvements for server device 102 over time.

In some implementations, routing module 132 can time stamp potential routes 306 when storing them in map data database 136. For example, when routing module 132 receives potential routes 306, routing module 132 can store the time at which the potential routes 306 were received in association with (e.g., as metadata, in the same record, etc.)

potential routes 306 in database 136. After a certain amount of time elapses (e.g., 1 day, 5 days, 2 weeks, etc.) from storing potential routes 306, routing module 132 can determine the potential routes 306 are too old to be valid. For example, new traffic patterns and/or new routes may be available between routing locations 204A and 204B. Accordingly, routing module 132 can delete the old potential routes 306 from memory after a threshold period of time has elapsed since potential routes 306 were stored in database 136, as determined based on the time stamp for each potential route 306. The next time routing module 132 queries map service 104 for routing information between routing locations 204A and 204B, routing module 132 can resend data describing routing locations 204A and 204B and repeat the entire process.

Figure 4A:
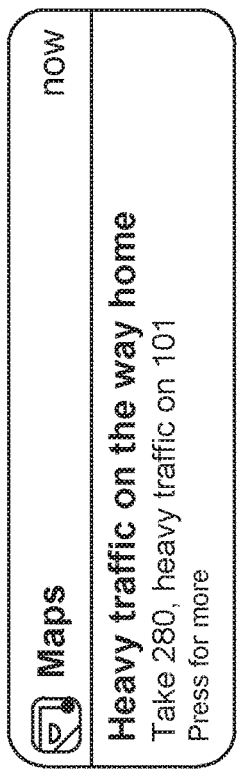
FIGS. 4A-4B show example notifications indicating non-recommended routes.
Figure 4B:
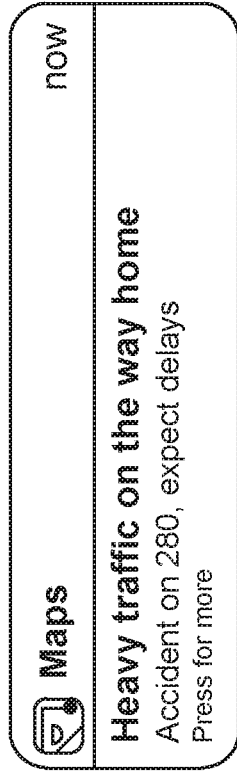

User device 130 can use evaluation results 308 to provide information to a user. For example, map application 134 can generate notifications to present to a user. FIGS. 4A-4B show example notifications indicating non-recommended routes. User device 130 can display non-recommended route notification 400 of FIG. 4A when evaluation results 308 include a non-recommended route and an alternative route. In this example, the starting location is a current location of user device 130, the ending location is home (e.g., a user-defined or automatically determined home location), and two possible routes between the current location and home are Route 101 and Route 280 (where the non-recommended route is Route 101, and the alternative route is Route 280). Map application 134 can generate title string 402 for non-recommended route notification 400 by inserting text describing a problem with the non-recommended route ("heavy traffic") and text describing a destination ("home"). Map application 134 can generate detail string 404 for non-recommended route notification 400 by inserting text describing the alternative route (suggested road name, e.g., "280"), text describing incident type ("heavy traffic"), and text describing the non-recommended route (non-suggested road name, e.g., "101").

User device 130 can display non-recommended route notification 450 of FIG. 4B when evaluation results 308 include a non-recommended route only. In this example, the starting location is a current location of user device 130, the ending location is home (e.g., a user-defined or automatically determined home location), and the non-recommended route is Route 280. Map application 134 can generate title string 452 for non-recommended route notification 450 by inserting text describing a problem with the non-recommended route ("heavy traffic") and text describing a destination ("home"). Map application 134 can generate detail string 454 for non-recommended route notification 450 by inserting a message related to the incident type ("expect delays").

In situations where evaluation results 308 include no non-recommended routes, map application 134 may not generate a notification.

Figure 5:
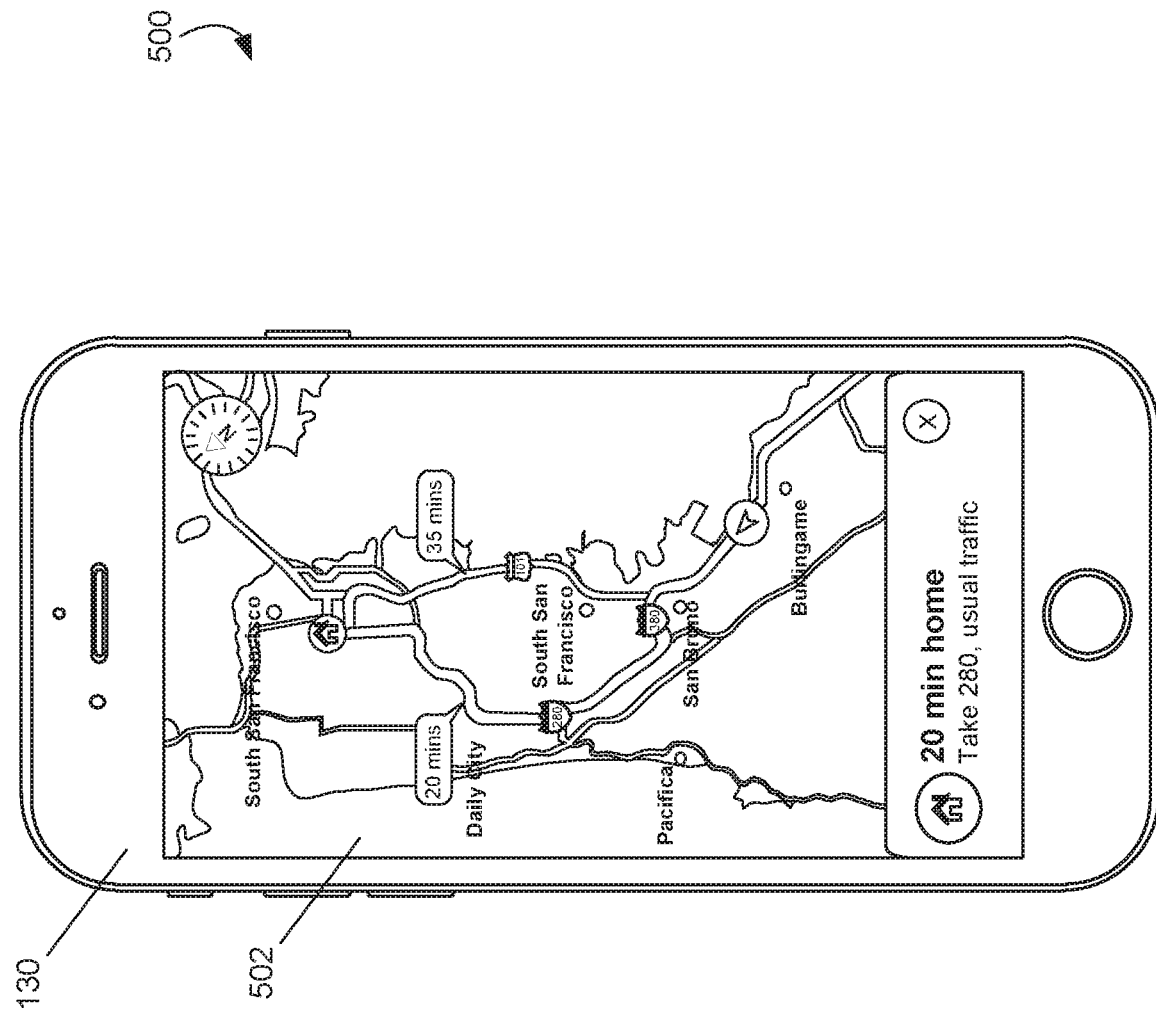
FIG. 5 shows an example map navigation interface.

The user may select the notification (e.g., tap on the notification) to view more details about the evaluation results 308. FIG. 5 shows an example map navigation GUI 500. Non-recommended route notification 400 or 450 can appear on a home or lock screen of user device 130 or pop up over a currently active application, for example. A user can select non-recommended route notification 400 or 450, causing user device 130 to switch to map application 134 (e.g., Apple Maps). Map application GUI 500 can display map 502 that includes the starting point and destination and information related to evaluation results 308 displayed thereon. For example, evaluation results 308 triggering non-recommended route notification 400 include a non-recommended route and an alternative route. Map 502 can display the alternative route. In some implementations, the alternative route may be labeled as an alternative route, shaded differently from the non-recommended route, or otherwise visually represented as an alternative route. Evaluation results 308 triggering non-recommended route notification 450 include a non-recommended route only. Map 502 can display the non-recommended route, including illustrating where the traffic incident is causing a slowdown.

In some implementations, user device 150 may cache and/or otherwise store notifications and/or a subset of notification data locally. For example, a single incident may cause traffic problems on a route multiple days in a row (e.g., a road closure due to construction or some other long term issue). A user may be made aware of the incident after it first occurs, but may no longer need notifications thereafter, because the user may understand that the incident is long term in nature. User device 150 may store notification data so that if notifications describing the same incident on the same route are received multiple times, user device 150 can avoid showing multiple notifications.

As described above, evaluation results 308 can provide information about non-recommended routes, and user device 150 can present notifications about the non-recommended routes. Evaluation results 308 can include information about a non-recommended route such as a destination ID and an incident ID. The destination ID can uniquely indicate the destination for the route. The incident ID can uniquely indicate the incident. For example, map service 104 may generate incident IDs and/or may receive incident IDs from incident reporting services with which map service 104 communicates to receive incident data. Evaluation results 308 received by user device 150 may include these destination IDs and incident IDs for non-recommended routes, where the destination ID can label the route and the incident ID can label the specific incident causing the route to be non-recommended.

The first time user device 150 receives evaluation results 308 including a specific destination ID and incident ID combination, user device 150 may display a non-recommended route notification as described above. If user device 150 receives subsequent evaluation results 308 including the same specific destination ID and incident ID combination, user device 150 may refrain from displaying the non-recommended route notification, because user device 150 has already notified the user about the incident on the route.

To facilitate suppression of subsequent non-recommended route notifications for the specific destination ID and incident ID combination, user device 150 may store the specific destination ID and incident ID combination in local memory when it is first received. In some implementations, user device 150 may store the specific destination ID and incident ID combination with a time stamp. Accordingly, user device 150 may suppress subsequent non-recommended route notifications for the specific destination ID and incident ID combination for a specific length of time. For example, user device 150 may suppress the subsequent non-recommended route notifications for the specific destination ID and incident ID combination for 7 days after the time stamp time (or 3 days, 5 days, 2 weeks, or any other desired length of time).

Because user device 150 can store the specific destination ID and incident ID combination as a combination, user device 150 may still provide notifications for other routes (e.g., identified by other destination IDs) affected by the same incident. User device 150 may still provide notifications for other incidents (e.g., identified by other incident IDs) affecting the same route.

Ranking Routes

In some implementations, routing module 132 can use frequently-used route information to rank routes for presentation to the user. As disclosed above, data collection module 140 can monitor routes that user device 130 frequently travels between locations. When map service 104 returns multiple routes between routing locations 204A and 204B, routing module 132 can determine which route or routes may be most appealing to the user based on past behavior. Routing module 132 can rank the routes and use the ranking to determine which route or routes to suggest to the user.

In some implementations, location module 138 can occasionally determine the location of user device 130. For example, when map application 134 is active, location module 138 can periodically determine user device 130 location so that map application 134 can show the position of user device 130 on a displayed map. When map application 134 is providing navigation information to a user, location module 138 can periodically determine user device 130 location so that map application 134 can determine and display navigational guidance instructions to the user. Other applications (not shown) can also use user device 130 location data, and location module 138 can determine user device 130 location for these other applications. For example, ride sharing applications, web browsing applications, weather applications, social media applications, food delivery applications, and/or many others may use location data.

In some implementations, data collection module 140 can record the positions of user device 130 over time. For example, every time location module 138 determines the location of user device 130 in support of map application 134 or other applications, data collection module 140 can record the location data in collected data database 142. Over time, the recorded location data in collected data database 142 can provide a record of how the user travels between locations.

Figure 6A:
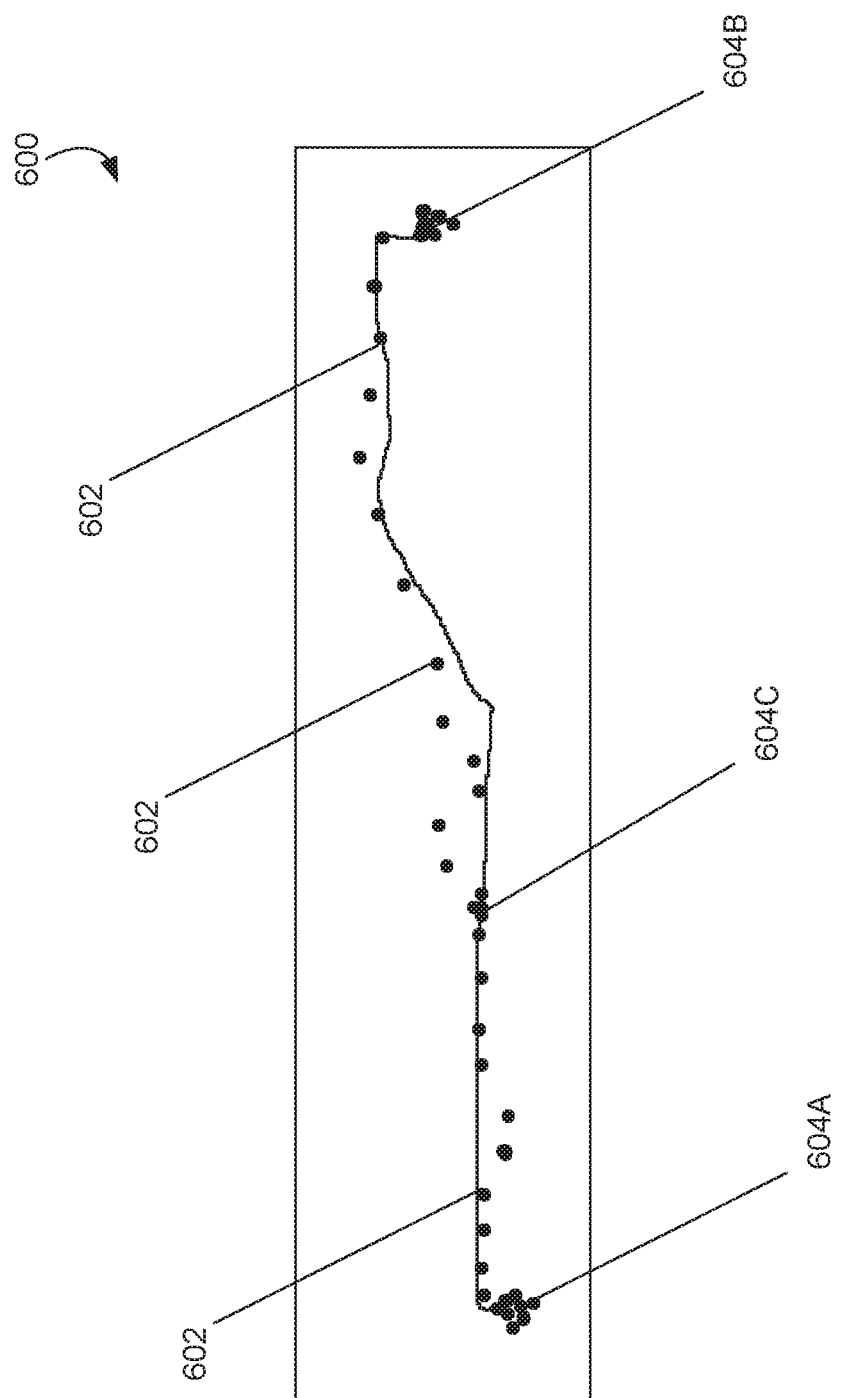
FIG. 6A shows an example location progression.

For ease of illustration, and to explain how recorded locations can yield route rankings, a subset of recorded user device 130 locations can be regarded as a location progression. The location progression can comprise a series of locations determined by location module 138. FIG. 6A shows an example location progression 600. Each point in location progression 600 represents one of a sequence of recorded locations 602.

The sequence of recorded locations 602 can define a route between locations. Continuing an example discussed above, data collected by data collection module 140 can indicate that a user typically leaves home for their office at approximately 8:30 AM and arrives at approximately 9:00 AM. For example, recorded locations 602 in location progression 600 can be locations recorded between 8:30 AM and 9:00 AM on a Monday. Clusters 604A, 604B, and 604C are respective series of recorded locations 602 grouped closely together in space and time. For example, cluster 604A may include locations 602 recorded first in the sequence, before the user leaves home. Cluster 604B may include locations 602 recorded last in the sequence, after the user arrives at the office. Cluster 604C is a smaller cluster that may represent a brief slowdown or stop in the user's commute (e.g., a coffee shop the user likes to stop at on the way to work every morning).

Assuming the user commutes to work the same way most days, data collection module 140 can record a pattern similar to location progression 600 most weekday mornings. It may be unlikely for the exact location progression 600 to repeat due to variables such as differences in commute timing, occasional deviations from the route, and/or differences in timing of location checks by location module 138. However, over time, data collection module 140 can record a large number of locations 602 along similar progressions at similar times of day.

In some implementations, data collection module 140 can form routes from location progressions 600. For example, data collection module 140 can identify clusters 604A and 604B as start and end points of a journey, because clusters 604A and 604B include a large number of closely-spaced locations 602 collected over an extended period of time. For example, cluster 604A can include location data from the time a user arrives at home at night to the time the user leaves for work. Cluster 604B can include location data from the time the user arrives at work to the time the user leaves for home. Accordingly, clusters 604A and 604B can signify that the user is in a specific location for a long time. On the other hand, the more widely-spaced locations 602 between clusters 604A and 604B can be collected sequentially and can indicate movement between clusters 604A and 604B. Data collection module 140 can recognize the more widely-spaced locations 602 between clusters 604A and 604B as a location progression 600. Data collection module 140 can use a time threshold to avoid recognizing smaller clusters (e.g., cluster 604C) as progression endpoints (e.g., data collection module 140 can end location progression 600 after user device 130 is in a relatively fixed location for more than some predefined time period).

Figure 6B:
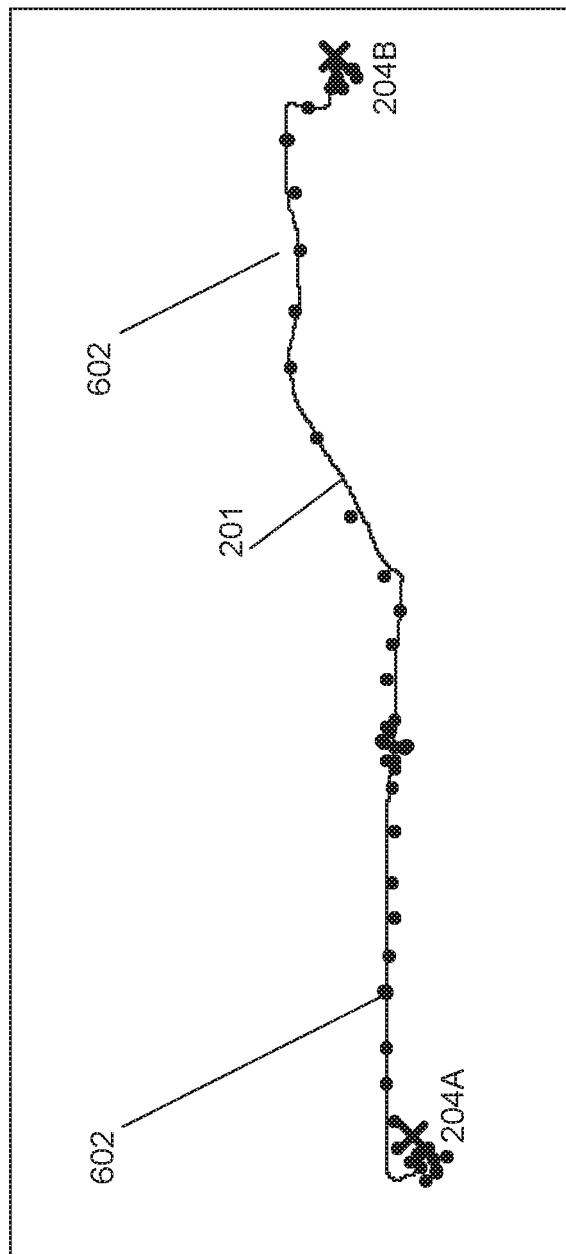
FIG. 6B shows an example location progression overlaid onto a road.

In some implementations, routing module 132 can correlate locations 602 along location progression 600 to known map data. For example, FIG. 6B shows an example comparison between location progression 600 and map data from map service 104. Routing module 132 can correlate locations 602 to points on one or more roads 201. Routing module 132 can correct for discrepancies in routes (e.g., due to errors in location data collection) by fitting locations 602 to a known path provided by known locations of roads 201. Routing module 132 can correlate clusters 604A and 604B to routing locations 204A and 204B (e.g., by comparing the locations of clusters 604A and 604B with known routing locations 204A and 204B such as predefined home and work locations and/or with addresses). Based on these comparisons, routing module 132 can define user route 610 from location progression 600, as shown in FIG. 6C. User route 610 can be a route frequently taken by the user. Routing module 132 can store user routes 610 in map data database 136.

In some implementations, routing module 132 can store user routes 610 each time user device 130 travels between routing locations 204A and 204B, thereby building up a count of the number of times the user travels along a given route in map data database 136. In some implementations, routing module 132 can count substantially similar routes as the same route in map data database 136. For example, routing module 132 can use a dynamic time warping algorithm to measure similarity between two temporal sequences (e.g., routes) which may vary in timing (e.g., because of differences in start times, end times, and/or speeds at various points along the journey). Routing module 132 can regard routes deemed similar by the dynamic time warping algorithm as the same route for counting purposes.

In some implementations, routing module 132 can use user routes 610 to rank routes provided by map service 104. For example, routing module 132 can request routes between routing locations 204A and 204B automatically and/or in response to a user request. Map service 104 can return multiple routes between routing locations 204A and 204B. In some implementations, the routes can be enhanced through the non-recommended route determination processing discussed above. In other implementations, the routes can be free-flow routes, routes recommended based on historical traffic data, or routes recommended based on current traffic conditions. Routing module 132 can evaluate each route from map service 104 against recorded user routes 610 to determine which routes from map service 104 may be of interest to the user.

In some implementations, routing module 132 can compare each route received from map service 104 with user routes 610. In some implementations, routing module 132 can use a similarity algorithm to determine similarities between routes received from map service 104 and user routes 610. For example, routing module 132 can use a dynamic time warping algorithm to measure similarity between two temporal sequences (e.g., routes) which may vary in timing (e.g., because of differences in start times, end times, and/or speeds at various points along the journey). Accordingly, routing module 132 can determine whether any routes received from map service 104 match any user routes 610. For example, user route 610 of FIG. 6C may be approximately the same as route 206C between routing locations 204A and 204B as shown in FIG. 2D.

In some implementations, routing module 132 can rank routes received from map service 104 according to the number of records in map data database 136 with which each route correlates. For example, routing module 132 can determine that route 206C correlates with 100 user routes stored in map data database 136, route 206A correlates with 30 user routes stored in map data database 136, and route 206B correlates with 8 user routes stored in map data database 136. Routing module 132 can rank route 206C highest, route 206A second highest, and route 206B lowest.

In some implementations, map application 134 can use the rankings determined by routing module 132 to recommend routes to the user. For example, a route ranked highest can be the most relevant to the user. Accordingly, map application 134 can present the highest-ranked route to the user. For example, if multiple routes are predicted to take the same amount of time to travel, map application 134 can select the highest-ranked route for presentation to the user. In some implementations, map application 134 can present the highest-ranked route to the user even when a lower-ranked route is predicted to be faster.

In some implementations, routing module 132 can use the route rankings to proactively request traffic data from map service 104 (e.g., automatically and without user input before the user is expected to travel between locations). In some implementations, this proactive request can be different from the proactive requests discussed above in that the request is for traffic data on a specific, defined route rather than a request for a recommended route between locations. For example, map data database 136 can include user routes (e.g., user route 610) between known relevant locations (e.g., user-defined or automatically determined relevant locations as described above). In some implementations, routing module 132 can group and rank the user routes between the known relevant locations, and identify one or more top routes (e.g., routes preferred by the user based frequency at which the routes appear in collected data database 142) from among the groups. The user routes can be grouped based on the above-mentioned similarity measure, such that user routes that are similar are grouped together. From each group, a top route that represents the group can be identified as one of the user routes in that group, or constructed by combining common road segments of the user routes in that group. The top routes may be one or more routes corresponding to the largest user route groups (e.g., the routes that the user has traveled the most) between the start point and end point stored in collected data database 142. Returning to the example above, the top route can be route 206C, because route 206C correlates with the greatest number of user routes stored in map data database 136 for routes between routing locations 204A and 204B. Routing module 132 can proactively request traffic data for route 206C (e.g., at a time before the user is predicted to leave). Map service 104 can respond with the traffic data for route 206C.

Map application 134 can generate a notification when the traffic data for the top route indicates a problem on the top route. For example, returning to FIG. 4B, user device 130 can display non-recommended route notification 450 when the traffic data indicates a problem on the top route. In this example, the starting location is a current location of user device 130, the ending location is home (e.g., a user-defined or automatically determined home location), and the top route includes Route 280. Map application 134 can generate title string 452 for non-recommended route notification 450 by inserting a problem with the top route ("heavy traffic") and a destination ("home"). Map application 134 can generate detail string 454 for non-recommended route notification 450 by inserting a message related to the incident type ("expect delays"). The user may be able to select the notification to view more details about the top route. For example, selecting the notification can bring up map navigation GUI 500 of FIG. 5, as discussed above. Map application GUI 500 can show map 502 with information related to the top route displayed thereon.

Light Guidance Features

In some implementations, map application 134 can determine that a user is familiar with an area and/or a route (e.g., from data gathered by data collection module 140 as discussed above). Map application 134 can tailor displayed traffic and routing information for users who are familiar with an area and/or a route between locations. Because of the familiarity, the user might not need audible narration or display of detailed navigation instructions. For example, routing module 132 can use location information gathered by data collection module 140 as discussed above to determine whether a user is traveling on a route with which they are familiar. When routing module 132 determines that the user is on a familiar route, map application 134 can display "light" guidance information, as opposed to complete turn-by-turn guidance. In light guidance mode, map application 134 can present information relevant to a driver familiar with the area. For example, light guidance can include traffic and/or incident information, alternative route suggestions, reduced directions (e.g., directions only for portions of a route that deviate from a familiar route), guidance without audible prompts, guidance without detailed street and/or next move descriptions, or a combination thereof. Light guidance can be invoked automatically in response to routing module 132 determining the user is on a familiar route (e.g., as determined by the processes described in the Ranking Routes section above), automatically at certain times (e.g., during a time the user usually commutes), or in response to user request, for example.

In some implementations, map application 134 can launch in or transition to light guidance mode based on context. For example, routing module 132 can generate proactive notifications for non-recommended routes and/or top routes as described above. Routing module 132 can generate proactive notifications for non-recommended routes when a user is predicted to be traveling between two familiar locations. Routing module 132 can generate proactive notifications for top routes that are identified as routes the user takes often. In either case, the proactive notifications can be based on frequently-observed user behavior. The notification context suggests the user is expected to be familiar with the route presented in map application 134. Accordingly, when a user selects on a proactive notification, map application 134 can launch in light guidance mode.

In another example, map application 134 can default to light guidance during a time defined as a commute window and/or in a location between commute start and end points. As discussed above, data collection module 140 can gather information indicating that the user frequently commutes from a first location to a second location at a same approximate time on the same days of each week. For example, the user may leave home for work every Monday morning at or near 8:30 AM, arriving at or near 9:00 AM.

In some implementations, if the user launches map application 134 during a commute window (e.g., an hour before the user typically leaves through an hour after the user typically arrives), map application 134 can start in light guidance mode.

In some implementations, if the user launches map application 134 in the commute window while user device 130 is in a location between the start and end points, map application 134 can start in light guidance mode.

In some implementations, location module 138 can determine whether user device 130 is traveling in a vehicle. For example, location module 138 can determine user device 130 is on a road and moving at a speed indicative of a vehicle such as a car. In another example, location module 138 can detect that user device 130 is connected to a car audio and/or navigation system (e.g., through a Bluetooth connection). If the user launches map application 134 in the commute window while user device 130 is moving in a vehicle, map application 134 can start in light guidance mode.

Figure 7A:
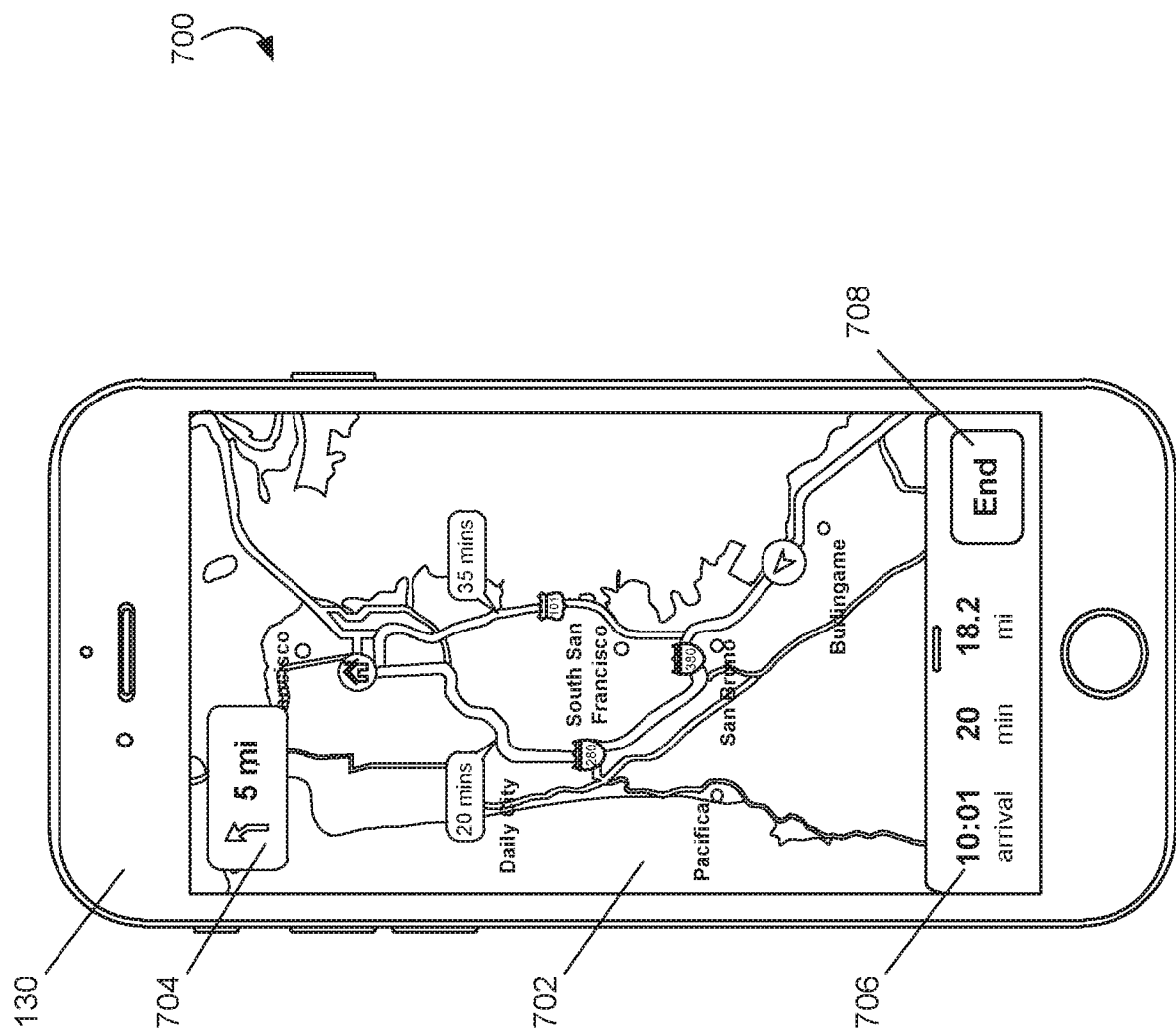
FIGS. 7A-7O show an example map navigation interface with light guidance features.

FIGS. 7A-7O illustrate examples of a GUI 700 for map application 134 with light guidance features.

FIG. 7A shows user device 130 displaying GUI 700 in an example implementation of a light guidance mode. GUI 700 can include light guidance map 702. Map application 134 can display light guidance map 702 when launching in light guidance mode (e.g., as described below) and/or in response to a user command to enter light guidance mode. Light guidance map 702 can show one or more routes (e.g., routes determined by non-recommended route processing and/or ranking processing discussed above) and times estimated to traverse the routes from a current location to a destination. GUI 700 can include navigation status bar 706, which can display information such as estimated arrival time, estimated time remaining, and estimated distance. GUI 700 can include end button 708, which a user can select to exit GUI 700.

UI 700 can include maneuver sign 704. Maneuver sign 704 can display the next maneuver that may be of interest to a driver familiar with the area. For example, in FIG. 7A, light guidance map shows two possible routes, and maneuver sign 704 shows a recommended maneuver for a point at which the two routes deviate. Because the user is familiar with the area, the user may not require turn-by-turn directions, but the user may find an indication of a maneuver at a decision point helpful.

Figure 7B:
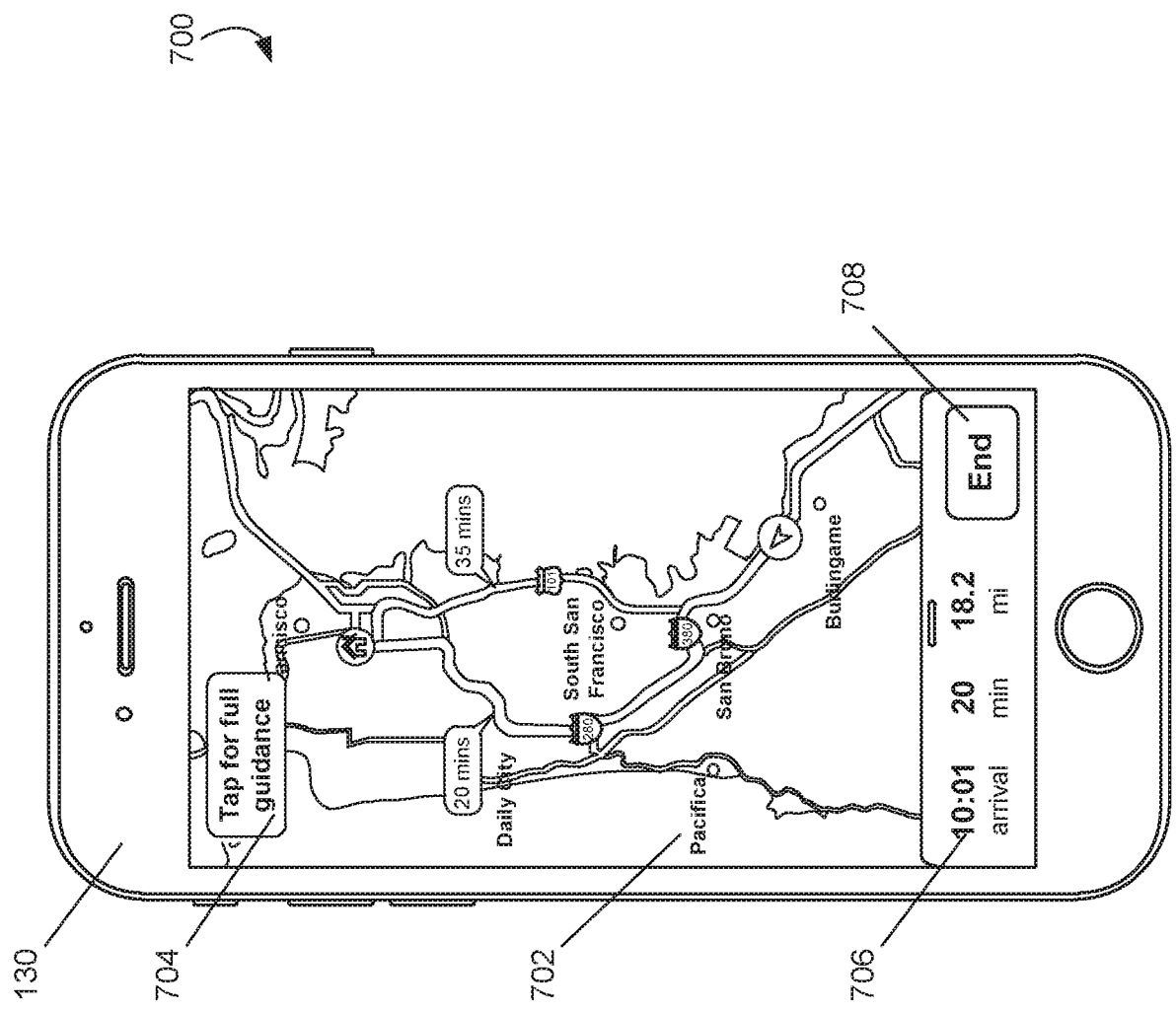

In some implementations, GUI 700 can allow the user to switch between light guidance mode and a full guidance mode providing turn-by-turn directions. For example, selecting maneuver sign 704 can cause GUI 700 to switch to full guidance mode. In some implementations, GUI 700 can briefly show hint text in maneuver sign 704, for example upon entry into light guidance mode. FIG. 7B shows GUI 700 wherein maneuver sign 704 is displaying hint text indicating the user can tap maneuver sign 704 to enter full guidance mode. In some implementations, maneuver sign 704 can change from showing hint text to showing guidance (e.g., as shown in FIG. 7A) after a certain amount of time elapses, such as five seconds.

Figure 7C:
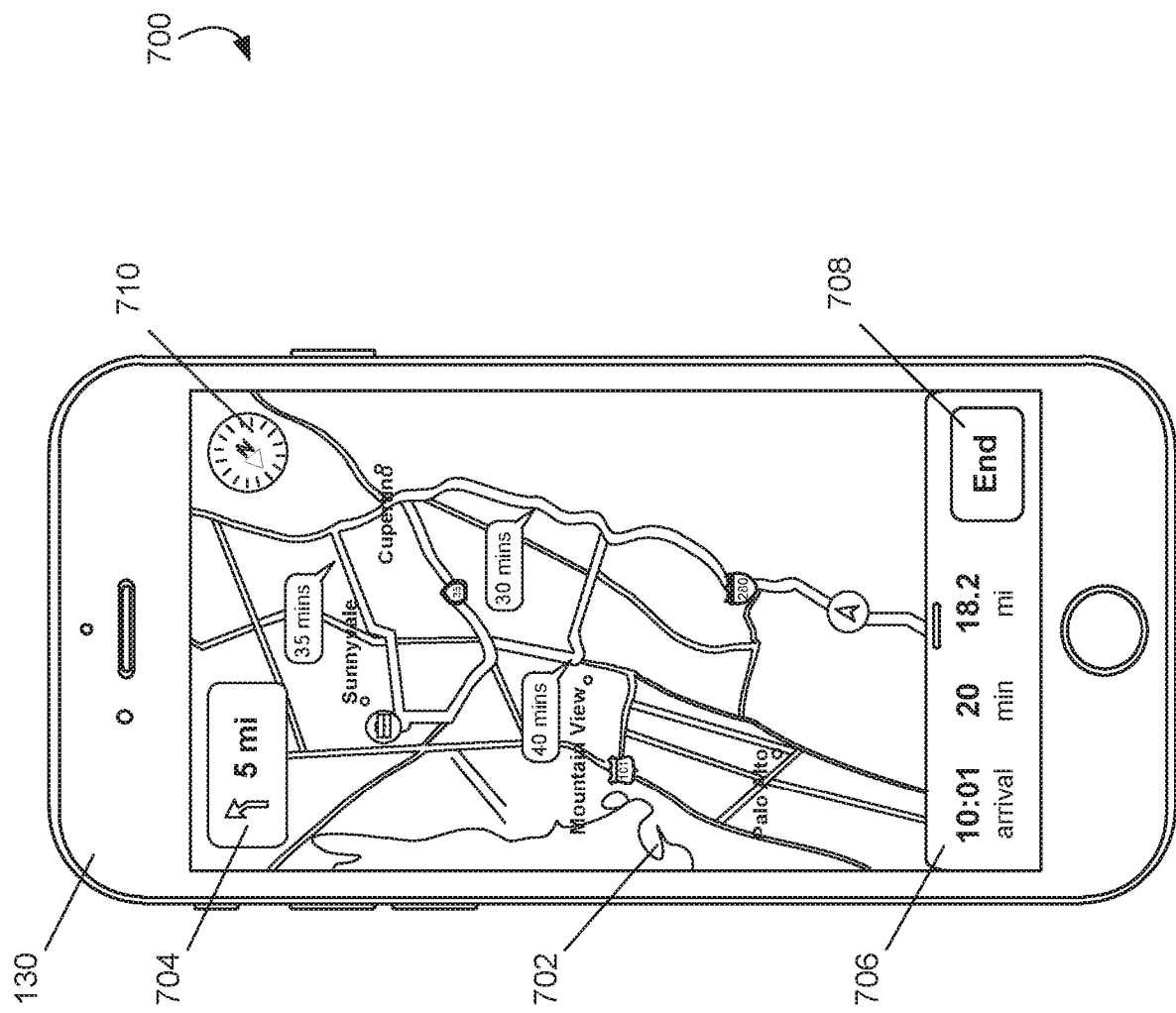
Figure 7D:
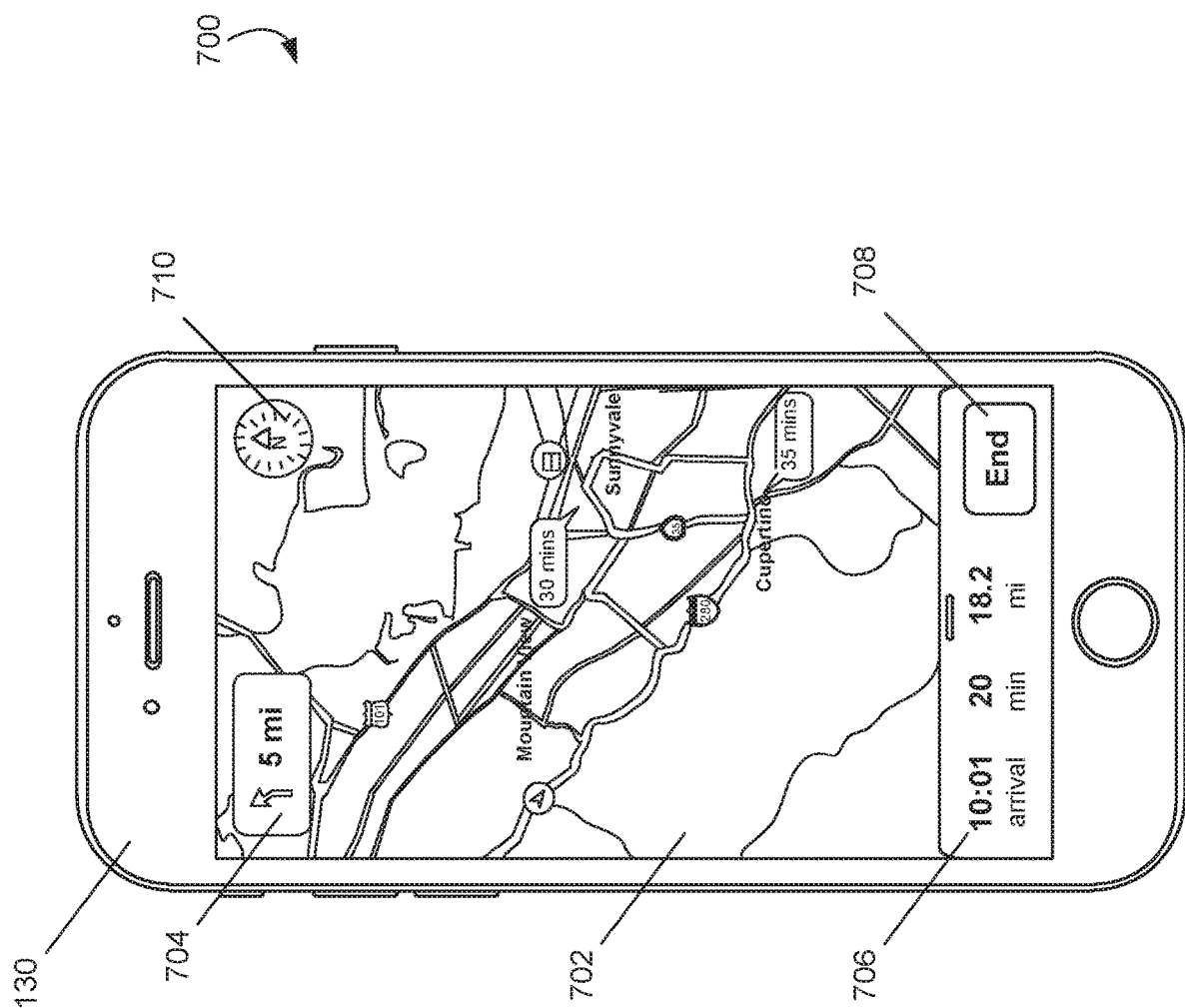

In some implementations, GUI 700 can allow the user to change light guidance map 702 orientation. For example, in FIG. 7C, GUI 700 includes compass 710. GUI 700 can hide compass 710 by default and display compass 710 when a user interacts with light guidance map 702 (e.g., by tapping or manipulating light guidance map 702). Compass 710 may appear for a certain amount of time (e.g., for three seconds) and then disappear. The user can select compass 710 to toggle between a destination-up light guidance map 702, where user device 130 location is at the bottom of light guidance map 702 and the destination is at the top of light guidance map 702 (e.g., as shown in FIGS. 7A-7C), and a sticky north-up light guidance map 702 as shown in FIG. 7D.

Figure 7E:
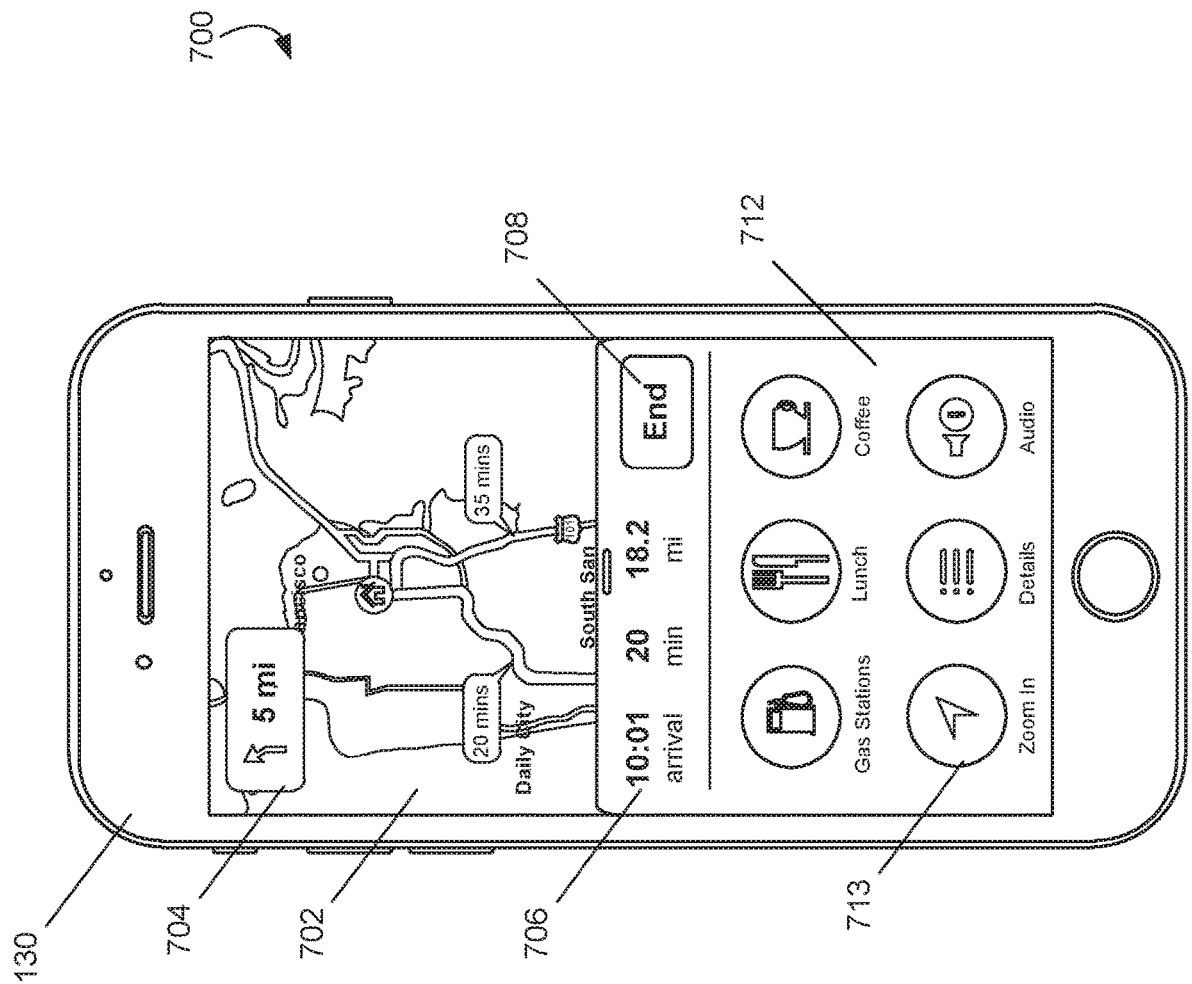

In some implementations, GUI 700 can include a control tray providing additional functions. For example, as shown in FIG. 7E, GUI 700 can display tray 712 upon user command (e.g., in response to the user swiping up on status bar 706). Tray 712 can provide additional options such as searching for specific points of interest (e.g., gas stations, food, or coffee), adjusting light guidance map 702 zoom level, displaying details about the route, and/or adjusting audio notification settings.

Figure 7F:
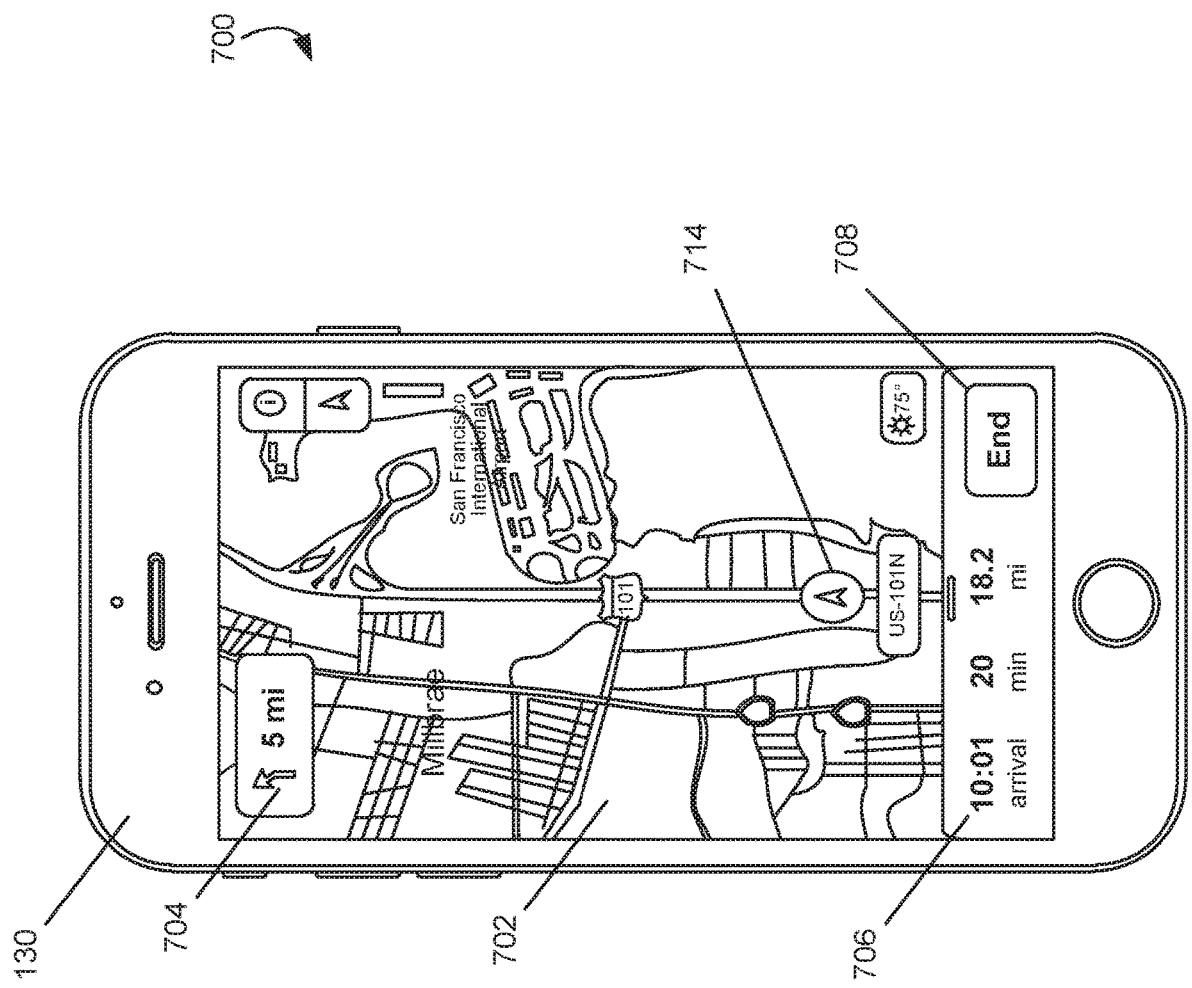

In some implementations, light guidance map 702 zoom level can be toggled between a view showing the entire route (e.g., as shown in FIGS. 7A-7D) and a "drive mode" zoom level as shown in FIG. 7F. For example, the user can select the zoom level icon 713 in tray 712 to enter drive mode. In the drive mode zoom level, GUI 700 can display drive icon 714 indicating an orientation of travel for user device 130 and a road name on which user device 130 is located or traveling on. Map application 134 can determine the travel orientation and the road name from location data gathered by location module 138. Drive icon 714 can remain in a fixed location on light guidance map 702, and light guidance map 702 itself can scroll and reorient to track user device 130 movement. In some implementations, GUI 700 can use stronger fonts (e.g., larger fonts and/or bold fonts) in drive mode view than in the view showing the entire route for at least some information (e.g., street names and/or landmark names) so that a user can see information at a glance while driving. In some implementations, GUI 700 can include different options in tray 712 when in drive mode. For example, tray 712 can include an overview option that the user can select to return to the view showing the entire route.

Figure 7G:
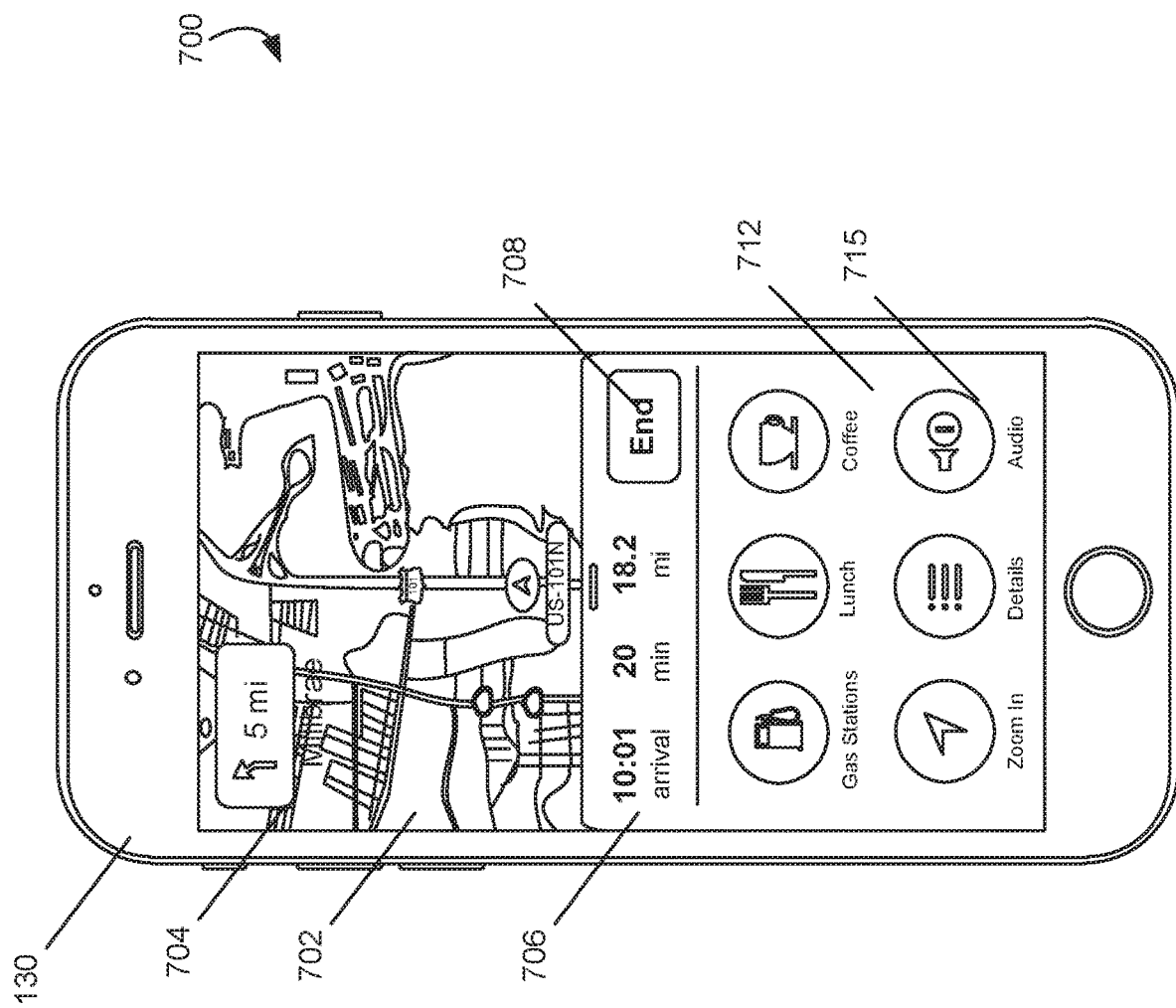
Figure 7H:
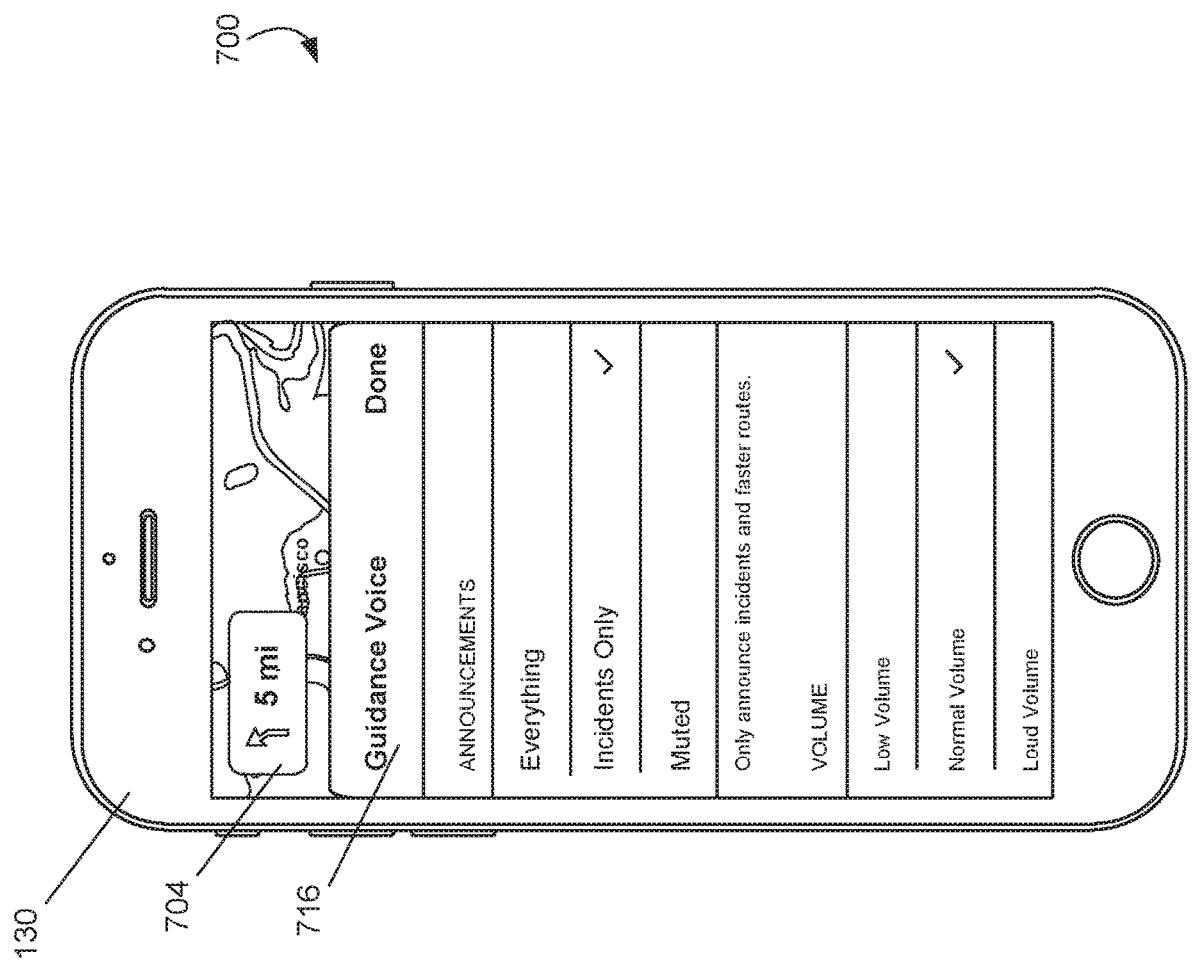

In some implementations, when the user selects the audio icon 715 in tray 712, GUI 700 can display audio settings interface 716 as shown in FIG. 7H. Audio settings interface 716 can facilitate audio notification adjustments. For example, when in light guidance mode, map application 134 can provide audio notifications for every instruction presented by maneuver sign 704, audio notifications only to report traffic incidents, or can mute all audio notifications. In some implementations, map application 134 may default to providing audio notifications only to report traffic incidents.

Figure 7I:
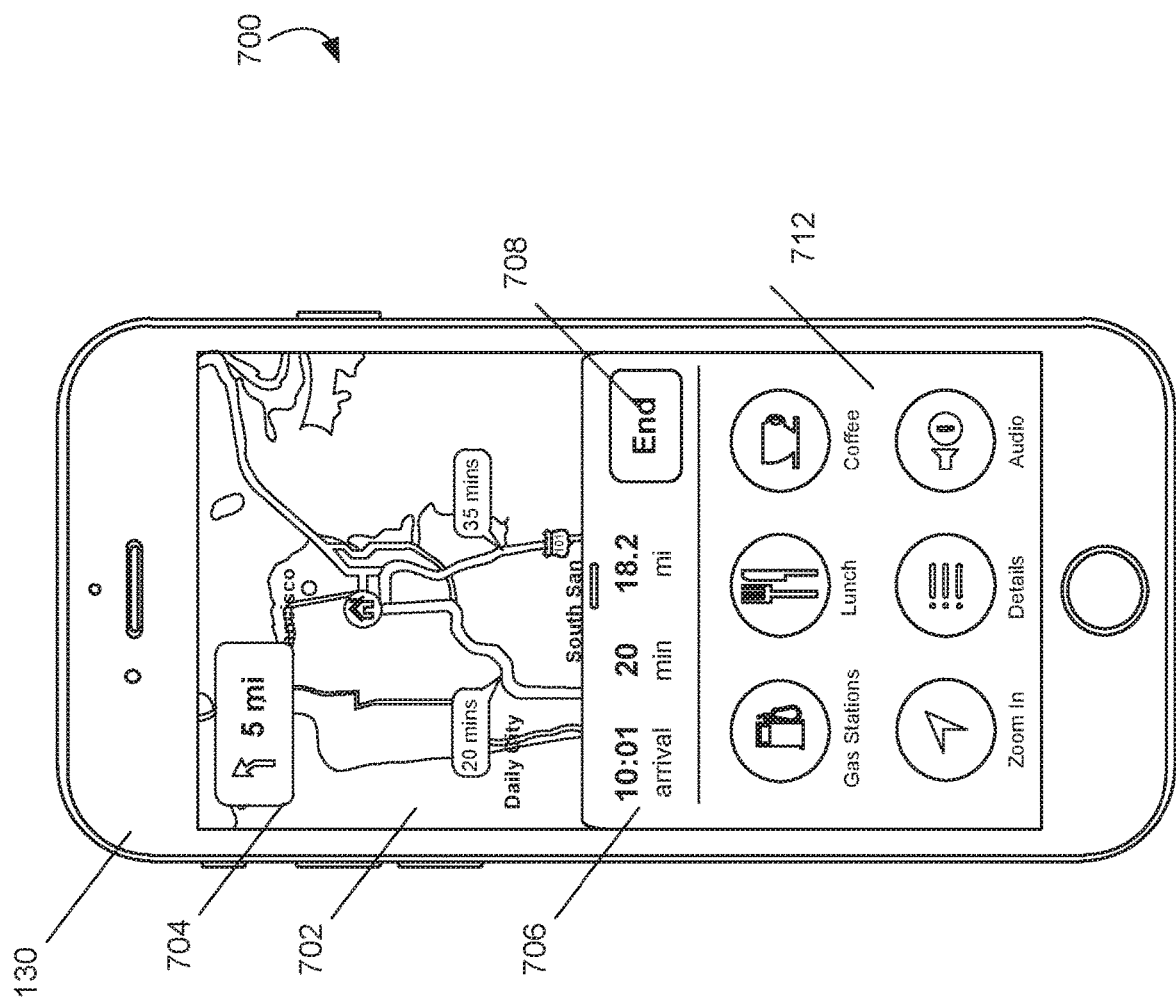

In some implementations, GUI 700 can adjust the audio icon in tray 712 depending on which audio notification setting is selected in audio settings interface 716. For example, when audio notifications are selected only to report traffic incidents, tray 712 can include the audio icon shown in FIGS. 7E and 7G. When full audio notifications are selected, tray 712 can include the audio icon shown in FIG. 7I. Tray 712 can show a muted icon when audio notifications are muted (not shown).

Figure 7J:
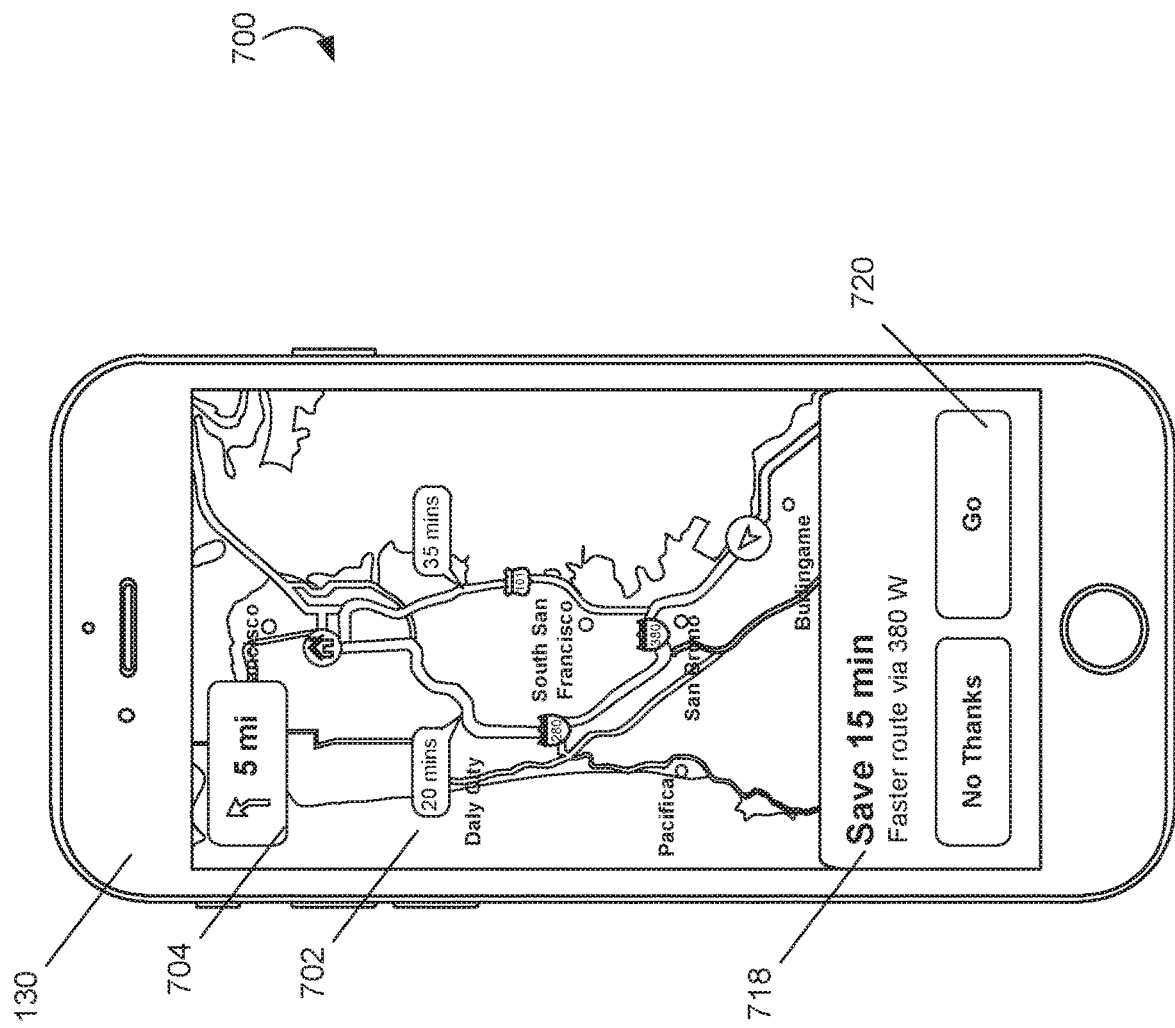
Figure 7K:
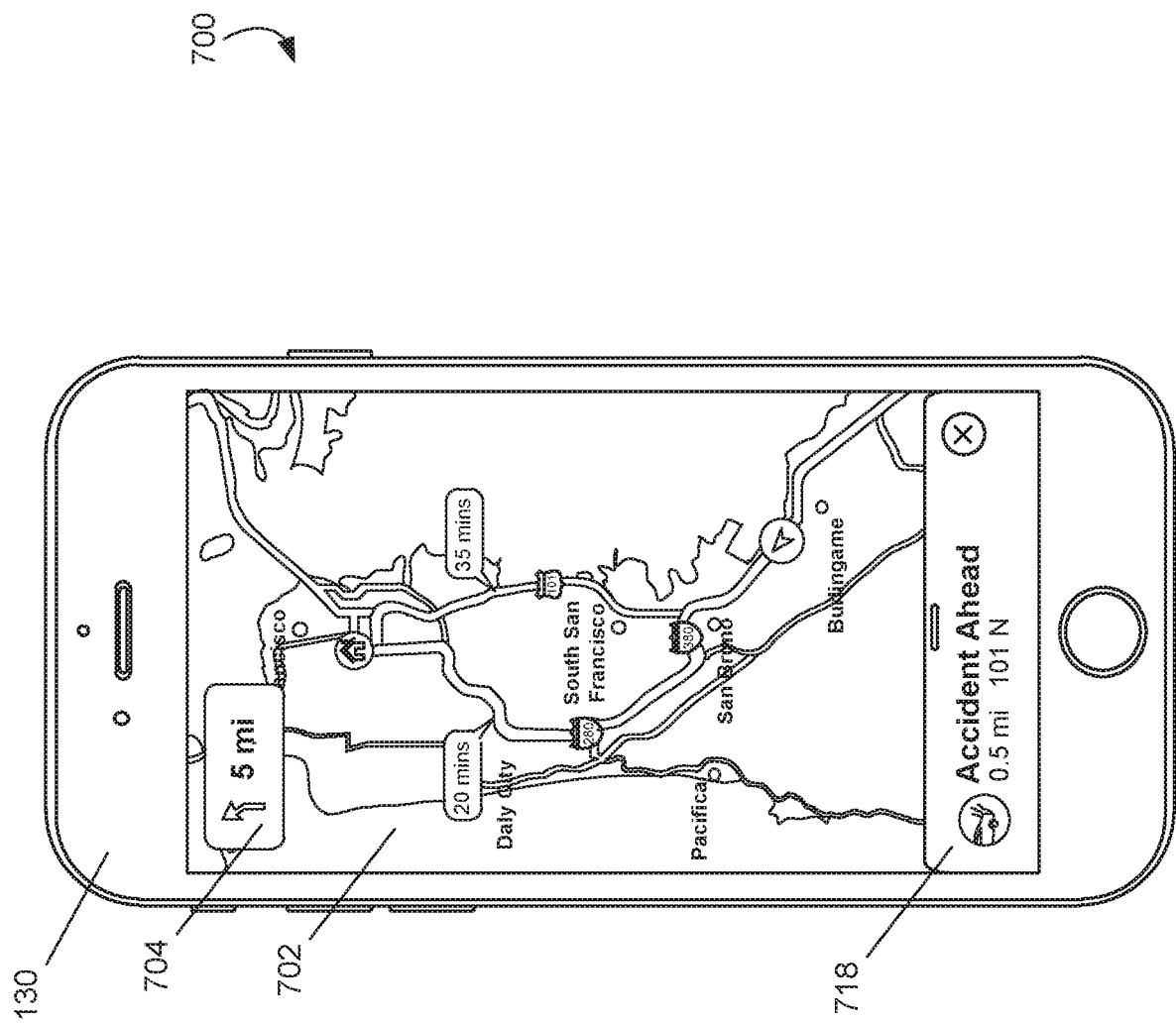

In some implementations, GUI 700 can adjust the current navigation route being displayed. For example, as discussed above, light guidance map 702 can show one or more routes determined by non-recommended route processing and/or ranking processing described herein (or by other routing processing). In some cases, routing module 132 can communicate with map service 104 and discover an incident on the current route causing the current route to be slower than an alternate route. If so, routing module 132 can recommend a different route. Accordingly, GUI 700 can display notification 718 as shown in FIG. 7J. Notification 718 can describe the alternate route (e.g., "380 W") and/or the effects of choosing the alternate route (e.g., "save 15 min"). Notification 718 can include interface 720 allowing the user to accept or dismiss the alternate route. If the user dismisses the alternate route, map application 134 can continue presenting navigation instructions for the current route. If the user selects the alternate route, map application 134 can start presenting navigation instructions for the alternate route. In some implementations, map application 134 can switch to presenting navigation instructions for the alternate route if the user does not provide input through interface 720 after a certain amount of time (e.g., 10 seconds). In some cases, routing module 132 and map service 104 may be unable to determine a better alternate route than the current route in spite of the traffic incident. In this situation, notification 718 can advise the user about the incident without providing alternate route details or interface 720 as shown in FIG. 7K.

Figure 7L:
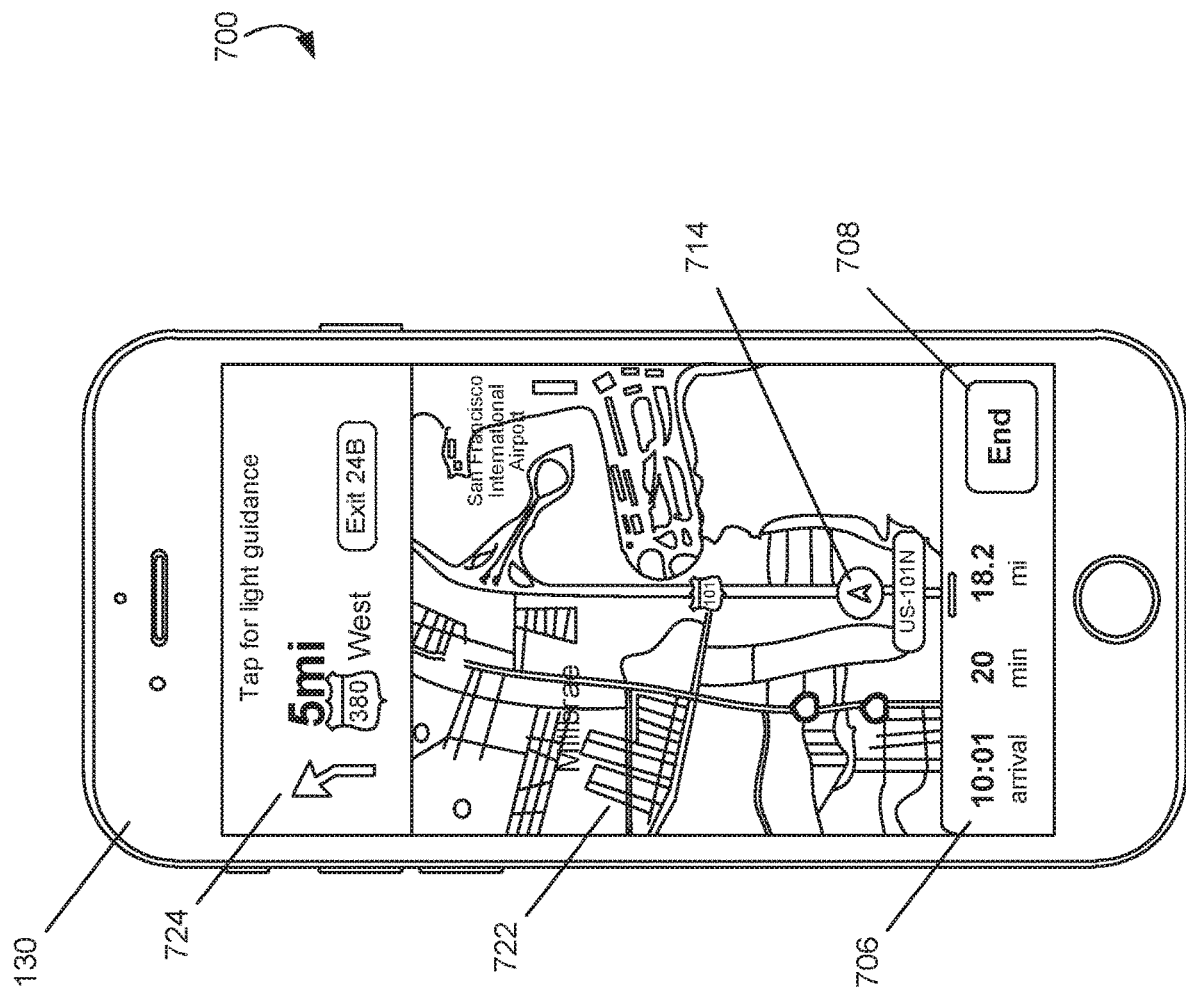

As noted above, GUI 700 can also include a full guidance mode displaying turn-by-turn navigation instructions. FIG. 7L is an example of GUI 700 displaying full guidance map 722 and turn-by-turn guidance 724. GUI 700 can start in full guidance mode when collected data database 142 lacks information suggesting the user is familiar with the area (e.g., information collected by data collection module 140 indicating frequent presence of user device 130 in the area as detected by location module 138). As noted above, the user can also toggle into full guidance mode from light guidance mode by clicking maneuver sign 704. When GUI 700 is in full guidance mode, the user can toggle into light guidance mode by clicking turn-by-turn guidance 724. In some implementations, turn-by-turn guidance 724 can display a hint indicating how to toggle to light guidance, as shown in FIG. 7L. In some implementations, the hint may appear upon entry into full guidance mode and disappear after a certain amount of time (e.g., five seconds).

Figure 7M:
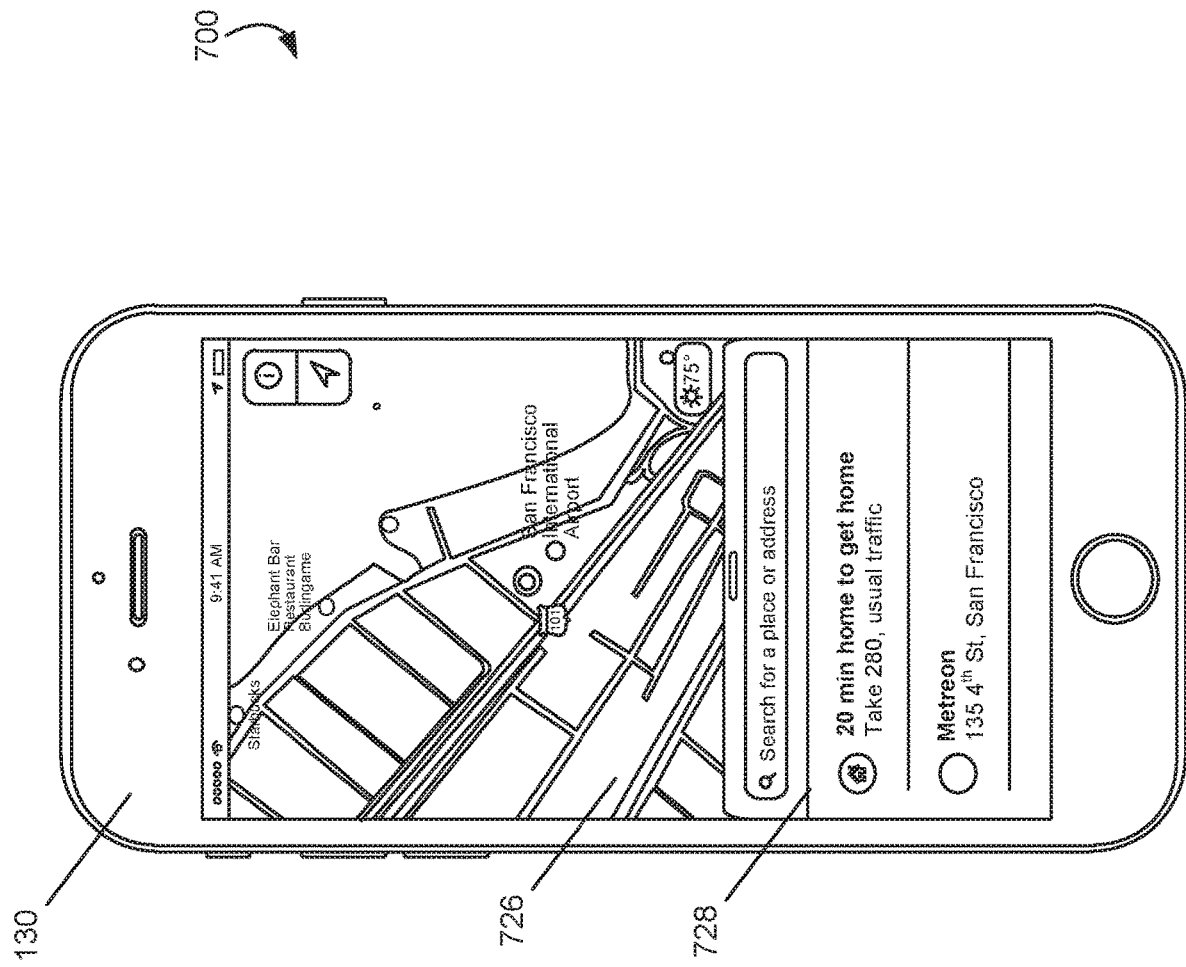
Figure 7N:
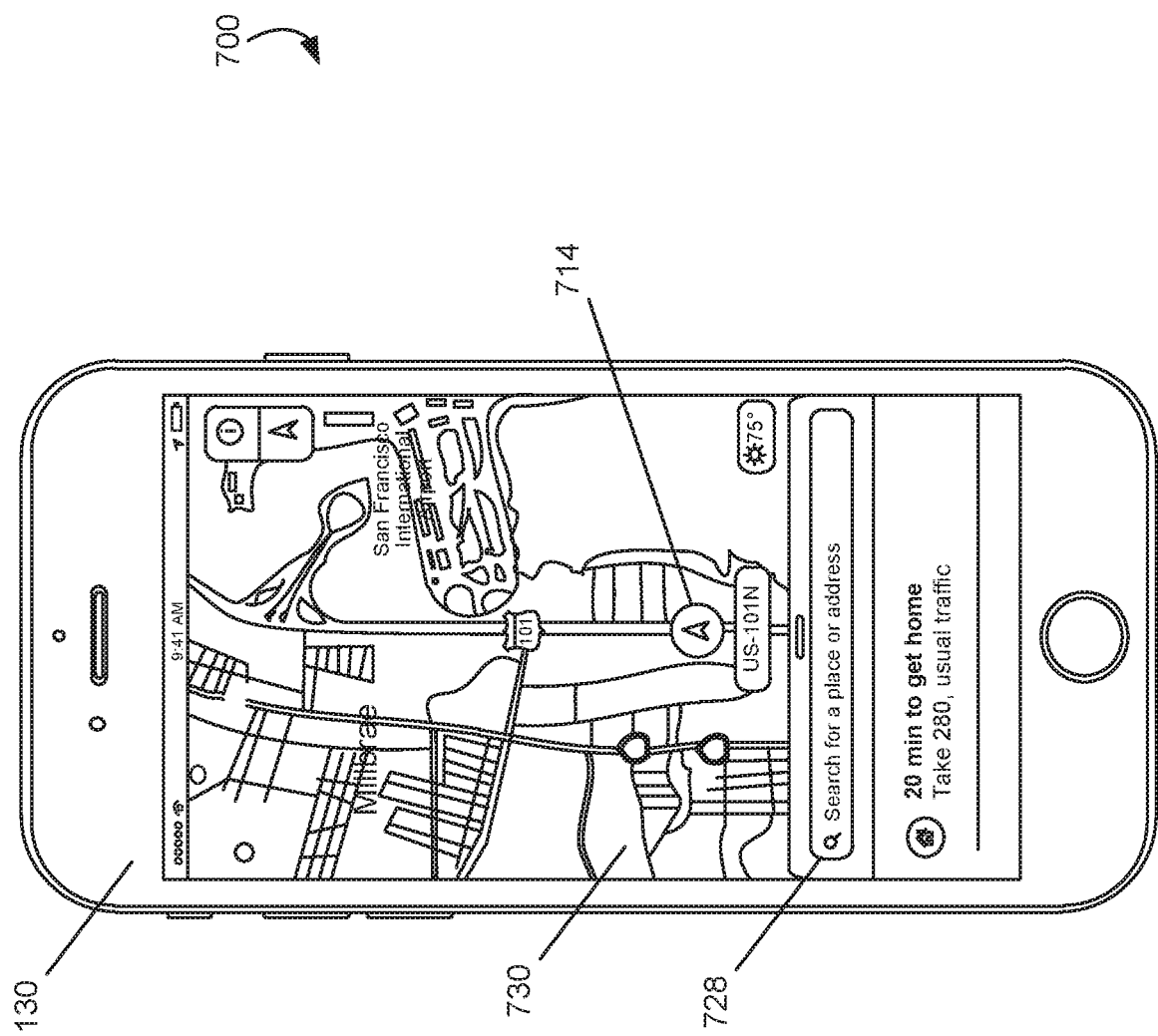
Figure 70:
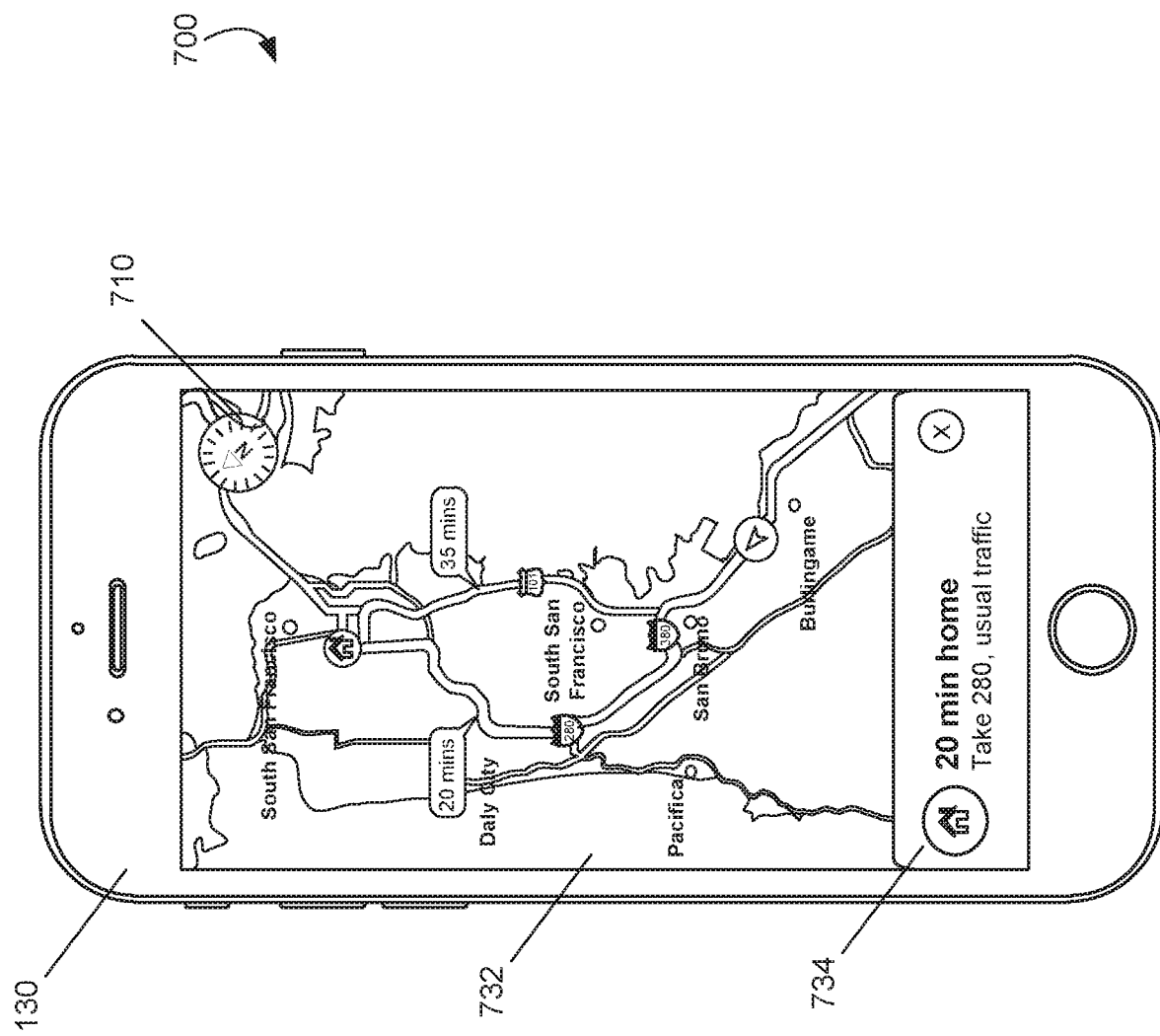

In some implementations, when the user selects end button 708, map application 134 can quit its navigation mode and turn to a standard map mode (e.g., a mode supplying full guidance as shown in FIG. 7M). Accordingly, GUI 700 can switch from displaying light guidance mode or full guidance mode to displaying standard map view 726 of FIG. 7M or drive map view 730 of FIG. 7N. In some implementations, location module 138 can determine whether user device 130 is traveling in a vehicle. For example, location module 138 can determine user device 130 is on a road and moving at a speed indicative of a vehicle such as a car. GUI 700 can switch to drive map view 730 as shown in FIG. 7N when location module 138 determines that user device 130 is traveling in a vehicle and switch to standard map view 726 otherwise. Standard map view 726 and drive map view 730 can include tray 728, providing options for the user to search for navigation destinations and/or select predetermined navigation destinations (e.g., home, work, or recent locations).

In some implementations, when map application 134 determines light guidance is appropriate based on context, GUI 700 can initially show "launch and go" map 732 as shown in FIG. 7O. Launch and go map 732 can show the same route overlays as in light guidance mode (e.g., see FIG. 7A) but without navigation information. GUI 700 can show toggle interface 734, which can include information such as a route recommendation (e.g., "take 280"), traffic status (e.g., "usual traffic"), and/or timing information (e.g., "20 min to home"). If the user is not interested in navigation information, the user can select toggle interface 734, and GUI 700 can toggle to standard map view 726 or drive map view 730, depending on whether user device 130 is in a moving vehicle. If the user does not select toggle interface 734 within a certain amount of time (e.g., 10 seconds), GUI 700 can toggle to light guidance mode.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 8:
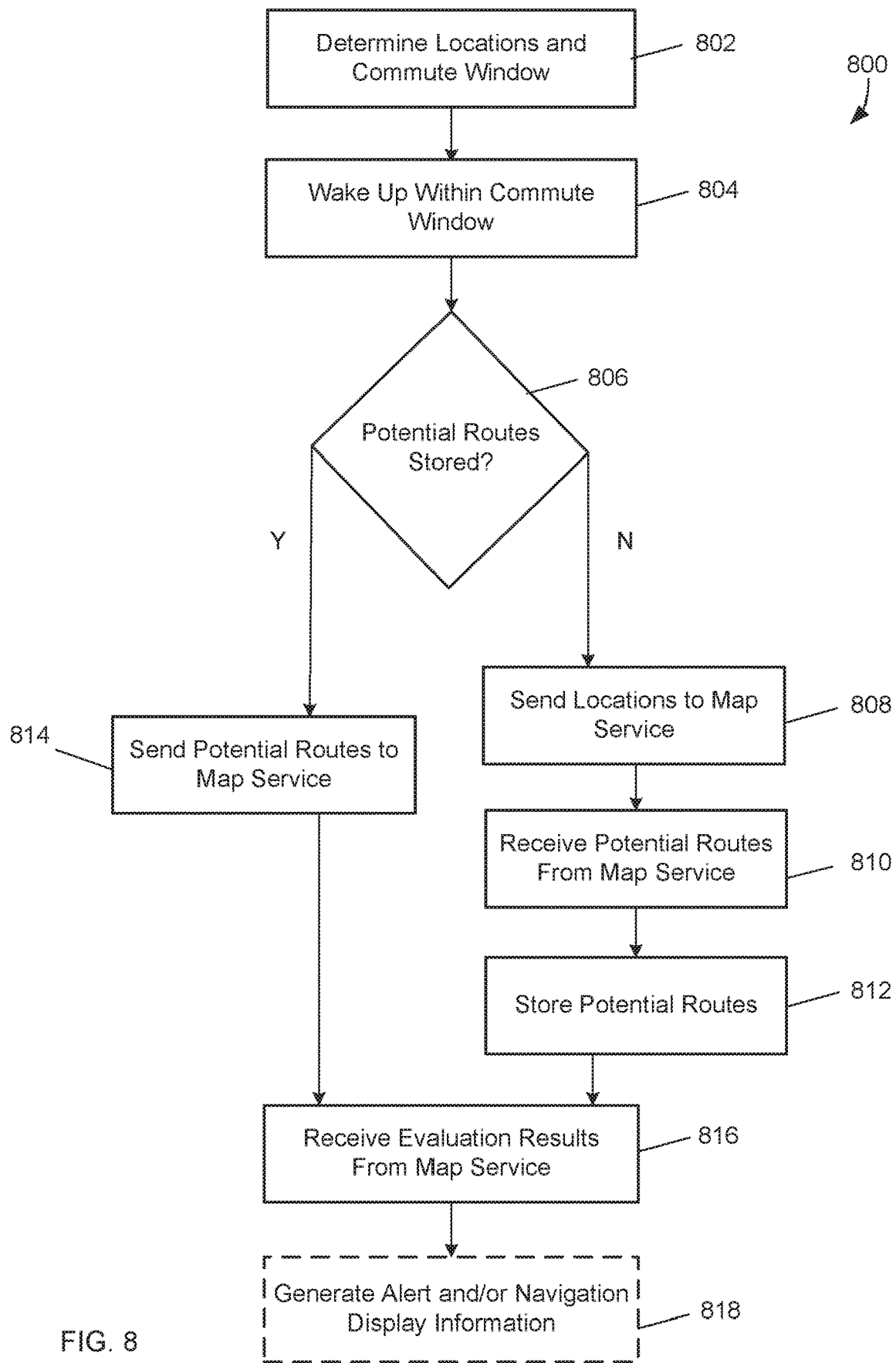
FIG. 8 is a flow diagram of an example process for proactively requesting routing information.

FIG. 8 is a flow diagram of an example process 800 for proactively requesting routing information (e.g., see "Non-Recommended Routes" section above). Process 800 can be performed by one or more elements of user device 130. For example, process 800 can be performed by routing module 132, location module 138, and/or data collection module 140 of user device 130. Process 900, which can be performed by server device 102 in coordination with process 800, is described below.

At step 802, routing module 132 can determine whether there are any locations for which routing information can be proactively requested and, if so, when the routing information can be requested. For example, data collection module 140 can store data indicating locations user device 130 visits frequently in collected data database. Data collection module 140 can also store times at which user device 130 frequently travels to the locations. Routing module 132 can use the stored data to identify a target location and a commute window for a proactive request, where the commute window can open at a time before the user generally leaves for the location (e.g., one hour before).

At step 804, user device 130 can wake up within the commute window. In some implementations, to conserve user device 130 battery power usage, process 800 may only proceed when user device 130 is in an active mode, as opposed to operating in a low power mode. Routing module 132 may not wake up user device 130 on its own to perform process 800, but may instead wait for user device 130 to wake up for other reasons and continue process 800 opportunistically in response. In other implementations, process 800 may proceed even when user device 130 is not active.

At step 806, routing module 132 can determine whether there are any potential routes between user device 130 location and the target location stored in map data database 136. For example, routing module 132 may have received potential routes from map service 104 in previous iterations of process 800 and stored the potential routes.

If there are no potential routes user device 130 location and the target location stored in map data database 136, at step 808, routing module 132 can send the user device 130 location and the target location to map service 104. For example, routing module 132 can use networking hardware and software of user device 130 to communicate with server device 102 through a cellular or WiFi connection to the Internet or other network 150.

At step 810, routing module 132 can receive potential routes from map service 104 in response to sending the locations. For example, map service 104 can generate the potential routes according to process 900 of FIG. 9 as described below.

If there are potential routes user device 130 location and the target location stored in map data database 136, at step 814, routing module 132 can send the potential routes to map service 104. For example, routing module 132 can use networking hardware and software of user device 130 to communicate with server device 102 through a cellular or WiFi connection to the Internet or other network 150. As described below, sending the potential routes may allow map service 104 to skip steps for determining the potential routes.

At step 816, routing module 132 can receive evaluation results from map service 104. The evaluation results can describe whether there are any problems with the potential routes. For example, if there are no problems with the potential routes, the evaluation results can be an acknowledgement from map service 104. If there are problems with one or more potential routes, the evaluation results can describe the problems. For example the evaluation results identify which routes are affected by traffic incidents and how travel on these routes may be impacted and/or identify alternative routes.

If the evaluation results indicate one or more problems with one or more routes and/or include alternative route recommendations, at step 818, routing module 132 can generate information for display to the user. For example, routing module 132 can create an alert describing the traffic incident and/or alternative route. When map application 134 is active, routing module 132 can indicate the traffic incident and/or alternative route recommendation in the map application 134 GUI.

Figure 9:
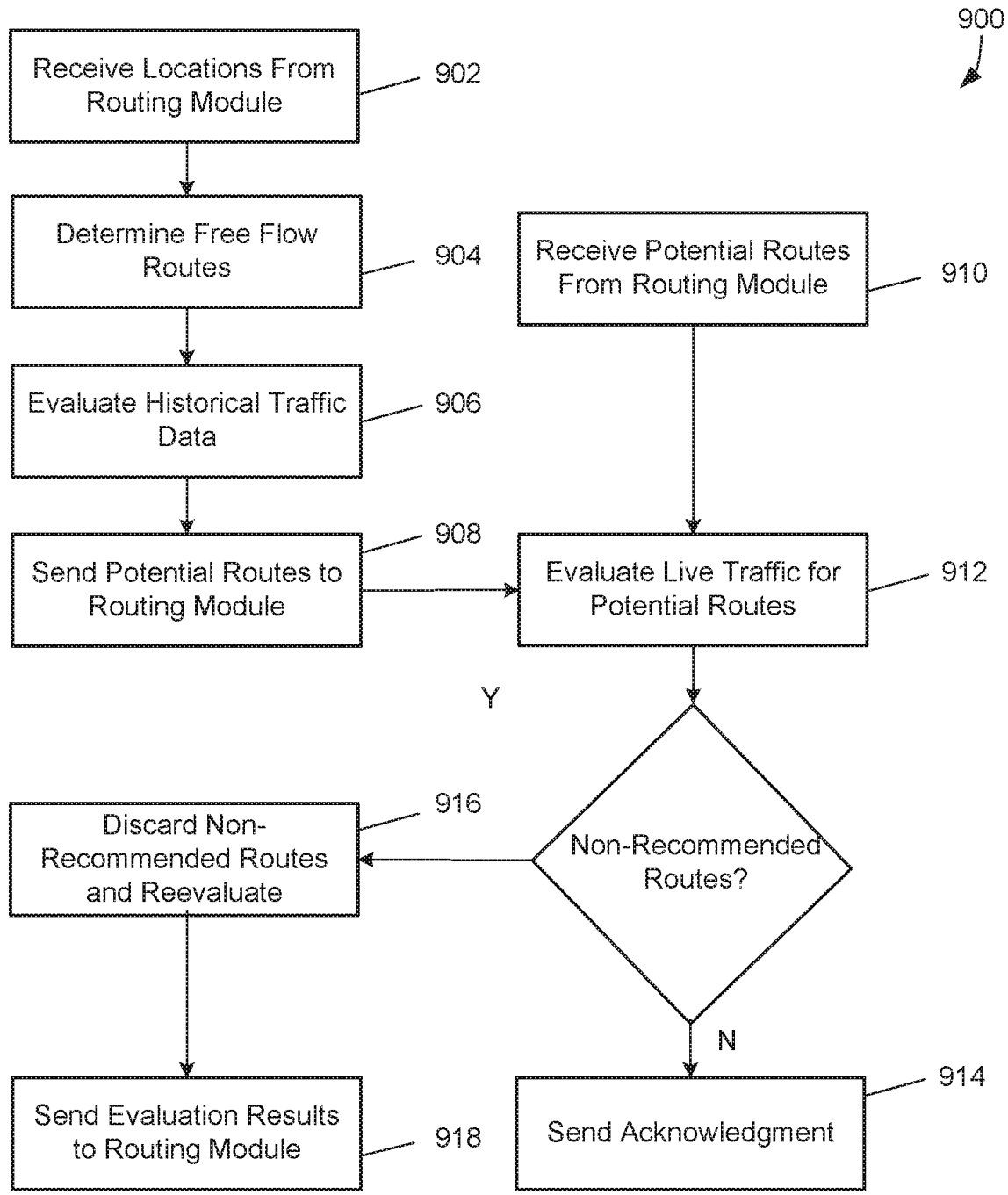
FIG. 9 is a flow diagram of an example process for identifying and evaluating routes and identifying alternatives.

FIG. 9 is a flow diagram of an example process 900 for identifying and evaluating routes and identifying alternatives (e.g., see "Non-Recommended Routes" section above). For example, process 900 can be performed by map service 104 of server device 102. Process 900 can be triggered by user device 130 performing process 800 and thereby sending data to server device 102. Process 800, which can be performed by user device 130 in coordination with process 900, is described above.

In some situations, process 900 may begin when map service 104 receives routing locations for which routing information is requested. At step 902, map service 104 can receive routing locations from routing module 132. The routing locations may be sent by user device 130 at step 808 of process 800. For example, map service 104 can receive the routing locations through network 150.

At step 904, map service 104 can determine free-flow routes between the routing locations. For example, map service 104 can identify the three fastest routes from the starting location to the destination location when traffic is moving at the speed limit or better.

At step 906, map service 104 can evaluate the free-flow routes against historical traffic information for the time at which the routing locations are received. For example, map data database 106 can include historical traffic information indicating typical traffic at different times of each day. Accordingly, map service 104 can look up historical traffic information for each free-flow route at the current time and day. For example, some routes that are fast under free-flow conditions can become congested at certain times, such as rush hour. Map service 104 can use historical traffic information to determine whether any free-flow routes are typically slow at current time and day. Map service 104 can select routes that are fast under free-flow conditions and under historical conditions as potential routes.

At step 908, map service 104 can send the potential routes to routing module 132. For example, map service 104 can send the potential routes through network 150.

In some situations, process 900 may begin when map service 104 receives potential routes previously stored by user device 130. At step 910, map service 104 can receive potential routes from routing module 132. For example, map service 104 may have determined the potential routes and sent them to routing module 132 by performing steps 902-908 in a previous iteration of process 900. The potential routes may be sent by user device 130 at step 814 of process 800. For example, map service 104 can receive the potential routes through network 150.

At step 912, map service 104 can evaluate live traffic conditions for the potential routes. Map service 104 can perform step 912 using potential routes determined in steps 902-908 or potential routes received in step 910. For example, map service 104 can receive live traffic updates from one or more traffic data reporting services. Map service 104 can determine, from the live traffic updates, whether any potential recommended routes 306 are slower than expected. For example, map service 104 can compare a time it would take to traverse a route under current traffic conditions with a free-flow time to traverse the route or a historical time to traverse the route. If the current time to traverse the route is greater than the free-flow or historical time to which it is compared by some threshold amount, map service 104 can determine the route is a non-recommended route that should not be recommended. Map service 104 can designate routes that are slower than the threshold allowance as non-recommended routes.

At step 914, if map service 104 does not identify any non-recommended routes at step 912, map service 104 can send a message indicating there are no problems with any of the potential routes. For example, map service 104 can send an acknowledgement message with no further information, thereby sending a minimal response.

At step 916, if map service 104 identifies one or more non-recommended routes at step 912, map service 104 can perform further route evaluation to potentially identify alternative routes. To determine alternative routes, map service 104 can discard non-recommended routes and evaluate one or more additional routes between the routing locations against current live traffic conditions. In some implementations, map service 104 can determine up to two alternative routes and evaluate each of them against current live traffic conditions. In some situations, the evaluation can reveal that one or more of the alternative routes is faster than the non-recommended routes. In some situations, map service 104 may look for alternative routes but find no routes that are faster than the non-recommended routes.

At step 918, map service 104 can send the results of the evaluation performed at step 916. For example, if one or more alternative routes are available, map service 104 can send information describing the one or more alternative routes. If no alternative routes are faster than the non-recommended routes, map service 104 can send information suggesting a non-recommended route should be used and detailing the traffic incident on the non-recommended route. If the evaluation performed at step 916 yielded no non-recommended routes, map service 104 may not send any route information (e.g., send an acknowledgement message).

Figure 10:
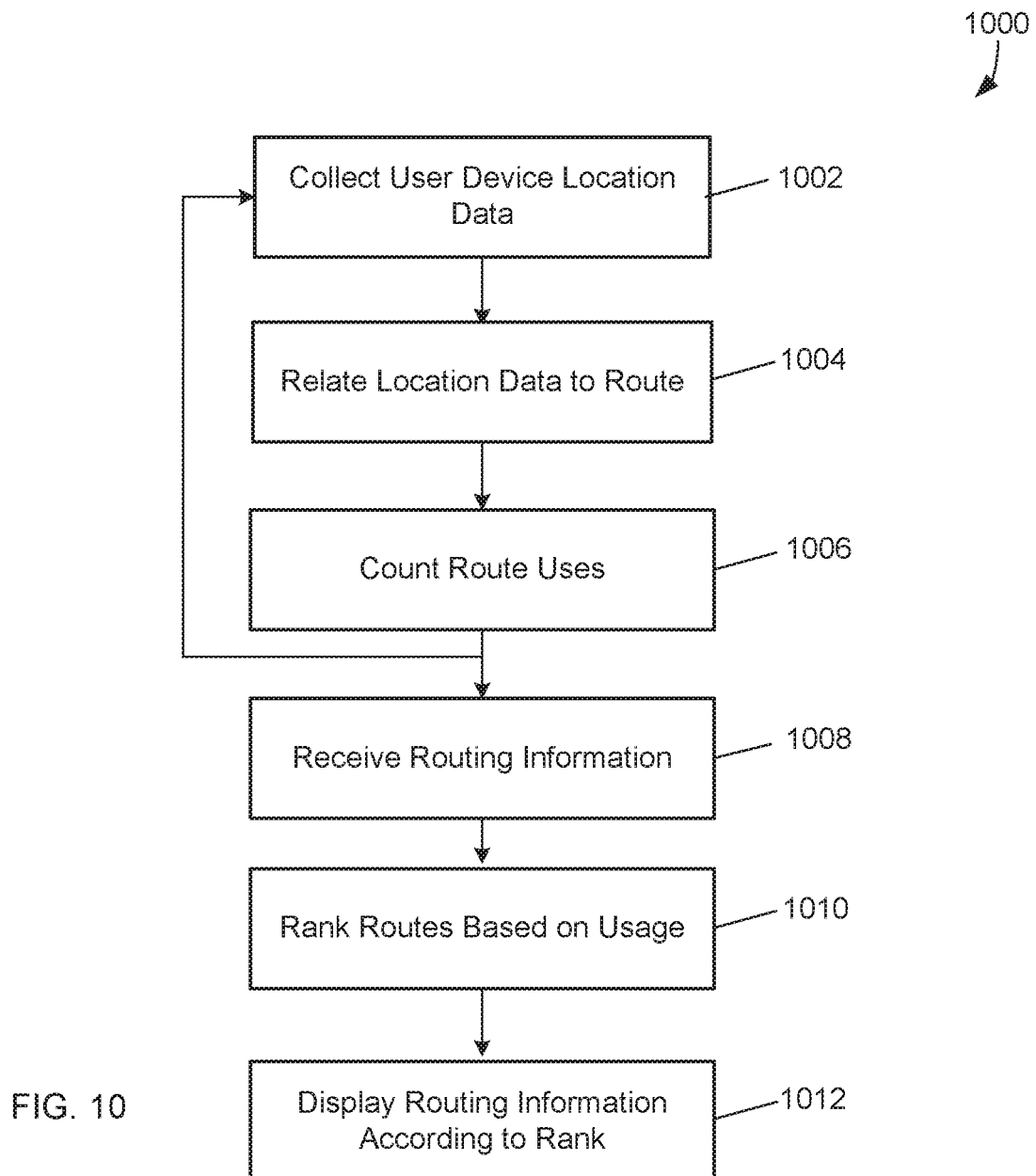
FIG. 10 is a flow diagram of an example process for ranking routes.

FIG. 10 is a flow diagram of an example process for ranking routes (e.g., see "Ranking Routes" section above). Process 1000 can be performed by one or more elements of user device 130. For example, process 1000 can be performed by routing module 132, location module 138, and/or data collection module 140 of user device 130.

At step 1002, data collection module 140 can collect user device 130 location data. For example, location module 138 can determine the location of user device 130 when map application 134 or other applications using location data are running. Data collection module 140 can store location data determined by location module 138 in collected data database 142.

At step 1004, routing module 132 can relate at least a portion of the stored location data to one or more routes between routing locations. For example, data collection module 140 can identify closely-spaced locations collected over an extended period of time as start and end points for trips. Data collection module 140 can identify widely-spaced, sequentially collected locations the start and end points as indicating movement between the start and end points. Routing module 132 can correlate the sequentially collected locations between the start and end points to known map data. For example, routing module 132 can correlate locations to points on one or more roads. Routing module 132 can correct for discrepancies in routes (e.g., due to errors in location data collection) by fitting locations to a known path provided by known locations of roads. Routing module 132 can correlate closely-spaced locations to known routing locations and such as predefined home and work locations and/or with addresses. Accordingly, routing module 132 can identify routes between locations using the stored location data.

At step 1006, routing module 132 can count each time user device 130 travels along an identified route. Routing module 132 can record each time user device 130 traverses a given route in collected data database 142, for example.

Steps 1002-1006 can repeat as location module 138 gathers more location data over time. For example, routing module can perform steps 1002-1006 periodically to continue counting route uses as evidenced by location data gathered by location module 138.

At step 1008, routing module 132 can receive routing information from map service 104. For example, a user can request routing information between routing locations using map application 134, or routing module 132 can proactively request routing information. In either case, map service 104 can respond with routing information for a plurality of possible routes.

At step 1010, routing module 132 can rank the plurality of possible routes received at step 1008. For example, routing module 132 can use a similarity algorithm to determine similarities between routes received from map service 104 and routes determined in steps 1002-1006. Routing module 132 can rank routes received from map service 104 according to how many records in map data database 136 they correlate with. Routing module 132 can rank a route received from map service 104 that correlates with the route having the highest count in collected data database 142 highest, a route having a next highest count in collected data database 142 second highest, and route having a next lowest count in collected data database 142 (or no appearance in collected data database 142) last, for example.

At step 1010, routing module 132 can display routes in order of rank. For example, if routing module 132 is generating a notification about traffic conditions, routing module 132 can include information about the highest-ranked route in the notification. If routing module 132 is supplying routing information to map application 134 for display in a navigation GUI, routing module can suggest the highest-ranked route as a selected route and the second-highest ranked route as a displayed alternate route.

Figure 11:
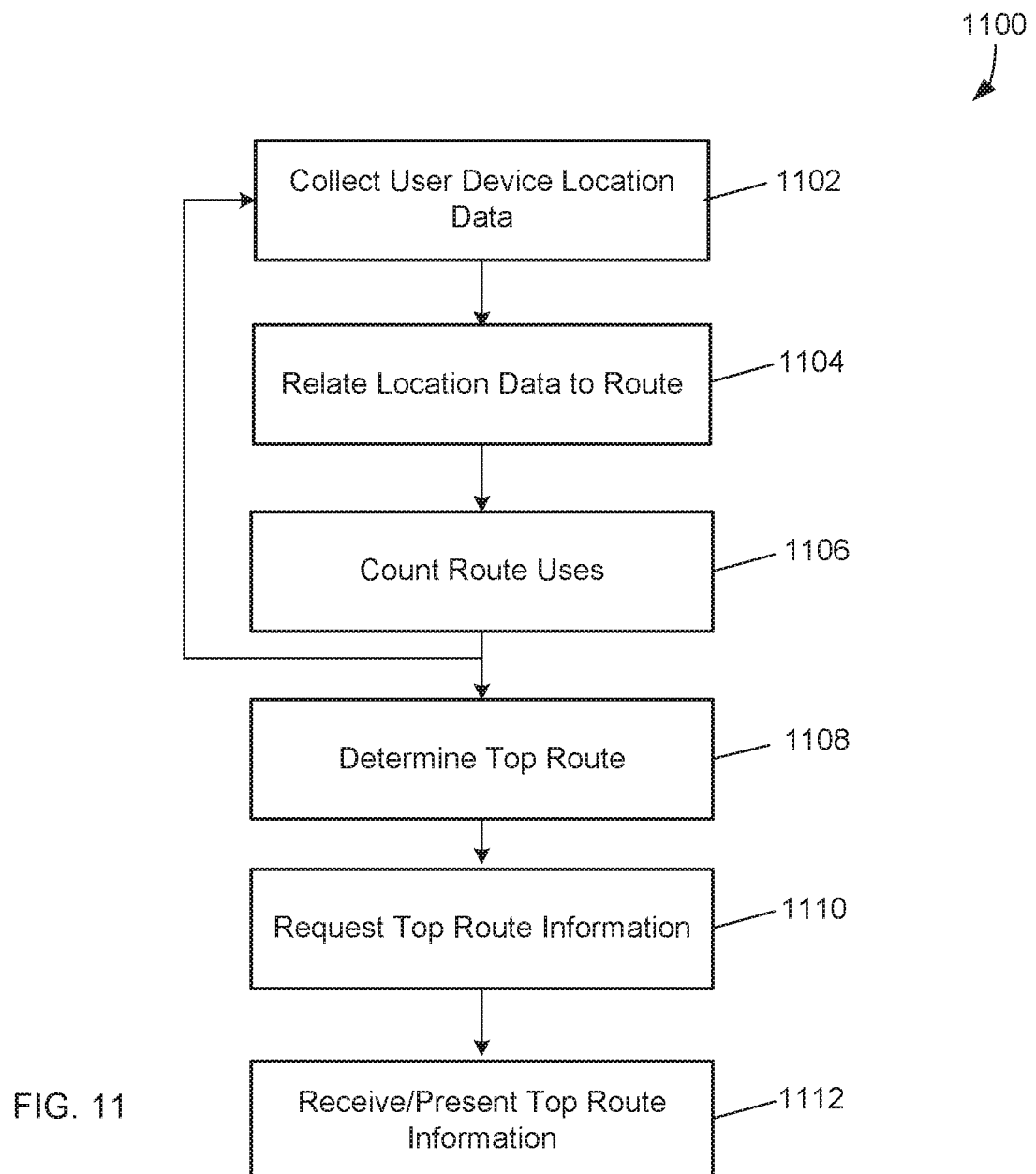
FIG. 11 is a flow diagram of an example process for evaluating top routes.

FIG. 11 is a flow diagram of an example process for evaluating top routes. (e.g., see "Ranking Routes" section above) Process 1100 can be performed by one or more elements of user device 130. For example, process 1100 can be performed by routing module 132, location module 138, and/or data collection module 140 of user device 130.

At step 1102, data collection module 140 can collect user device 130 location data. For example, location module 138 can determine the location of user device 130 when map application 134 or other applications using location data are running. Data collection module 140 can store location data determined by location module 138 in collected data database 142.

At step 1104, routing module 132 can relate at least a portion of the stored location data to one or more routes between routing locations. For example, data collection module 140 can identify closely-spaced locations collected over an extended period of time as start and end points for trips. Data collection module 140 can identify widely-spaced, sequentially collected locations the start and end points as indicating movement between the start and end points. Routing module 132 can correlate the sequentially collected locations between the start and end points to known map data. For example, routing module 132 can correlate locations to points on one or more roads. Routing module 132 can correct for discrepancies in routes (e.g., due to errors in location data collection) by fitting locations to a known path provided by known locations of roads. Routing module 132 can correlate closely-spaced locations to known routing locations and such as predefined home and work locations and/or with addresses. Accordingly, routing module 132 can identify routes between locations using the stored location data.

At step 1106, routing module 132 can count each time user device 130 travels along an identified route. Routing module 132 can record each time user device 130 traverses a given route in collected data database 142, for example.

Steps 1102-1106 can repeat as location module 138 gathers more location data over time. For example, routing module can perform steps 1102-1106 periodically to continue counting route uses as evidenced by location data gathered by location module 138.

At step 1108, routing module 132 can determine a route having a highest count in collected data database 142 is a top route (e.g., a route most frequently used by the user). In some implementations, routing module 132 can group user routes and determine one or more routes from the groups that have highest cardinalities in collected data database 142 as top routes (e.g., routes most frequently used by the user).

At step 1110, routing module 132 can send the top route to map service 104 to request traffic information for the top route. For example, routing module 132 can use networking hardware and software of user device 130 to communicate with server device 102 through a cellular or WiFi connection to the Internet or other network 150.

At step 1112, routing module 132 can receive traffic information for the top route from map service 104. In some situations, routing module 132 can display the information for the top route. For example, if the traffic information indicates a problem on the top route at a time when the user is predicted to be interested in the top route (e.g., during a commute window for the top route), routing module 132 can display a notification describing the problem. In another example, routing module 132 can supply the top route information to map application 134 for display in a navigation GUI.

Figure 12:
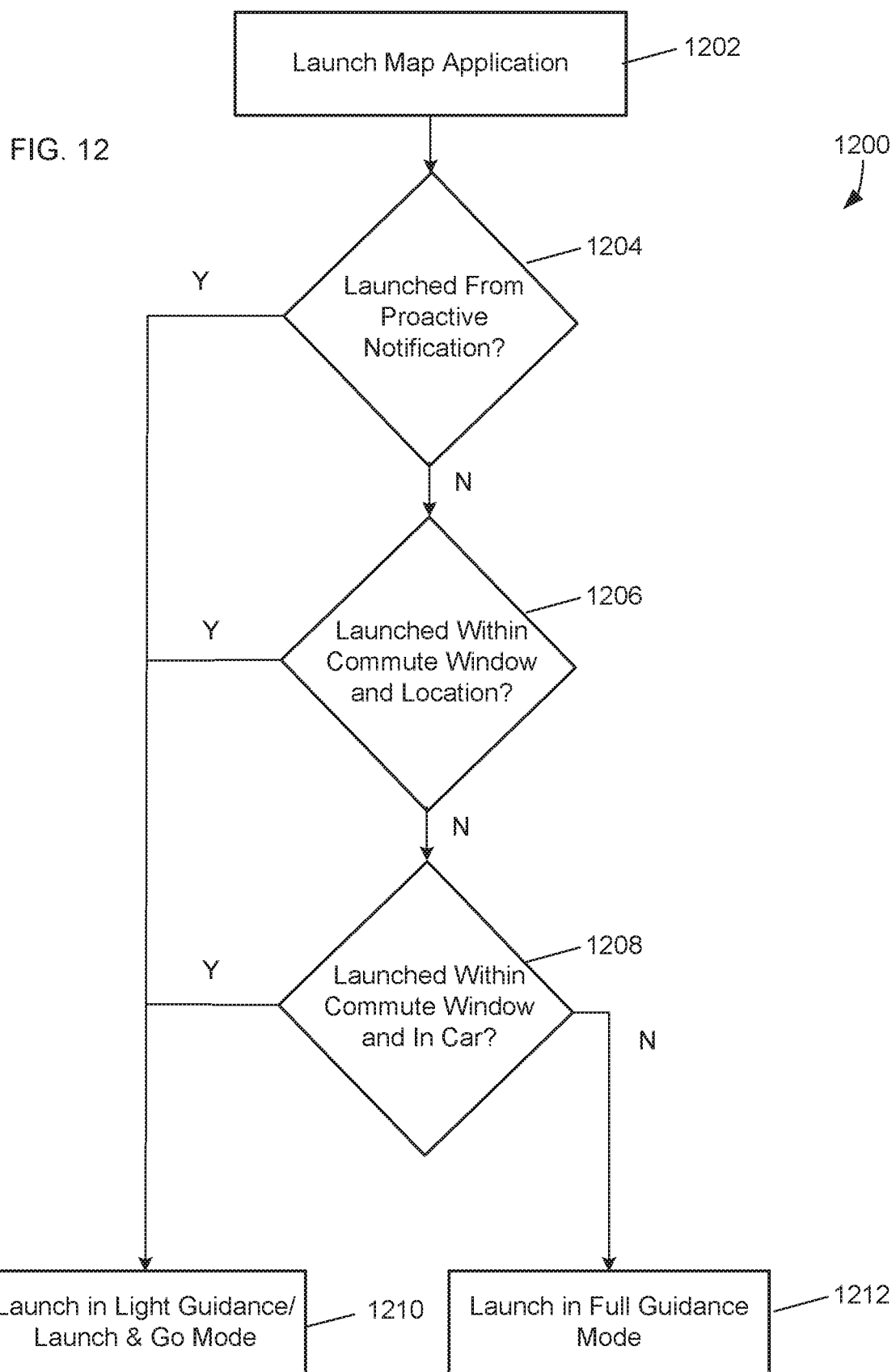
FIG. 12 is a flow diagram of an example process for launching a map application in a light guidance mode.

FIG. 12 is a flow diagram of an example process for launching map application 134 in a light guidance mode or a full guidance mode depending on the context in which map application 134 is launched (e.g., see "Light Guidance Features" section above). Process 1200 can be performed by one or more elements of user device 130.

At step 1202, map application 134 can launch. For example, map application 134 can launch in response to a user request to open the application or a user select a notification about traffic conditions.

At step 1204, map application 134 can determine whether the launch was from a user selecting a notification indicating a non-recommended route generated as described above (e.g., proactively in some implementations). For example, if the user selected a non-recommended route notification or a top route notification (e.g., notification 400 or 450), the user may want information about the traffic issue causing the notification. Non-recommended route notifications and top route notifications can be generated for areas or routes with which the user is determined to be familiar based on data in collected data database 142. Accordingly, if the launch was from a user selecting a proactive notification, map application can launch in light guidance mode (e.g., displaying launch and go interface) in step 1210.

At step 1206, map application 134 can determine whether the launch was initiated at a location along a frequently-used route within a commute window time. For example, if the user launched map application 134 from home at a time when they usually leave for work, ranked route and commute window information in collected data database 142 can suggest the user may be interested in commute information for an area with which they are familiar. Accordingly, map application can launch in light guidance mode (e.g., displaying launch and go interface) in step 1210.

At step 1208, map application 134 can determine whether the launch was initiated while user device 130 is in a vehicle within a commute window time. For example, if the user launched map application 134 in a car at a time when they are usually on the way to work, ranked route and commute window information in collected data database 142 can suggest the user may be interested in commute information for an area with which they are familiar. Accordingly, map application can launch in light guidance mode (e.g., displaying launch and go interface) in step 1210.

At step 1212, if there is no context suggesting map application 134 should be launched in light guidance mode, map application 134 can launch in full guidance mode.

Privacy

The present disclosure recognizes that the use of such personal information data, in the present technology, can be used to the benefit of users. For example, the personal information data can be used to deliver in-application recommendations, proactive downloads, suggestions, and/or targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Example System Architecture

Figure 13:
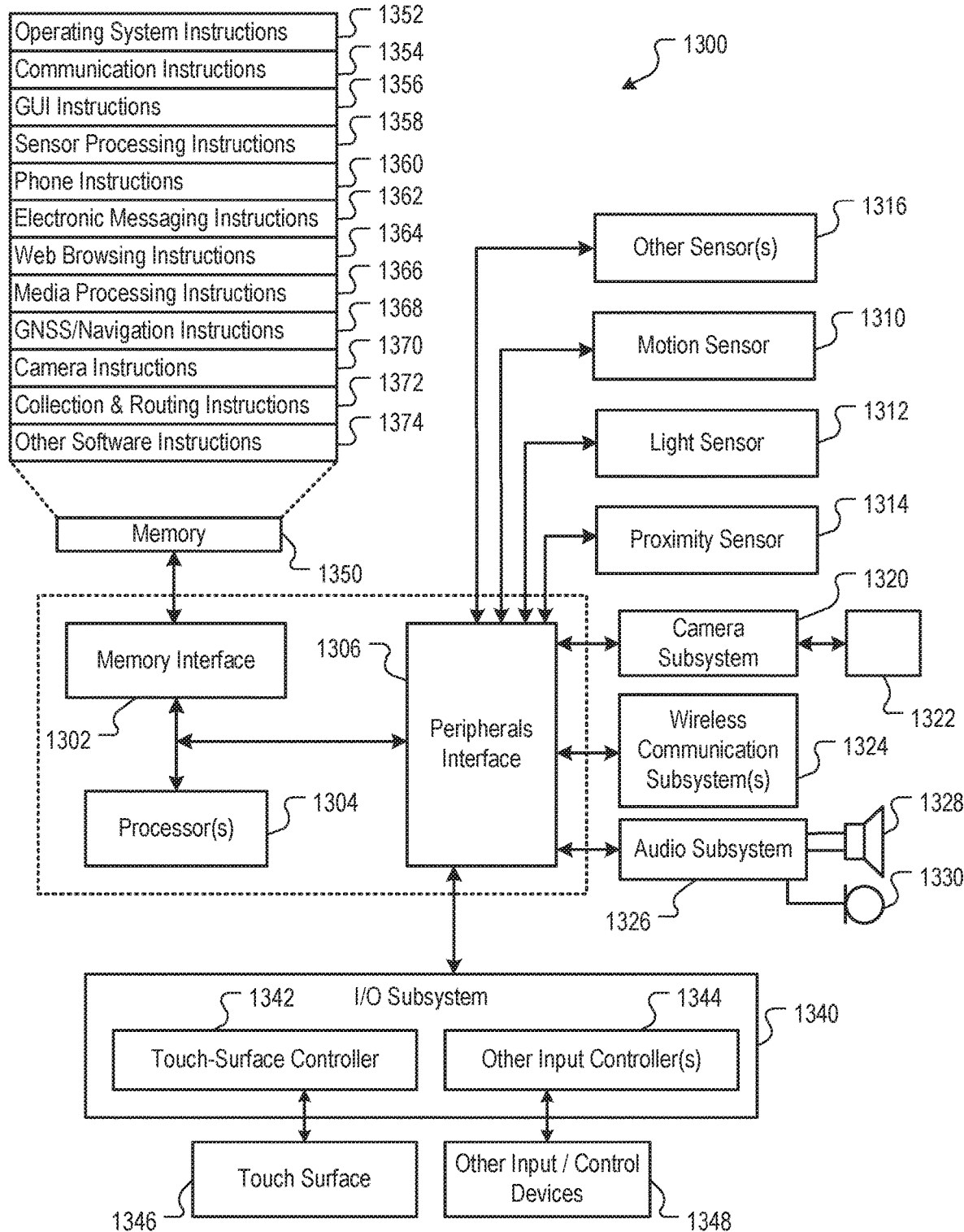
FIG. 13 is a block diagram of an example computing device that can implement the features and processes of FIGS. 1-12.

FIG. 13 is a block diagram of an example computing device 1300 that can implement the features and processes of FIGS. 1-12. The computing device 1300 can include a memory interface 1302, one or more data processors, image processors and/or central processing units 1304, and a peripherals interface 1306. The memory interface 1302, the one or more processors 1304, and/or the peripherals interface 1306 can be separate components or can be integrated in one or more integrated circuits. The various components in the computing device 1300 can be coupled by one or more communication buses or signal lines.

Sensors, devices, and subsystems can be coupled to the peripherals interface 1306 to facilitate multiple functionalities. For example, a motion sensor 1310, a light sensor 1312, and a proximity sensor 1314 can be coupled to the peripherals interface 1306 to facilitate orientation, lighting, and proximity functions. Other sensors 1316 can also be connected to the peripherals interface 1306, such as a global navigation satellite system (GNSS) (e.g., GPS receiver), a temperature sensor, a biometric sensor, magnetometer or other sensing device, to facilitate related functionalities.

A camera subsystem 1320 and an optical sensor 1322, e.g., a charged coupled device (CCD) or a complementary metal-oxide semiconductor (CMOS) optical sensor, can be utilized to facilitate camera functions, such as recording photographs and video clips. The camera subsystem 1320 and the optical sensor 1322 can be used to collect images of a user to be used during authentication of a user, e.g., by performing facial recognition analysis.

Communication functions can be facilitated through one or more wireless communication subsystems 1324, which can include radio frequency receivers and transmitters and/or optical (e.g., infrared) receivers and transmitters. The specific design and implementation of the communication subsystem 1324 can depend on the communication network(s) over which the computing device 1300 is intended to operate. For example, the computing device 1300 can include communication subsystems 1324 designed to operate over a GSM network, a GPRS network, an EDGE network, a Wi-Fi or WiMax network, and a Bluetooth™ network. In particular, the wireless communication subsystems 1324 can include hosting protocols such that the device 1300 can be configured as a base station for other wireless devices.

An audio subsystem 1326 can be coupled to a speaker 1328 and a microphone 1330 to facilitate voice-enabled functions, such as speaker recognition, voice replication, digital recording, and telephony functions. The audio subsystem 1326 can be configured to facilitate processing voice commands, voiceprinting and voice authentication, for example.

The I/O subsystem 1340 can include a touch-surface controller 1342 and/or other input controller(s) 1644. The touch-surface controller 1342 can be coupled to a touch surface 1346. The touch surface 1346 and touch-surface controller 1342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 1346.

The other input controller(s) 1344 can be coupled to other input/control devices 1348, such as one or more buttons, rocker switches, thumb-wheel, infrared port, USB port, and/or a pointer device such as a stylus. The one or more buttons (not shown) can include an up/down button for volume control of the speaker 1328 and/or the microphone 1330.

In some implementations, a pressing of the button for a first duration can disengage a lock of the touch surface 1346; and a pressing of the button for a second duration that is longer than the first duration can turn power to the computing device 1300 on or off. Pressing the button for a third duration can activate a voice control, or voice command, module that enables the user to speak commands into the microphone 1330 to cause the device to execute the spoken command. The user can customize a functionality of one or more of the buttons. The touch surface 1346 can, for example, also be used to implement virtual or soft buttons and/or a keyboard.

In some implementations, the computing device 1300 can present recorded audio and/or video files, such as MP3, AAC, and MPEG files. In some implementations, the computing device 1300 can include the functionality of an MP3 player, such as an iPod™. The computing device 1300 can, therefore, include a 36-pin connector that is compatible with the iPod. Other input/output and control devices can also be used.

The memory interface 1302 can be coupled to memory 1350. The memory 1350 can include high-speed random access memory and/or non-volatile memory, such as one or more magnetic disk storage devices, one or more optical storage devices, and/or flash memory (e.g., NAND, NOR). The memory 1350 can store an operating system 1352, such as Darwin, RTXC, LINUX, UNIX, OS X, WINDOWS, or an embedded operating system such as VxWorks.

The operating system 1352 can include instructions for handling basic system services and for performing hardware dependent tasks. In some implementations, the operating system 1352 can be a kernel (e.g., UNIX kernel). In some implementations, the operating system 1352 can include instructions for performing voice authentication. For example, operating system 1352 can implement the offline map features as described with reference to FIGS. 1-12.

The memory 1350 can also store communication instructions 1354 to facilitate communicating with one or more additional devices, one or more computers and/or one or more servers. The memory 1350 can include graphical user interface instructions 1356 to facilitate graphic user interface processing; sensor processing instructions 1358 to facilitate sensor-related processing and functions; phone instructions 1360 to facilitate phone-related processes and functions; electronic messaging instructions 1362 to facilitate electronic-messaging related processes and functions; web browsing instructions 1364 to facilitate web browsing-related processes and functions; media processing instructions 1366 to facilitate media processing-related processes and functions; GNSS/Navigation instructions 1368 to facilitate GNSS and navigation-related processes and instructions; and/or camera instructions 1370 to facilitate camera-related processes and functions.

The memory 1350 can store data collection and routing software instructions 1372 to facilitate other processes and functions, such as the offline map processes and functions as described with reference to FIGS. 1-12.

The memory 1350 can also store other software instructions 1374, such as web video instructions to facilitate web video-related processes and functions; and/or web shopping instructions to facilitate web shopping-related processes and functions. In some implementations, the media processing instructions 1366 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 1350 can include additional instructions or fewer instructions. Furthermore, various functions of the computing device 1300 can be implemented in hardware and/or in software, including in one or more signal processing and/or application specific integrated circuits.

Example Features

The implementations described above can provide at least the following features.

A method can comprise: evaluating, by a map service of a computing device, current traffic conditions for a plurality of potential routes between a starting location and an ending location, wherein each potential route is a route that is recommended under free-flow traffic conditions or historical traffic conditions; determining, by the map service, whether at least one of the potential routes is a non-recommended route based on the current traffic conditions; and in response to determining that at least one of the potential routes is a non-recommended route: determining, by the map service, at least one alternative route between the starting location and the ending location, the at least one alternative route being different from each of the potential routes; evaluating, by the map service, current traffic conditions for the at least one alternative route; identifying, by the map service, a fastest route from among the potential routes and the at least one alternative route based on the current traffic conditions; and sending, by the map service, data describing the fastest route to the user computing device.

The method can further comprise receiving, at the map service, the plurality of potential routes from the user computing device.

The method can further comprise receiving, at the map service, the starting location and the ending location from the user computing device; and determining, by the map service, the plurality of potential routes, the determining comprising evaluating a plurality of possible routes to find recommended routes under the free-flow traffic conditions or the historical traffic conditions.

The method can further comprise sending, by the map service, the plurality of potential routes to the user computing device.

Determining whether at least one of the potential routes is the non-recommended route based on the current traffic conditions can comprise, for each of the potential routes: determining, by the map service, a time to traverse the potential route under the current traffic conditions; comparing, by the map service, the time to traverse the potential route under the current traffic conditions with a time to traverse the potential route under the free-flow traffic conditions or the historical traffic conditions; determining, by the map service, whether the comparing indicates the time to traverse the potential route under the current traffic conditions is greater than the time to traverse the potential route under the free-flow traffic conditions or the historical traffic conditions; and in response to determining that the time to traverse the potential route under the current traffic conditions is greater than the time to traverse the potential route under the free-flow traffic conditions or the historical traffic conditions by the threshold amount, identifying, by the map service, the potential route as the non-recommended route.

The method can further comprise sending, by the map service, an acknowledgement message to a user computing device in response to determining that none of the potential routes are non-recommended routes.

A method can comprise: sending, by a routing module of a user computing device, a request for routing information between a starting location and an ending location to a server computing device; receiving, at the routing module, information describing a non-recommended route between the starting location and the ending location from the server computing device, wherein the non-recommended route is a route that is recommended under free-flow traffic conditions or historical traffic conditions and is determined to have a traversal time under current traffic conditions greater than a traversal time under the free-flow traffic conditions or the historical traffic conditions by a threshold amount; and displaying, by a map application of the user computing device, an alert including at least a portion of the information received from the server computing device.

The method can further comprise collecting, by a data collection module of the user computing device, location information defining the starting location and the ending location, the collecting comprising identifying a current location of the computing device and past locations of the computing device and identifying at least one of the current and past locations as the starting location and at least one of the current and past locations as the ending location.

The request can comprise the starting location and the ending location, and the method can further comprise: receiving, at the routing module, a plurality of potential routes between the starting location and the ending location from the server computing device; and storing, by the routing module, the plurality of potential routes in a memory of the user computing device.

The request can comprise a plurality of potential routes between the starting location and the ending location; and the non-recommended route can be one of the plurality of potential routes.

The information from the server device can further comprise at least one alternative route that is faster than the non-recommended route under the current traffic conditions.

The method can further comprise displaying, by the map application, routing information corresponding to the at least the portion of the information in the alert.

A non-transitory computer-readable medium can include one or more sequences of instructions that, when executed by one or more processors, cause the processors to perform operations comprising: evaluating current traffic conditions for a plurality of potential routes between a starting location and an ending location, wherein each potential route is a route that is recommended under free-flow traffic conditions or historical traffic conditions; determining whether at least one of the potential routes is a non-recommended route based on the current traffic conditions; and in response to determining that at least one of the potential routes is a non-recommended route: determining at least one alternative route between the starting location and the ending location, the at least one alternative route being different from each of the potential routes; evaluating current traffic conditions for the at least one alternative route; identifying a fastest route from among the potential routes and the at least one alternative route based on the current traffic conditions; and sending data describing the fastest route to the user computing device.

The operations can further comprise receiving the plurality of potential routes from the user computing device.

The operations can further comprise: receiving the starting location and the ending location from the user computing device; and determining the plurality of potential routes, the determining comprising evaluating a plurality of possible routes to find recommended routes under the free-flow traffic conditions or the historical traffic conditions.

The operations can further comprise sending the plurality of potential routes to the user computing device.

The determining whether at least one of the potential routes is the non-recommended route based on the current traffic conditions can comprise performing operations comprising, for each of the potential routes: determining a time to traverse the potential route under the current traffic conditions; comparing the time to traverse the potential route under the current traffic conditions with a time to traverse the potential route under the free-flow traffic conditions or the historical traffic conditions; determining whether the comparing indicates the time to traverse the potential route under the current traffic conditions is greater than the time to traverse the potential route under the free-flow traffic conditions or the historical traffic conditions; and in response to determining that the time to traverse the potential route under the current traffic conditions is greater than the time to traverse the potential route under the free-flow traffic conditions or the historical traffic conditions by the threshold amount, identifying the potential route as the non-recommended route.

The operations can further comprise sending, by the map service, an acknowledgement message to a user computing device in response to determining that none of the potential routes are non-recommended routes.

A non-transitory computer-readable medium can include one or more sequences of instructions that, when executed by one or more processors, cause the processors to perform operations comprising: sending a request for routing information between a starting location and an ending location to a server computing device; receiving information describing a non-recommended route between the starting location and the ending location from the server computing device, wherein the non-recommended route is a route that is recommended under free-flow traffic conditions or historical traffic conditions and is determined to have a traversal time under current traffic conditions greater than a traversal time under the free-flow traffic conditions or the historical traffic conditions by a threshold amount; and displaying an alert including at least a portion of the information received from the server computing device.

The operations can further comprise collecting location information defining the starting location and the ending location, the collecting comprising identifying a current location of the computing device and past locations of the computing device and identifying at least one of the current and past locations as the starting location and at least one of the current and past locations as the ending location.

The request can comprise the starting location and the ending location; and the operations can further comprise: receiving a plurality of potential routes between the starting location and the ending location from the server computing device; and storing the plurality of potential routes in a memory of the user computing device.

The request can comprise a plurality of potential routes between the starting location and the ending location; and the non-recommended route can be one of the plurality of potential routes.

The information from the server device can further comprise at least one alternative route that is faster than the non-recommended route under the current traffic conditions.

The operations can further comprise displaying routing information corresponding to the at least the portion of the information in the alert.

A system can comprise: one or more processors; and a non-transitory computer-readable medium including one or more sequences of instructions that, when executed by the one or more processors, cause the processors to perform operations comprising: evaluating current traffic conditions for a plurality of potential routes between a starting location and an ending location, wherein each potential route is a route that is recommended under free-flow traffic conditions or historical traffic conditions; determining whether at least one of the potential routes is a non-recommended route based on the current traffic conditions; and in response to determining that at least one of the potential routes is a non-recommended route: determining at least one alternative route between the starting location and the ending location, the at least one alternative route being different from each of the potential routes; evaluating current traffic conditions for the at least one alternative route; identifying a fastest route from among the potential routes and the at least one alternative route based on the current traffic conditions; and sending data describing the fastest route to the user computing device.

The operations can further comprise receiving the plurality of potential routes from the user computing device.

The operations can further comprise: receiving the starting location and the ending location from the user computing device; and determining the plurality of potential routes, the determining comprising evaluating a plurality of possible routes to find recommended routes under the free-flow traffic conditions or the historical traffic conditions.

The operations can further comprise sending the plurality of potential routes to the user computing device.

The determining whether at least one of the potential routes is the non-recommended route based on the current traffic conditions can comprise performing operations comprising, for each of the potential routes: determining a time to traverse the potential route under the current traffic conditions; comparing the time to traverse the potential route under the current traffic conditions with a time to traverse the potential route under the free-flow traffic conditions or the historical traffic conditions; determining whether the comparing indicates the time to traverse the potential route under the current traffic conditions is greater than the time to traverse the potential route under the free-flow traffic conditions or the historical traffic conditions; and in response to determining that the time to traverse the potential route under the current traffic conditions is greater than the time to traverse the potential route under the free-flow traffic conditions or the historical traffic conditions by the threshold amount, identifying the potential route as the non-recommended route.

The operations can further comprise sending, by the map service, an acknowledgement message to a user computing device in response to determining that none of the potential routes are non-recommended routes.

A system can comprise: one or more processors; and a non-transitory computer-readable medium including one or more sequences of instructions that, when executed by the one or more processors, cause the processors to perform operations comprising: sending a request for routing information between a starting location and an ending location to a server computing device; receiving information describing a non-recommended route between the starting location and the ending location from the server computing device, wherein the non-recommended route is a route that is recommended under free-flow traffic conditions or historical traffic conditions and is determined to have a traversal time under current traffic conditions greater than a traversal time under the free-flow traffic conditions or the historical traffic conditions by a threshold amount; and displaying an alert including at least a portion of the information received from the server computing device.

The operations can further comprise collecting location information defining the starting location and the ending location, the collecting comprising identifying a current location of the computing device and past locations of the computing device and identifying at least one of the current and past locations as the starting location and at least one of the current and past locations as the ending location.

The request can comprise the starting location and the ending location; and the operations can further comprise: receiving a plurality of potential routes between the starting location and the ending location from the server computing device; and storing the plurality of potential routes in a memory of the user computing device.

The request can comprise a plurality of potential routes between the starting location and the ending location; and the non-recommended route can be one of the plurality of potential routes.

The information from the server device can further comprise at least one alternative route that is faster than the non-recommended route under the current traffic conditions.

The operations can further comprise displaying routing information corresponding to the at least the portion of the information in the alert.

A method can comprise: determining, by a location module of a user computing device, locations of the user computing device a plurality of times; storing, by a data collection module of the user computing device, the locations determined by the location module to create a location record; analyzing, by a routing module of the user computing device, the location record to identify a plurality of observed routes traveled by the user computing device; counting, by the routing module, instances of the user computing device traversing each of the plurality of observed routes in the location record; ranking, by the routing module, the plurality of observed routes by count of each route in the location record; receiving, by the routing module, a plurality of suggested routes from a server computing device; correlating, by the routing module, at least two of the suggested routes with respective observed routes; and displaying, by the routing module, routing information about one of the suggested routes correlated with the observed route having a highest ranking among the observed routes correlated with the suggested routes.

The analyzing can comprise fitting at least one of the locations to at least one position on at least one road.

The counting can comprise applying a similarity algorithm to at least a first one of the observed routes to determine whether the first one of the observed routes matches at least a second one of the observed routes.

The method can further comprise: requesting, by the routing module, the routing information from the server computing device; and receiving, by the routing module, the routing information from the server computing device.

The displaying can comprise displaying a notification comprising the routing information.

The displaying can comprise displaying navigation information for the one of the suggested routes in a map application.

A method can comprise: determining, by a location module of a user computing device, locations of the user computing device a plurality of times; storing, by a data collection module of the user computing device, the locations determined by the location module to create a location record; analyzing, by a routing module of the user computing device, the location record to identify a plurality of observed routes traveled by the user computing device; counting, by the routing module, instances of the user computing device traversing each of the plurality of observed routes in the location record; designating, by the routing module, one of the observed routes having a highest count as a top route; and displaying, by the routing module, routing information for the top route.

The method can comprise determining, by the routing module, a commute window during which the top route is frequently traversed.

The method can comprise: requesting, by the routing module, the routing information from a server computing device during the commute window; and receiving, by the routing module, the routing information from the server computing device.

The determining the commute window can comprise determining times at which the instances of the user computing device traversing the top route were recorded.

The displaying can comprise displaying a notification comprising the routing information. can comprise The displaying comprises displaying navigation information for the one of the suggested routes in a map application.

A non-transitory computer-readable medium can include one or more sequences of instructions that, when executed by one or more processors, cause the processors to perform operations comprising: determining locations of the user computing device a plurality of times; storing the locations determined by the location module to create a location record; analyzing the location record to identify a plurality of observed routes traveled by the user computing device; counting instances of the user computing device traversing each of the plurality of observed routes in the location record; ranking the plurality of observed routes by count of each route in the location record; receiving a plurality of suggested routes from a server computing device; correlating at least two of the suggested routes with respective observed routes; and displaying routing information about one of the suggested routes correlated with the observed route having a highest ranking among the observed routes correlated with the suggested routes.

The analyzing can comprise fitting at least one of the locations to at least one position on at least one road.

The counting can comprise applying a similarity algorithm to at least a first one of the observed routes to determine whether the first one of the observed routes matches at least a second one of the observed routes.

The operations can further comprise: requesting the routing information from the server computing device; and receiving the routing information from the server computing device.

The displaying can comprise displaying a notification comprising the routing information.

The displaying can comprise displaying navigation information for the one of the suggested routes in a map application.

A non-transitory computer-readable medium can include one or more sequences of instructions that, when executed by one or more processors, cause the processors to perform operations comprising: determining locations of the user computing device a plurality of times; storing the locations determined by the location module to create a location record; analyzing, by a routing module of the user computing device, the location record to identify a plurality of observed routes traveled by the user computing device; counting instances of the user computing device traversing each of the plurality of observed routes in the location record; designating one of the observed routes having a highest count as a top route; and displaying routing information for the top route.

The operations can further comprise determining a commute window during which the top route is frequently traversed.

The operations can further comprise: requesting the routing information from a server computing device during the commute window; and receiving the routing information from the server computing device.

The determining the commute window can comprise determining times at which the instances of the user computing device traversing the top route were recorded.

The displaying can comprise displaying a notification comprising the routing information.

The displaying can comprise displaying navigation information for the one of the suggested routes in a map application.

A system can comprise: one or more processors; and a non-transitory computer-readable medium including one or more sequences of instructions that, when executed by the one or more processors, cause the processors to perform operations comprising: determining locations of the user computing device a plurality of times; storing the locations determined by the location module to create a location record; analyzing the location record to identify a plurality of observed routes traveled by the user computing device; counting instances of the user computing device traversing each of the plurality of observed routes in the location record; ranking the plurality of observed routes by count of each route in the location record; receiving a plurality of suggested routes from a server computing device; correlating at least two of the suggested routes with respective observed routes; and displaying routing information about one of the suggested routes correlated with the observed route having a highest ranking among the observed routes correlated with the suggested routes.

The analyzing can comprise fitting at least one of the locations to at least one position on at least one road.

The counting can comprise applying a similarity algorithm to at least a first one of the observed routes to determine whether the first one of the observed routes matches at least a second one of the observed routes.

The operations can further comprise: requesting the routing information from the server computing device; and receiving the routing information from the server computing device.

The displaying can comprise displaying a notification comprising the routing information.

The displaying can comprise displaying navigation information for the one of the suggested routes in a map application.

A system can comprise: one or more processors; and a non-transitory computer-readable medium including one or more sequences of instructions that, when executed by the one or more processors, cause the processors to perform operations comprising: determining locations of the user computing device a plurality of times; storing the locations determined by the location module to create a location record; analyzing, by a routing module of the user computing device, the location record to identify a plurality of observed routes traveled by the user computing device; counting instances of the user computing device traversing each of the plurality of observed routes in the location record; designating one of the observed routes having a highest count as a top route; and displaying routing information for the top route.

The operations can further comprise determining a commute window during which the top route is frequently traversed.

The operations can further comprise: requesting the routing information from a server computing device during the commute window; and receiving the routing information from the server computing device.

The determining the commute window can comprise determining times at which the instances of the user computing device traversing the top route were recorded.

The displaying can comprise displaying a notification comprising the routing information.

The displaying can comprise displaying navigation information for the one of the suggested routes in a map application.

A method can comprise: receiving a command to launch a map application of a user computing device, the map application including a full guidance mode configured to display turn-by-turn navigation instructions and a light guidance mode configured to display light navigation instructions that do not include turn-by-turn navigation instructions; determining, from an aspect of the command, whether a route displayed by the map application has been previously traveled by the user computing device or a destination of the route has been previously visited by the user computing device; and in response to determining that the route has been previously traveled or the destination has been previously visited, launching the map application in the light guidance mode.

The method can comprise, in response to determining that the route has not been previously traveled or the destination has not been previously visited, launching the map application in the full guidance mode.

The method can comprise: collecting, by a data collection module of the user computing device, commute information comprising a starting location, an ending location, and a time of departure; and defining, by a routing module of the user computing device, a commute window based on the time of departure.

The method can comprise: determining, by a location module of the user computing device, a current location of the user computing device; wherein the aspect of the command comprises a time and a location at which the command is issued; and wherein the aspect of the command indicates the route has been previously traveled or the destination has been previously visited when the command is issued: at a time within the commute window, and at the starting location or a location between the starting location and the ending location.

The method can comprise: determining, by a location module of the user computing device, whether the user computing device is in a moving vehicle; wherein the aspect of the command comprises a time at which the command is issued; and wherein the aspect of the command indicates the route has been previously traveled or the destination has been previously visited when the command is issued: at a time within the commute window, and while the user computing device is in the moving vehicle.

The method can comprise: automatically requesting, by a routing module of the user computing device, traffic information between a starting location and an ending location from a server computer device; receiving, by the routing module, traffic data from the server computer device in response to the request; and displaying, by the routing module, a notification comprising at least a portion of the traffic data; wherein the aspect of the command comprises an object selected by the user to issue the command; and wherein the aspect of the command indicates the route has been previously traveled or the destination has been previously visited when the command is issued from the user selecting the notification to issue the command.

The light navigation instructions can comprise an indication of a next navigation instruction that deviates from a standard navigation instruction.

The light navigation instructions can comprise an alert indicating a traffic incident.

The light navigation instructions can comprise displaying a new route in response to a traffic incident on a current route.

The method can comprise: receiving a command to toggle between the light guidance mode and the full guidance mode; and switching from the light guidance mode to the full guidance mode.

The method can comprise: receiving a command to toggle between the full guidance mode and the light guidance mode; and switching from the full guidance mode to the light guidance mode.

A non-transitory computer-readable medium can include one or more sequences of instructions that, when executed by one or more processors, cause the processors to perform operations comprising: receiving a command to launch a map application of a user computing device, the map application including a full guidance mode configured to display turn-by-turn navigation instructions and a light guidance mode configured to display light navigation instructions that do not include turn-by-turn navigation instructions; determining, from an aspect of the command, whether a route displayed by the map application has been previously traveled by the user computing device or a destination of the route has been previously visited by the user computing device; and in response to determining that the route has been previously traveled or the destination has been previously visited, launching the map application in the light guidance mode.

The operations can further comprise, in response to determining that the route has not been previously traveled or the destination has not been previously visited, launching the map application in the full guidance mode.

The operations can further comprise: collecting commute information comprising a starting location, an ending location, and a time of departure; and defining a commute window based on the time of departure.

The operations can further comprise: determining a current location of the user computing device; wherein the aspect of the command comprises a time and a location at which the command is issued; and wherein the aspect of the command indicates the route has been previously traveled or the destination has been previously visited when the command is issued: at a time within the commute window, and at the starting location or a location between the starting location and the ending location.

The operations can further comprise: determining whether the user computing device is in a moving vehicle; wherein the aspect of the command comprises a time at which the command is issued; and wherein the aspect of the command indicates the route has been previously traveled or the destination has been previously visited when the command is issued: at a time within the commute window, and while the user computing device is in the moving vehicle.

The operations can further comprise: automatically requesting traffic information between a starting location and an ending location from a server computer device; receiving traffic data from the server computer device in response to the request; and displaying a notification comprising at least a portion of the traffic data; wherein the aspect of the command comprises an object selected by the user to issue the command; and wherein the aspect of the command indicates route has been previously traveled or the destination has been previously visited when the command is issued from the user selecting the notification to issue the command.

The light navigation instructions can comprise an indication of a next navigation instruction that deviates from a standard navigation instruction.

The light navigation instructions can comprise an alert indicating a traffic incident.

The light navigation instructions can comprise displaying a new route in response to a traffic incident on a current route.

The operations can further comprise: receiving a command to toggle between the light guidance mode and the full guidance mode; and switching from the light guidance mode to the full guidance mode.

The operations can further comprise: receiving a command to toggle between the full guidance mode and the light guidance mode; and switching from the full guidance mode to the light guidance mode.

A system can comprise: one or more processors; and a non-transitory computer-readable medium including one or more sequences of instructions that, when executed by the one or more processors, cause the processors to perform operations comprising: receiving a command to launch a map application of a user computing device, the map application including a full guidance mode configured to display turn-by-turn navigation instructions and a light guidance mode configured to display light navigation instructions that do not include turn-by-turn navigation instructions; determining, from an aspect of the command, whether a route displayed by the map application has been previously traveled by the user computing device or a destination of the route has been previously visited by the user computing device; and in response to determining that the route has been previously traveled or the destination has been previously visited, launching the map application in the light guidance mode.

The operations can further comprise, in response to determining that the route has not been previously traveled or the destination has not been previously visited, launching the map application in the full guidance mode.

The operations can further comprise: collecting commute information comprising a starting location, an ending location, and a time of departure; and defining a commute window based on the time of departure.

The operations can further comprise: determining a current location of the user computing device; wherein the aspect of the command comprises a time and a location at which the command is issued; and wherein the aspect of the command indicates the route has been previously traveled or the destination has been previously visited when the command is issued: at a time within the commute window, and at the starting location or a location between the starting location and the ending location.

The operations can further comprise: determining whether the user computing device is in a moving vehicle; wherein the aspect of the command comprises a time at which the command is issued; and wherein the aspect of the command indicates the route has been previously traveled or the destination has been previously visited when the command is issued: at a time within the commute window, and while the user computing device is in the moving vehicle.

The operations can further comprise: automatically requesting traffic information between a starting location and an ending location from a server computer device; receiving traffic data from the server computer device in response to the request; and displaying a notification comprising at least a portion of the traffic data; wherein the aspect of the command comprises an object selected by the user to issue the command; and wherein the aspect of the command indicates the route has been previously traveled or the destination has been previously visited when the command is issued from the user selecting the notification to issue the command.

The light navigation instructions can comprise an indication of a next navigation instruction that deviates from a standard navigation instruction.

The light navigation instructions can comprise an alert indicating a traffic incident.

The light navigation instructions can comprise displaying a new route in response to a traffic incident on a current route.

The operations can further comprise: receiving a command to toggle between the light guidance mode and the full guidance mode; and switching from the light guidance mode to the full guidance mode.

The operations can further comprise: receiving a command to toggle between the full guidance mode and the light guidance mode; and switching from the full guidance mode to the light guidance mode.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method comprising:

sending, by a routing module of a user computing device, to a map service, a first request for routing information between a starting location and an ending location;

receiving, by the routing module of the user computing device, a plurality of potential recommended routes between the starting location and the ending location from the map service at a first time, wherein the plurality of potential recommended routes are expected to be fastest under free-flow traffic conditions or historical traffic conditions;

storing, by the routing module, the plurality of potential recommended routes in a storage device of the user computing device;

at a second time after the first time, determining that recommended routes should be presented to a user;

determining that the stored plurality of potential recommended routes exists in the storage device;

based on the determination that the stored plurality of potential recommended routes exists, sending, by the routing module, to the map service, a second request for routing information between a same starting location and a same ending location as the starting location and the ending location indicated in the first request, the second request including the stored plurality of potential recommended routes that were previously received from the map service;

receiving, at the routing module, evaluation results from the map service that indicate that one or more routes of the stored plurality of potential recommended routes sent to the map service by the routing module have a traversal time under current traffic conditions that is greater than a traversal time under the free-flow traffic conditions or the historical traffic conditions by a threshold amount;

selecting, by the routing module, from the plurality of potential recommended routes, a plurality of recommended routes for a user of the user computing device based on user behavior data representing historically observed travel patterns that predict a likelihood of the user traveling along a route of the potential recommended routes;

determining that a first route of the plurality of recommended routes is a non-recommended route, based on the evaluation results received from the map service; and presenting, by the user computing device, an alert that includes a recommendation to avoid the first route.

2. The method of claim 1, further comprising collecting, by a data collection module of the user computing device, location information defining the starting location and the ending location, the collecting comprising identifying a current location of the user computing device and past locations of the user computing device and identifying at least one of the current and past locations as the starting location and at least one of the current and past locations as the ending location.

3. The method of claim 1, wherein the request comprises the starting location and the ending location, the method further comprising:
receiving, at the routing module, the plurality of potential recommended routes between the starting location and the ending location from the map service; and
storing, by the routing module, the plurality of potential recommended routes in the storage device of the user computing device.

4. The method of claim 3,
wherein the map service uses a first amount of processing resources to evaluate whether to recommend the plurality of potential recommended routes;
and wherein the sending causes the map service to evaluate whether to recommend the plurality of potential recommended routes using a second amount of processing resources that is less than the first amount of processing resources.

5. The method of claim 1, further comprising:
determining at least one alternative route that is faster than the first route under the current traffic conditions; and
presenting the alert including a recommendation to use the at least one alternative route and a recommendation to avoid the first route.

6. The method of claim 5, further comprising displaying routing information corresponding to the at least one alternative route.

7. The method of claim 1, further comprising receiving information describing the first route from the map service, wherein the information describing the first route comprises a destination ID for the first route and an incident ID for a specific current traffic condition on the first route, the method further comprising storing the destination ID, the incident ID, and a timestamp indicating when the information describing the first route was received in the storage device of the user computing device.

8. The method of claim 7, further comprising:
receiving a second set of information describing a second route between the starting location and the ending location from the map service, the second set of information comprising the same destination ID for the first route and the same incident ID for the first route; and
suppressing, by the user computing device, a second alert including at least a portion of the second set of information received from the map service.

9. The method of claim 1, further comprising:
comparing the first route to the plurality of recommended routes, wherein a first traversal time of the first route is greater than a second traversal time for the first route under the free-flow conditions or the historical traffic conditions by the threshold amount;
determining, based on the comparison, that the first route is the fastest route compared to each route of the plurality of recommended routes; and
presenting, by the user computing device, a recommended route alert that recommends use of the first route.

10. A non-transitory computer-readable medium including one or more sequences of instructions that, when executed by one or more processors, cause the processors to perform operations comprising:
sending, by a routing module of a user computing device, to a map service, a first request for routing information between a starting location and an ending location;
receiving, by the routing module of the user computing device, a plurality of potential recommended routes between the starting location and the ending location from the map service at a first time, wherein the plurality of potential recommended routes are expected to be fastest under free-flow traffic conditions or historical traffic conditions;
storing, by the routing module, the plurality of potential recommended routes in a storage device of the user computing device;
at a second time after the first time, determining that recommended routes should be presented to a user;
determining that the stored plurality of potential recommended routes exists in the storage device;
based on the determination that the stored plurality of potential recommended routes exists, sending, by the routing module, to the map service, a second request for routing information between a same starting location and a same ending location as the starting location and the ending location indicated in the first request, the second request including the stored plurality of potential recommended routes that were previously received from the map service;
receiving, at the routing module, evaluation results from the map service that indicate that one or more routes of the stored plurality of potential recommended routes sent to the map service by the routing module have a traversal time under current traffic conditions that is greater than a traversal time under the free-flow traffic conditions or the historical traffic conditions by a threshold amount;
selecting, by the routing module, from the plurality of potential recommended routes, a plurality of recommended routes for a user of the user computing device based on user behavior data representing historically observed travel patterns that predict a likelihood of the user traveling along a route of the potential recommended routes;
determining that a first route of the plurality of recommended routes is a non-recommended route, based on the evaluation results received from the map service; and
presenting, by the user computing device, an alert that includes a recommendation to avoid the first route.

11. The non-transitory computer-readable medium of claim 10, wherein the operations further comprise collecting, by a data collection module of the user computing device, location information defining the starting location and the ending location, the collecting comprising identifying a current location of the user computing device and past locations of the user computing device and identifying at least one of the current and past locations as the starting location and at least one of the current and past locations as the ending location.

12. The non-transitory computer-readable medium of claim 10, wherein:
the request comprises the starting location and the ending location; and the operations further comprise:
receiving the plurality of potential recommended routes between the starting location and the ending location from the map service; and
storing the plurality of potential recommended routes in the storage device of the user computing device.

13. The non-transitory computer-readable medium of claim 12, wherein:

wherein the map service uses a first amount of processing resources to evaluate whether to recommend the plurality of potential recommended routes;

and wherein the sending causes the map service to evaluate whether to recommend the plurality of potential recommended routes using a second amount of processing resources that is less than the first amount of processing resources.

14. The non-transitory computer-readable medium of claim 10, wherein the operations further comprise:

determining at least one alternative route that is faster than the non-recommended route under the current traffic conditions; and presenting the alert including a recommendation to use the at least one alternative route and a recommendation to avoid the first route.

15. The non-transitory computer-readable medium of claim 14, wherein the operations further comprise displaying routing information corresponding to the at least one alternative route.

16. The non-transitory computer-readable medium of claim 10, wherein the operations further comprise receiving information describing the first route from the map service, wherein the information describing the first route comprises a destination ID for the first route and an incident ID for a specific current traffic condition on the first route, the method further comprising storing the destination ID, the incident ID, and a timestamp indicating when the information describing the first route was received in the storage device of the user computing device.

17. The non-transitory computer-readable medium of claim 16, wherein the operations further comprise:

receiving a second set of information describing a second route between the starting location and the ending location from the map service, the second set of information comprising the same destination ID for the first route and the same incident ID for the first route; and suppressing, by the user computing device, a second alert including at least a portion of the second set of information received from the map service.

18. A system comprising:
one or more processors; and
a non-transitory computer-readable medium including one or more sequences of instructions that, when executed by the one or more processors, cause the processors to perform operations comprising:

sending, by a routing module of a user computing device, to a map service, a first request for routing information between a starting location and an ending location;

receiving, by the routing module of the user computing device, a plurality of potential recommended routes between the starting location and the ending location from the map service at a first time, wherein the plurality of potential recommended routes are expected to be fastest under free-flow traffic conditions or historical traffic conditions;

storing, by the routing module, the plurality of potential recommended routes in a storage device of the user computing device;

at a second time after the first time, determining that recommended routes should be presented to a user;

determining that the stored plurality of potential recommended routes exists in the storage device;

based on the determination that the stored plurality of potential recommended routes exists, sending, by the routing module, to the map service, a second request for routing information between a same starting location and a same ending location as the starting location and the ending location indicated in the first request, the second request including the stored plurality of potential recommended routes that were previously received from the map service;

receiving, at the routing module, evaluation results from the map service that indicate that one or more routes of the stored plurality of potential recommended routes sent to the map service by the routing module have a traversal time under current traffic conditions that is greater than a traversal time under the free-flow traffic conditions or the historical traffic conditions by a threshold amount;

selecting, by the routing module, from the plurality of potential recommended routes, a plurality of recommended routes for a user of the user computing device based on user behavior data representing historically observed travel patterns that predict a likelihood of the user traveling along a route of the potential recommended routes;

determining that a first route of the plurality of recommended routes is a non-recommended route, based on the evaluation results received from the map service; and presenting, by the user computing device, an alert that includes a recommendation to avoid the first route.

19. The system of claim 18, wherein the operations further comprise collecting, by a data collection module of the user computing device, location information defining the starting location and the ending location, the collecting comprising identifying a current location of the user computing device and past locations of the user computing device and identifying at least one of the current and past locations as the starting location and at least one of the current and past locations as the ending location.

20. The system of claim 18, wherein:
the request comprises the starting location and the ending location; and
the operations further comprise:
receiving the plurality of potential recommended routes between the starting location and the ending location from the map service; and
storing the plurality of potential recommended routes in the storage device of the user computing device.

21. The system of claim 20, wherein the operations further comprise:
wherein the map service uses a first amount of processing resources to evaluate whether to recommend the plurality of potential recommended routes;
and wherein the sending causes the map service to evaluate whether to recommend the plurality of potential recommended routes using a second amount of processing resources that is less than the first amount of processing resources.

22. The system of claim 18, wherein the operations further comprise:
determining at least one alternative route that is faster than the first route under the current traffic conditions; and
presenting the alert including a recommendation to use the at least one alternative route and a recommendation to avoid the first route.

23. The system of claim 18, wherein the operations further comprise displaying routing information corresponding to the alternative route.

24. The system of claim 18, wherein the operations further comprise receiving information describing the first route from the map service, wherein the information describing the first route comprises a destination ID for the first route and an incident ID for a specific current traffic condition on the first route, the method further comprising storing the destination ID, the incident ID, and a timestamp indicating when the information describing the first route was received in the storage device of the user computing device.

25. The system of claim 24, wherein the operations further comprise:
  receiving a second set of information describing a second route between the starting location and the ending location from the map service, the second set of information comprising the same destination ID for the first route and the same incident ID for the first route; and
  suppressing, by the user computing device, a second alert including at least a portion of the second set of information received from the map service.

\* \* \* \* \*